United States Patent [19]
Firoiu et al.

[11] Patent Number: 6,009,077
[45] Date of Patent: Dec. 28, 1999

[54] FLOW ADMISSION CONTROL FOR A ROUTER

[75] Inventors: Victor Firoiu, Amherst; James F. Kurose, Northampton; Donald F. Towsley, Amherst, all of Mass.

[73] Assignee: University of Massachusetts, Boston, Mass.

[21] Appl. No.: 08/824,688

[22] Filed: Apr. 8, 1997

[51] Int. Cl.[6] .................................................. H04L 12/56
[52] U.S. Cl. ........................................... 370/230; 370/252
[58] Field of Search .................................. 370/229, 230, 370/231, 232, 233, 234, 235, 236, 238, 252, 253, 254, 255, 412, 413, 415, 416; 395/200.53, 200.56, 200.61, 200.62, 200.63, 200.64, 200.65, 200.71, 200.54

[56] References Cited

U.S. PATENT DOCUMENTS

| | | | |
|---|---|---|---|
| 4,771,391 | 9/1988 | Blasbalg | 395/200.62 |
| 5,014,265 | 5/1991 | Hahne et al. | 370/236 |
| 5,166,894 | 11/1992 | Saito | 364/715.11 |
| 5,197,127 | 3/1993 | Waclawsky et al. | 395/200.54 |
| 5,400,336 | 3/1995 | Boyer et al. | 370/232 |
| 5,440,719 | 8/1995 | Hanes et al. | 395/500 |
| 5,446,733 | 8/1995 | Tsuruoka | 370/232 |
| 5,745,477 | 4/1998 | Zheng et al. | 370/230 |
| 5,764,625 | 6/1998 | Bournas | 370/231 |
| 5,777,984 | 7/1998 | Gun et al. | 370/230 |

OTHER PUBLICATIONS

Wrege et al., Video Traffic Characterization for Multimedia Networks with a Deterministic Service; IEEE Infocom '96, Proceedings vol. 2, 537–544 (1996).

Georgiadis et al., Optimal Multiplexing on a Single Link: Delay and Buffer Requirements; IEEE Infocom '94 Proceedings vol. 2, 524–532 (1994).

Liebeherr et al., Exact Admission Control for Networks with a Bounded Delay Service; IEEE Transactions on Networking, 4:885–901 (1996).

Knightly et al., Fundamental Limits and Tradeoffs of Providing Deterministic Guarantees to VBR Video Traffic; Sigmetrics Performance Evaluation Review, 23:98–107 (1995).

R.L. Cruz, Quality of Service Guarantees in Virtual Circuit Switched Networks; IEEE Journal on Selected Areas in Communications 13:1048–1056 (1995).

Alan Demers et al., Analysis and Simulation of a Fair Queueing Algorithm; Computer Communications Review, vol. 19, No. 4, 1–12 (1989).

Victor Firoiu et al., Call Admission and Resource Reservation for Multicast Sessions; IEEE Infocom'96 Proceedings vol. 1, 94–101 (1996).

L. Georgiadis et al., Efficient Network QoS Provisioning Based on per Node Traffic Shaping; IEEE Infocom '96, 102–110 (1996).

D. Kandlur et al, Real–time Communication in Multi–Hop Networks, IEEE Transactions on Parallel & Distributed Systems, vol. 5, No. 1, 1044–1056 (1994).

Edward W. Knightly et al., Traffic Characterization and Switch Utilization using a Deterministic Bounding Interval Dependent Traffic Model, Infocom '95 Proceeding vol. 3, 1137–1143 (1995).

C.L. Liu et al., Scheduling Algorithms for Multiprogramming in a Hard–Real–Time Environment; J. Association for Computing Machinery, vol. 20, No. 7:46–61 (1973).

Hui Zheng et al., Rate–Controlled Service Disciplines; IEEE Transactions on Communications, vol. 42, No. 2/3/4, 1096–1105 (1994).

(List continued on next page.)

*Primary Examiner*—Chi H. Pham
*Assistant Examiner*—Kwang B. Yao
*Attorney, Agent, or Firm*—Fish & Richardson P.C.

[57] ABSTRACT

A network component performs flow admission control. A function F(t) is provided which characterizes resources available at the network component. Information characterizing a proposed flow is received and used to define an envelope A(t). It is then attempted to fit the envelope within F(t) and the flow is accepted or rejected based on the attempt to fit the envelope.

24 Claims, 40 Drawing Sheets

OTHER PUBLICATIONS

Abhay K. Parekh et al., A Generalized Processor Sharing Approach to Flow Control in Integrated Services Networks: The Single–Node Case; IEEE/Acm Transactions on Networking, vol. 1, No. 3, 344–357 (1993).

Abhay K. Parekh et al., A Generalized Processor Sharing Approach to Flow Control in Integrated Services Networks: The Multiple Node Case; IEEE/Acm Transactions on Networking, vol. 2, No. 2, 137–150 (1994).

Jorg Liebeherr et al., Design and Analysis of a High–Performance Packet Multiplexer for Multiservice Networks with Delay Guarantees, Technical Reports CS–94–30, University of Virginia (1994).

Shenker et al., Specification of Guaranteed Quality of Service; Internet Engineering Task Force; Integrated Services WG; Internet–Draft, Aug. 13, 1996.

Zhang et al., Rate–Controlled Service Disciplines, Journal of High Speed Networks 3(4), 1994.

Wrege et al., A Near–Optimal Packet Scheduler for Qos Networks, IEEE Infocom'97, Proceedings vol. 2, 577–584 (1997).

MINIMUM_DELAY_1

1105   if $c \leq \sum_{i \in \mathcal{N}} \rho_i + \rho_f$
1110     then exit "cannot accept flow $f$"
1115   $m_x \leftarrow 0; m_y \leftarrow 0$
1120   for $i = 1$ to $N$ do
1125     if $F(d_i + a_i) \geq C_f a_f$
1130       then $x_i \leftarrow d_i + a_i - \frac{F(d_i + a_i) - \sigma_f}{\rho_f}$
1135         $m_x \leftarrow \max(m_x, x_i)$
1140     else $y_i \leftarrow d_i + a_i - \frac{F(d_i + a_i)}{C_f}$
1145       $m_y \leftarrow \max(m_y, y_i)$
1150   $m \leftarrow \max(m_x, m_y)$
1155   $b \leftarrow 1$
1160   while ($b \leq N$) and ($m + a_f > d_b + a_b$) do
1165     $b \leftarrow b + 1$
1170   if $[(b = N + 1)$ or $F(d_b + a_b) > C_f a_f]$ and $[(b = 1)$ or $(F(d_{b-1} + a_{b-1}) < C_f a_f)]$
1175     then COMPUTE_$\bar{d}_b(b, (C_i, \sigma_i, \rho_i, d_i)_{i \in \mathcal{N}}, (C_f, \sigma_f, \rho_f); \bar{d}_b)$
1180     $\bar{d} \leftarrow \max(m, \bar{d}_b)$
1185   else $\bar{d}_f \leftarrow m$
1190 return $\bar{d}_f$

FIG. 10

COMPUTE_$\bar{d}_{b\_1}$ (input: $b$, $(C_i, \sigma_i, \rho_i, d_i)_{i \in \mathcal{N}}$, $(C_f, \sigma_f, \rho_f)$; output: $\bar{d}_b$)

1205  let $\pi : \mathcal{N} \to \mathcal{N}$ s.t. $\pi(i) < \pi(j) \Rightarrow d_{\pi(i)} \leq d_{\pi(j)} \; \forall i, j \in \mathcal{N}$ 1210  $k \leftarrow N$ 1215  while $(k \geq 1)$ and $(b \leq N)$ and $(d_{\pi(k)} \geq d_b + a_b)$ do 1220   $k \leftarrow k - 1$ 1225  while $(k \geq 1)$ and $(F(d_{\pi(k)}) > C_f a_f)$ and $[(b = 1)$ or $(d_{\pi(k)} \geq d_{b-1} + a_{b-1})]$ do 1230   $k \leftarrow k - 1$ 1235  $q \leftarrow k + 1$ 1240  $\bar{d}_b \leftarrow \dfrac{C_f a_f - c a_f + \sum_{i=1}^{b-1}(\sigma_i + \rho_i(a_f - d_i)) + \sum_{\substack{i=b, \\ d_i < d_{\pi(q)}}}^{N} C_i(a_f - d_i)}{c - \sum_{i=1}^{b-1} \rho_i - \sum_{\substack{i=b, \\ d_i < d_{\pi(q)}}}^{N} C_i}$ 1245  return $\bar{d}_b$

FIG. 11

MINUMUM_DELAY_2 if $B \leq \rho_f$ then exit "cannot accept flow $f$"

$m_x \leftarrow 0;\ m_y \leftarrow 0$ for $i = 1$ to $N$ do if $W_i \geq C_f a_f$ then $x_i \leftarrow d_i + a_i - \frac{W_i - \sigma_f}{\rho_f}$ $m_x \leftarrow \max(m_x, x_i)$ else $y_i \leftarrow d_i + a_i - \frac{W_i}{C_f}$ $m_y \leftarrow \max(m_y, y_i)$ $m \leftarrow \max(m_x, m_y)$ find $b$ s.t. $d_{b-1} + a_{b-1} < m + a_f \leq d_b + a_b$ if $[(b = N + 1)$ or $(W_b > C_f a_f)]$ and $[(b = 1)$ or $(W_{b-1} < C_f a_f)]$ then FASTER_COMPUTE_$\bar{d}_b(b, (V_i)_{i \in \mathcal{N}}, (C_i, \sigma_i, \rho_i, d_i)_{i \in \mathcal{N}}, (C_f, \sigma_f, \rho_f); \bar{d}_b)$ $\bar{d} \leftarrow \max(m, \bar{d}_b)$ else $\bar{d} \leftarrow m$ return $\bar{d}$

FIG. 12

COMPUTE_$\bar{d}_b$_2 (input: $b$, $(V_i)_{i \in \mathcal{N}}$, $(C_i, \sigma_i, \rho_i, d_i)_{i \in \mathcal{N}}$, $(C_f, \sigma_f, \rho_f)$; output: $\bar{d}_b$)

let $\pi : \mathcal{N} \to \mathcal{N}$ s.t. $\pi(i) < \pi(j) \Rightarrow d_{\pi(i)} \leq d_{\pi(j)}$ $\forall i,j \in \mathcal{N}$ find $q$ s.t. $[(d_{\pi(q)} \leq d_{b-1+a_{b-1}})$ or $(V_{\pi(q)} < C_f a_f)]$ and $[(d_{\pi(q+1)} \geq d_b + a_b)$ or $(V_{\pi(q+1)} \geq C_f a_f)]$ $$\bar{d}_b \leftarrow \frac{C_f a_f - c a_f + \sum_{i=1}^{b-1}(\sigma_i + \rho_i \cdot (a_f - d_i)) + \sum_{i=b, d_i \leq d_{\pi(q)}}^{N} \frac{C_i (a_f - d_i)}{C_i}}{c - \sum_{i=1}^{b-1} \rho_i - \sum_{i=b, d_i \leq d_{\pi(q)}}^{N} C_i}$$

return $\bar{d}_b$

FIG. 13

RESERVE_2 (input: $(W_i, V_i)_{i \in \mathcal{N}}, B, (C_f, \sigma_f, \rho_f, d_f)$; output: $(W_i, V_i)_{i \in \mathcal{N}}, B)$ 1505    $B \leftarrow B - \rho_f$ /* update of $(W_i)_i$ */

1510    for $i \leftarrow 1$ to $N$ do

1515      if $(d_f + a_f \leq d_i + a_i)$

1520        then $W_i \leftarrow W_i - (\sigma_f + \rho_f(d_i + a_i - d_f))$ 1525      else if $(d_f < d_i + a_i)$ 1530        then $W_i \leftarrow W_i - C_f(d_i + a_i - d_f)$ 1535    create variable $W_f$ 1540    let $b$ such that $d_{b-1} + a_{b-1} < d_f + a_f \leq d_b + a_b$ 1545    $W_f \leftarrow c(d_f + a_f) - \sum_{i=1}^{b-1}(\sigma_i + \rho_i(d_f + a_f - d_i)) - \sum_{\substack{i=b \\ d_i < d_f + a_f}}^{N} C_i(d_f + a_f - d_i) - C_f a_f$ /* update of $(V_i)_i$ */

1550    for $i \leftarrow 1$ to $N$ do

1555      if $(d_f + a_f \leq d_i)$

1560        then $V_i \leftarrow V_i - (\sigma_f + \rho_f(d_i - d_f))$

1565      else if $(d_f < d_i)$

1570        then $V_i \leftarrow V_i - C_f(d_i - d_f)$ 1575    create variable $V_f$ 1580    $V_f \leftarrow cd_f - \sum_{\substack{i=1 \\ d_i + a_i \leq d_f}}^{N}(\sigma_i + \rho_i(d_f - d_i)) - \sum_{\substack{i=1 \\ d_i < d_f < d_i + a_i}}^{N} C_i(d_f - d_i)$ 1585    insert flow $f$ with $d_f + a_f$ in ordered set $(d_i + a_i)_{i \in \mathcal{N}}$ 1590    insert flow $f$ with $d_f$ in ordered set $(d_{\pi(i)})_{i \in \mathcal{N}}$

FIG. 14

RELEASE_2 (input: $(W_i, V_i)_{i \in \mathcal{N}}, B, (C_f, \sigma_f, \rho_f, d_f)$; output: $(W_i, V_i)_{i \in \mathcal{N}}, B$)

1605  $B \leftarrow B + \rho_f$
      /* update of $(W_i)_i$ */
1610  for $i \leftarrow 1$ to $N$ do
1615    if $(d_f + a_f \le d_i + a_i)$
1620      then $W_i \leftarrow W_i + (\sigma_f + \rho_f(d_i + a_i - d_f))$
1625    else if $(d_f < d_i + a_i)$
1630      then $W_i \leftarrow W_i + C'_f(d_i + a_i - d_f)$
1635  destroy variable $W_f$
      /* update of $(V_i)_i$ */
1640  for $i \leftarrow 1$ to $N$ do
1645    if $(d_f + a_f \le d_i)$
1650      then $V_i \leftarrow V_i + (\sigma_f + \rho_f \cdot d_i - d_f))$
1655    else if $(d_f < d_i)$
1660      then $V_i \leftarrow V_i + C_f(d_i - d_f)$
1665  destroy variable $V_f$
1670  extract flow $f$ from ordered set $(d_i + a_i)_i$
1675  extract flow $f$ from ordered set $(d_{\pi(i)})_i$

FIG. 15

MINIMUM_DELAY_3 (input: $(W_i)_{i \in \mathcal{L}}, B, (e_i)_{i \in \mathcal{L}}, (C_f, \sigma_f, \rho_f)$;
output: $\bar{d}$)

1805    if $B \leq \rho_f$
1810      then exit "cannot accept flow $f$"
1815    $m_x \leftarrow 0; m_y \leftarrow 0$
1820    for $i = 1$ to $L$ do
1825      if $W_i \geq C_f a_f$
1830        then $x_i \leftarrow e_i - \frac{W_i - \sigma_f}{\rho_f}$
1835          $m_x \leftarrow \max(m_x, x_i)$
1840        else $y_i \leftarrow e_i - \frac{W_i}{C_f}$
1845          $m_y \leftarrow \max(m_y, y_i)$
1850    $m \leftarrow \max(m_x, m_y)$
1855    find $b$ s.t. $e_{b-1} < m + a_f \leq e_b$
1860    $\bar{d} \leftarrow (e_b - a_f)$
1865    return $\bar{d}$

FIG. 17

RESERVE_3 (input: $(W_i)_{i \in \mathcal{L}}, B, (e_i)_{i \in \mathcal{L}}, (C_f, \sigma_f, \rho_f, e_p)$;
output: $(W_i)_{i \in \mathcal{L}}, B$)

$B \leftarrow B - \rho_f$
/* update of $(W_i)_i$ */
for $i \leftarrow 1$ to $L$ do
   if $(e_p \leq e_i)$
     then $W_i \leftarrow W_i - \rho_f(e_i - e_p) - C_f a_f$
   else if $(e_p - a_f < e_i)$
     then $W_i \leftarrow W_i - C'_f(e_i - e_p + a_f)$

FIG. 18

RELEASE_3 (input: $(W_i)_{i \in \mathcal{L}}, B, (e_i)_{i \in \mathcal{L}}, (C_f, \sigma_f, \rho_f, e_p)$; output: $(W_i)_{i \in \mathcal{L}}, B$)

$B \leftarrow B + \rho_f$
/* update of $(W_i)_i$ */
for $i \leftarrow 1$ to $L$ do
   if $(e_p \leq e_i)$
     then $W_i \leftarrow W_i + \rho_f(e_i - e_p) + C_f a_f$
   else if $(e_p - a_f < e_i)$
     then $W_i \leftarrow W_i + C'_f(e_i - e_p + a_f)$

FIG. 19

MINIMUM_DELAY_4 (Input: $(W_l)_{1 \leq l \leq L}$, $B$, $(e_l)_{1 \leq l \leq L}$, $(C_f, \sigma_f, \rho_f)$;
Output: $\bar{d}_f$)

1  if $B \leq \rho_f$
2    then exit "cannot accept flow $f$"
3  for $i = 1$ to $L$ do
4    if $W_i \geq h_f$
5      then $x_i \leftarrow e_i - \frac{W_i - \sigma_f}{\rho_f}$
6      else $y_i \leftarrow e_i - \frac{W_i}{C_f}$
7  $m \leftarrow \max_{1 \leq i \leq L}((x_i)^+, (y_i)^+)$
8  find $b$ s.t. $e_b \leq m + a_f < e_{b+1}$
9  if $W_b < h_f < W_{b+1}$
10    then if $b = L$
11      then let $z$ such that $B = \frac{h_f - W_L}{z + a_f - e_L}$
12      else let $z$ such that $\frac{W_{b+1} - W_b}{e_{b+1} - e_b} = \frac{h_f - W_b}{z + a_f - e_b}$
13    else $z \leftarrow 0$
14 $\bar{d}_f \leftarrow \max(m, z)$

FIG. 22

RESERVE_4 (Input: $(W_l)_{1 \leq l \leq L}$, $B$, $(C_f, \sigma_f, \rho_f, d_f)$;
Output: $(W_l)_{1 \leq l \leq L}$, $B$)

1 CHOOSE_COVER_4 $((W_l)_{1 \leq l \leq L}, B, (C_f, \sigma_f, \rho_f, d_f); (\Delta W_{fl})_{1 \leq l \leq L}, \Delta B_f)$
2 for $l = 1$ to $L$ do
3    $W_l \leftarrow W_l - \Delta W_{fl}$
4    $B \leftarrow B - \Delta B_f$

FIG. 23

CHOOSE_COVER_4(Input: $(W_l)_{1 \leq l \leq L}$, $B$, $(C_f, \sigma_f, \rho_f, d_f)$;

Output: $(\Delta W_{fl})_{1 \leq l \leq L}$, $\Delta B_f$)

1    find $b$ such that $e_b \leq d_f + a_f < e_{b+1}$ 2    for $i = 1$ to $b - 1$ do 3      if $(e_i > d_f)$ 4        then $\Delta W_i \leftarrow C_f(e_i - d_f)$ 5    for $i = b + 2$ to $L$ do 6      $\Delta W_i \leftarrow \sigma_f + \rho_f(e_i - d_f)$ 7    if $b = L$ 8      then $\Delta W_{fL} \leftarrow \min(W_L, (\sigma_f + \rho_f(e_L - d_f))^+)$ 9        $\Delta B_f \leftarrow \max(\rho_f, \frac{h_f - \Delta W_{fL}}{d_f + a_f - e_L})$ 10    else $\Delta B \leftarrow \rho_f$ 11      let $\gamma$ such that $\frac{W_{b+1}}{e_{b+1} - \gamma} = \frac{W_b}{e_b - \gamma}$ 12      let $\beta \leftarrow \frac{h_f}{d_f + a_f - \gamma}$ 13      $\Delta W_{fb} \leftarrow \begin{cases} (\sigma_f + \rho_f(e_b - d_f))^+ & \text{if } \beta \leq \rho_f \\ (\beta(e_b - \gamma))^+ & \text{if } \rho_f < \beta < C_f \\ (C_f(e_b - d_f))^+ & \text{if } C_f \leq \beta \end{cases}$ 14      let $\Delta W'_{b+1}$ such that $\frac{h_f - \Delta W_{fb}}{d_f + a_f - e_b} = \frac{\Delta W'_{b+1} - \Delta W_{fb}}{e_{b+1} - e_b}$ 15      $\Delta W_{fb+1} \leftarrow \max(\Delta W'_{b+1}, \sigma_f + \rho_f(e_{b+1} - d_f))$

FIG. 24

RELEASE_4(Input: $(W_l)_{1 \leq l \leq L}$, $B$, $(\Delta W_{fl})_{1 \leq l \leq L}$, $\Delta B_f$;

Output: $(W_l)_{1 \leq l \leq L}$, $B$)

1    for $l = 1$ to $L$ do

2      $W_l \leftarrow W_l + \Delta W_{fl}$

3    $B \leftarrow B + \Delta B_f$

FIG. 25

MINIMUM_DELAY_6 (input: $(W_i)_{i \in \mathcal{N}}$, $B$, $(\sigma_i, \rho_i, d_i)_{i \in \mathcal{N}}$, $(\sigma_f, \rho_f)$; output: $\bar{d}$)

1  if $B \leq \rho_f$
2    then exit "cannot accept flow $f$"
3  $m_x \leftarrow 0$; $m_y \leftarrow 0$
4  for $i = 1$ to $N$ do
5    if $W_i \geq \sigma_f$
6      then $x_i \leftarrow d_i - \frac{W_i - \sigma_f}{\rho_f}$
7        $m_x \leftarrow \max(m_x, x_i)$
8      else $m_y \leftarrow \max(m_y, d_i)$
9  $m \leftarrow \max(m_x, m_y)$
10 $b \leftarrow 1$
11 while $(b \leq N)$ and $(m > d_b)$ do
12   $b \leftarrow b + 1$
13 if $[(b = N + 1)$ or $(W_b > \sigma_f)]$ and $[(b = 1)$ or $(W_{b-1} < \sigma_f)]$
14   then $\bar{d}_b \leftarrow \frac{\sigma_f + \sum_{i=1}^{b-1}(\sigma_i - \rho_i \cdot d_i)}{c - \sum_{i=1}^{b-1} \rho_i}$
15     $\bar{d} \leftarrow \max(m, \bar{d}_b)$
16   else $\bar{d} \leftarrow m$
17 return $\bar{d}$

FIG. 26

RESERVE_5(input: $(W_i)_{i \in \mathcal{N}}$, $B$, $(\sigma_g, \rho_g, d_g)$; output: $(W_i)_{i \in \mathcal{N}}$, $B$)

1  $B \leftarrow B - \rho_g$

2  /* update of $(W_i)_i$ */

3  for $i \leftarrow 1$ to $N$ do

4    if $(d_g \leq d_i)$

5      then $W_i \leftarrow W_i - (\sigma_g + \rho_g(d_i - d_g))$ 6  create variable $W_g$ 7  let $b$ such that $d_{b-1} < d_g \leq d_b$ 8  $W_g \leftarrow cd_g - \sum_{i=1}^{b-1}(\sigma_i + \rho_i(d_g - d_i)) - \sigma_g$ 9  insert flow $g$ with $d_g$ in ordered set $(d_i)_{i \in \mathcal{N}}$

FIG. 27

RELEASE_5 (input: $(W_i)_{i \in \mathcal{N}}$, $B$, $(\sigma_g, \rho_g, d_g)$; output: $(W_i)_{i \in \mathcal{N}}$, $B$)

1   $B \leftarrow B + \rho_g$
2   /* update of $(W_i)_i$ */
3   for $i \leftarrow 1$ to $N$ do
4     if $(d_g \leq d_i)$
5       then $W_i \leftarrow W_i + (\sigma_g + \rho_g(d_i - d_g))$
7   destroy variable $W_g$
8   extract flow $g$ from the ordered set $(d_i)_i$;

FIG. 28

MINIMUM_DELAY_6

1   if $B \leq \rho_f$ 2       then exit "cannot accept flow $f$"

3   $m_x \leftarrow 0; m_y \leftarrow 0$ 4   for $i = 1$ to $L$ do 5       if $W_i \geq \sigma_f$ 6           then $x_i \leftarrow e_i - \dfrac{W_i - \sigma_f}{\rho_f}$ 7              $m_x \leftarrow \max(m_x, x_i)$ 8           else $m_y \leftarrow \max(m_y, e_i)$ 9   $m \leftarrow \max(m_x, m_y)$ 10  $b \leftarrow 1$ 11  while $(b \leq L)$ and $(m > e_b)$ do 12        $b \leftarrow b + 1$ 13  if $b = L + 1$ 14     then exit "cannot accept flow $f$"

15     else $\bar{d} \leftarrow e_b$ 16        return $\bar{d}$

FIG. 29

RESERVE_6 (input: $(W_i)_{i\in\mathcal{L}}$, $B$, $(e_i)_{i\in\mathcal{L}}$, $(\sigma_g, \rho_g, e_p)$; output: $(W_i)_{i\in\mathcal{L}}$, $B$)

1    $B \leftarrow B - \rho_g$
2    /* update of $(W_i)_i$ */
3    for $i \leftarrow 1$ to $L$ do
4        if $(e_p \leq e_i)$
5           then $W_i \leftarrow W_i - \rho_g(e_i - e_p) - \sigma_g$

FIG. 30

RELEASE_6 (input: $(W_i)_{i\in\mathcal{L}}$, $B$, $(e_i)_{i\in\mathcal{L}}$, $(\sigma_a, \rho_q, e_p)$; output: $(W_i)_{i\in\mathcal{L}}$, $B$)

1    $B \leftarrow B + \rho_g$
2    /* update of $(W_i)_i$ */
3    for $i \leftarrow 1$ to $L$ do
4        if $(e_p \leq e_i)$
5           then $W_i \leftarrow W_i + \rho_g(e_i - e_p) + C_g a_g$

FIG. 31

MINIMUM_DELAY_7 (Input: $(W_l)_{1 \leq l \leq P}$, $(V_i)_{1 \leq i \leq N}$, $B$, $((\sigma_{ij}, \rho_{ij})_{1 \leq j \leq n_i}, d_i)_{1 \leq i \leq N}$, $(\sigma_{fj}, \rho_{fj})_{1 \leq j \leq n_f}$;

Output: $\bar{d}_f$)

1   if $B \leq \rho_{fn_f}$
2     then exit "cannot accept flow $f$"
3   for $l = 1$ to $P$ do
4     find $k$, $1 \leq k \leq n_f$ such that $h_{fk-1} \leq W_l < h_{fk}$
5     $x_l \leftarrow u_l - \frac{W_l - \sigma_{fk}}{\rho_{fk}}$
6   $m_x \leftarrow \max_{1 \leq l \leq P}(x_l)^+$
7   for $k = 1$ to $n_f - 1$ do
8     find $l_k$ such that $u_{l_k} \leq \sum_f m_x + a_{fk} < u_{l_k+1}$, with $u_{l_k}, u_{l_k+1} \in \overline{\mathcal{P}}$
9     if $W_{l_k} < h_{fk} < W_{l_k+1}$
10      then COMPUTE_$\mathcal{L}(l_k, (V_i)_{1 \leq i \leq N}, ((\sigma_{ij}, \rho_{ij})_{1 \leq j \leq n_i}, d_i)_{1 \leq i \leq N}, (\sigma_{fj}, \rho_{fj})_{1 \leq j \leq n_f}; z_k)$
11     else $z_k \leftarrow 0$
12 $m_z \leftarrow \max_{1 \leq k \leq n_f - 1}(z_k)^+$
13 $\bar{d}_f \leftarrow \max(m_x, m_z)$

FIG. 34

COMPUTE_z(Input: $l_k$, $(V_i)_{1 \leq i \leq N}$, $((\sigma_{ij}, \rho_{ij})_{1 \leq j \leq n_i}, d_i)_{1 \leq i \leq N}$, $(\sigma_{fj}, \rho_{fj})_{1 \leq j \leq n_f}$;

Output: $z_k$)

1 find $q$, $0 \leq q \leq N$ such that $(d_q \leq u_{l_k}$ or $V_q \leq h_{fk})$ and $(d_{q+1} \geq u_{l_k+1}$ or $V_{q+1} > h_{fk})$ 2 $z_k \leftarrow \dfrac{h_{fk} - c a_{fk} + \sum_{i=1}^{q} \sum_{j=1}^{n_i} (\sigma_{ij} + \rho_{ij}(a_{fk} - d_i)) \delta_{ij}(u_{l_k} - d_i)}{c - \sum_{i=1}^{q} \sum_{j=1}^{n_i} \rho_{ij} \delta_{ij}(u_{l_k} - d_i)}$

FIG. 35

RESERVE_7 (Input: $(W_l)_{1\leq l\leq P}, (V_i)_{1\leq i\leq N}, B, ((\sigma_{ij},\rho_{ij})_{1\leq j\leq n_i})_{1\leq i\leq N}, ((\sigma_{fj},\rho_{fj})_{1\leq j\leq n_f}, d_f)$;
Output: $(W_l)_{1\leq l\leq P}, (V_i)_{1\leq i\leq N}, B)$ 1  $B \leftarrow B - \rho_f n_f$
2  /* update of $(W_l)_{1\leq l\leq P}$ */
3  for $l = 1$ to $P$ do
4    find $k$, $1 \leq k \leq n_f$ such that $d_f + a_{f,k-1} \leq u_l < d_f + a_{fk}$
5    $W_l \leftarrow W_l - (\sigma_{fk} + \rho_{fk}(u_l - d_f))$
6  for $k = 1$ to $n_f - 1$ do
7    create variable $W_{fk}$
8    $W_{fk} \leftarrow c(d_f + a_{fk}) - (\sigma_{fk} + \rho_{fk}a_{fk}) - \sum_{i=1}^{N}\sum_{j=1}^{n_i}(\sigma_{ij} + \rho_{ij}(d_f + a_{fk} - d_i))\delta_{ij}(d_f + a_{fk} - d_i)$
9  for $k = 1$ to $n_f - 1$ do
10   insert $d_f + a_{fk}$ in ordered set $\mathcal{P}$
11   let $l_k$ be the index of $d_f + a_{fk}$ in $\mathcal{P}$
12   relabel $W_{fk}$ to $W_{l_k}$
13 /* update of $(V_i)_{1\leq i\leq N}$ */
14 for $i = 1$ to $N$ do
15   find $k$, $1 \leq k \leq n_f$ such that $d_f + a_{f,k-1} \leq d_i < d_f + a_{fk}$
16   $V_i \leftarrow V_i - (\sigma_{fk} + \rho_{fk}(d_i - d_f))$
17 create variable $V_f$
18 $V_f \leftarrow cd_f - \sum_{i=1}^{N}\sum_{j=1}^{n_i}(\sigma_{ij} + \rho_{ij}(d_f - d_i))\delta_{ij}(d_f - d_i)$
19 insert $d_f$ in ordered set $\mathcal{Q}$
20 let $l$ be the index of $d_f$ in $\mathcal{Q}$
21 relabel $V_f$ to $V_l$

FIG. 36

RELEASE_7 (Input: $(W_l)_{1 \leq l \leq P}, (V_i)_{1 \leq i \leq N}, B, ((\sigma_{ij}, \rho_{ij})_{1 \leq j \leq n_i}, d_i)_{1 \leq i \leq N}, ((\sigma_{fj}, \rho_{fj})_{1 \leq j \leq n_f}, d_f)$;

Output: $(W_l)_{1 \leq l \leq P}, (V_i)_{1 \leq i \leq N}, B)$

1  $B \leftarrow B + \rho_{fn_f}$
2  /* update of $(W_l)_{1 \leq l \leq P}$ */
3  for $l = 1$ to $P$ do
4    find $k, 1 \leq k \leq n_f$ such that $d_f + a_{fk-1} \leq u_l < d_f + a_{fk}$
5    $W_l \leftarrow W_l + (\sigma_{fk} + \rho_{fk}(u_l - d_f))$
6  for $k = 1$ to $n_f - 1$ do
7    let $l_k$ be the index of $d_f + a_{fk}$ in $\mathcal{P}$
8    destroy variable $W_{l_k}$
9  /* update of $(V_i)_{1 \leq i \leq N}$ */
10 for $i = 1$ to $N$ do
11   find $k, 1 \leq k \leq n_f$ such that $d_f + a_{fk-1} \leq d_i < d_f + a_{fk}$
12   $V_i \leftarrow V_i + (\sigma_{fk} + \rho_{fk}(d_i - d_f))$
13 let $l$ be the index of $d_f$ in $\mathcal{Q}$
14 destroy variable $V_l$

FIG. 37

MINIMUM_DELAY_8 (Input: $(W_l)_{1 \leq l \leq L}$, $B$, $(e_l)_{1 \leq l \leq L}$, $(\sigma_{fk}, \rho_{fk})_{1 \leq k \leq n_f}$;
Output: $\bar{d}_f$)

1    if $B \leq \rho_{fn_f}$
2       then exit "cannot accept flow $f$"
3    for $l = 1$ to $L$ do
4       find $k$, $1 \leq k \leq n_f$ such that $h_{fk-1} \leq W_l < h_{fk}$
5       $x_l \leftarrow e_l - \frac{W_l - \sigma_{fk}}{\rho_{fk}}$
6    $m_x \leftarrow \max_{1 \leq l \leq L}(x_l)^+$
7    for $k = 1$ to $n_f - 1$ do
8       find $l_k$ such that $e_{l_k} \leq m_x + a_{fk} < e_{l_k+1}$
9       if $W_{l_k} < h_{fk} < W_{l_k+1}$
10          then if $l_k = L$ ,
11              then let $z_k$ such that $B = \frac{h_{fk} - W_L}{z_k + a_{fk} - e_L}$
12              else let $z_k$ such that: $\frac{W_{l_k+1} - W_{l_k}}{e_{l_k+1} - e_{l_k}} = \frac{h_{fk} - W_{l_k}}{z_k + a_{fk} - e_{l_k}}$
13          else $z_k \leftarrow 0$
14 $m_z \leftarrow \max_{1 \leq k \leq n_f - 1}(z_k)^+$
15 $\bar{d}_f \leftarrow \max(m_x, m_z)$

FIG. 38

CHOOSE_COVER_8(Input: $(W_l)_{1 \leq l \leq L}, B, ((\sigma_{fk}, \rho_{fk})_{1 \leq k \leq n_f}, d_f)$;

Output: $(\Delta W_{fl})_{\leq l \leq L}, \Delta B_f)$ 1  for $k = 1$ to $n_f - 1$ do
2     find $l_k$ such that $e_{l_k} \leq d_f + a_{fk} < e_{l_k+1}$
3  for $i = 1$ to $L$ do
4     if $i \neq l_k, l_k + 1, 1 \leq k \leq n_f - 1$
5       then find $s, 1 \leq s \leq n_f - 1$ such that $d_f + a_{fs-1} \leq e_i < d_f + a_{fs}$
6         $\Delta W_{fi} \leftarrow \sigma_{fs} + \rho_{fs}(e_i - d_f)$
7         if $i = L$
8           then $\Delta B_f \leftarrow \rho_{fn_f}$
9  for $k = 1$ to $n_f - 1$ do
10    if $l_k = L$
11      then $\Delta W_L^k \leftarrow \min(W_L, (\sigma_{fk} + \rho_{fk}(e_L - d_f))^+)$
12      else let $\gamma_k$ such that $\frac{W_{l_k+1}}{e_{l_k+1} - \gamma_k} = \frac{W_{l_k}}{e_{l_k} - \gamma_k}$
13        $\beta_k \leftarrow \frac{h_{fk}}{d_f + a_{fk} - \gamma_k}$
14        $\Delta W_{l_k}^k \leftarrow \begin{cases} (\sigma_{fk} + \rho_{fk}(e_{l_k} - d_f))^+ & \text{if } \beta_k \leq \rho_{fk} \\ (\beta_k(e_{l_k} - \gamma_k))^+ & \text{if } \rho_{fk} < \beta_k < \rho_{fk-1} \\ (\sigma_{fk-1} + \rho_{fk-1}(e_{l_k} - d_f))^+ & \text{if } \rho_{fk-1} \leq \beta_k \end{cases}$
15        let $\Delta W'_{l_k+1}$ such that $\frac{h_{fk} - \Delta W_{l_k}^k}{d_f + a_{fk} - e_{l_k}} = \frac{\Delta W'_{l_k+1} - \Delta W_{l_k}^k}{e_{l_k+1} - e_{l_k}}$
16        $\Delta W_{l_k+1}^k \leftarrow \max(\sigma_{fk} + \rho_{fk}(e_{l_k+1} - d_f), \Delta W'_{l_k+1})$
17 for $i = 1$ to $L$ do
18    if $\Delta W_i^k$ is defined for any $k$
19      then $\Delta W_{fi} \leftarrow \max_k \Delta W_i^k$
20        if $i = L$
21          then $\Delta B_f \leftarrow \max(\rho_{fn_f}, \frac{h_{fL-1} - \Delta W_{fL}}{d_f + a_{fL-1} - e_L})$

FIG. 39

RESERVE_8 (Input: $(W_l)_{1 \leq l \leq L}$, $B$, $((c_{fk}, \rho_{fk})_{1 \leq k \leq n_f}, d_f)$;

Output: $(W_l)_{1 \leq l \leq L}$, $B$)

1  CHOOSE_COVER($(W_l)_{1 \leq l \leq L}$, $B$, $((\sigma_{fk}, \rho_{fk})_{1 \leq k \leq n_f}, d_f)$;$(\Delta W_{fl})_{1 \leq l \leq L}$, $\Delta B_f$)

2  for $l = 1$ to $L$ do

3      $W_l \leftarrow W_l - \Delta W_{fl}$

4  $B \leftarrow B - \Delta B_f$ 5  reorder $(W_l)_{1 \leq l \leq L}$ in non-decreasing order

FIG. 40

RELEASE_8 (Input: $(W_l)_{1 \leq l \leq L}$, $B$, $(\Delta W_{fl})_{1 \leq l \leq L}$, $\Delta B_f$;

Output: $(W_l)_{1 \leq l \leq L}$, $B$)

1  for $l = 1$ to $l$ do

2      $W_l \leftarrow W_l + \Delta W_{fl}$ 3  reorder $(W_l)_{1 \leq l \leq L}$ in non-decreasing order 4  $B \leftarrow B + \Delta B_{f'}$

FIG. 41

FLOW ADMISSION CONTROL FOR A ROUTER

STATEMENT AS TO FEDERALLY SPONSORED RESEARCH

National Science Foundation, under Grant NCR-95-08274, supported the work from which this invention developed.

BACKGROUND

This invention relates to flow admission control for a network router, switch, bridge, gateway, or any other network component which receives and then forwards data.

Computer networks, such as the Internet, are increasingly required to support transmission of one way or two way realtime data such as video and audio data. Such transmissions may serve a variety of ends, from providing health care to operating businesses to providing entertainment. In such transmissions, a sender application transmits audio or video data over a period of time (hereinafter referred to as a "flow") to a receiver application. Since computer networks are generally implemented as packet switched networks, flows are generally a string of packets transmitted over a period of time.

When transmitting a flow that represents a realtime event such as an audio or video event, the packets in the flow must be delivered in a timely manner. Since each packet contains data as to a segment of the event, each packet in the flow must arrive so that it can be processed, for audio or video broadcast to the user, immediately after the previous packet has been processed. If not, there will be a lag in the timeline of the reconstructed audio or video event. The reconstructed audio or video event would as a result appear as "jumpy" and not continuous.

One manner of implementing timely delivery of packets is to require that each packet in a flow not be delayed beyond a predetermined amount, referred to hereinafter as the "delay bound". A flow that has a delay bound may be referred to as a "bounded delay flow".

SUMMARY

In one aspect, the invention concerns a method for performing admission flow control at a network component. A function $F(t)$ is provided which characterizes resources available at the network component. Information characterizing a proposed flow is received. An envelope $A(t)$ is defined based on the received information. It is then attempted to fit the envelope within $F(t)$ and the flow is accepted or rejected based on the attempt to fit the envelope.

Preferred embodiments may include one or more of the following features.

The attempting to fit the envelope $A(t)$ within $F(t)$ includes performing a stability test using $A(t)$ and $F(t)$. Fitting $A(t-t_d)$ within $F(t)$ includes finding a minimum $t_d$ for which $A(t-t_d) \leq F(t)$ for all t. $A(t)$ is an n-rate function, where n is a positive integer. $F(t)$ is $F(t)=ct-$ $$F(t) = ct - \sum_{i \in N} A^*_i(t - t_i),$$

$A^*_i(t-t_i)$, where c is a rate characterizing the total capacity of the network component, N is an integer, $A^*_i(t)$ is a function characterizing a flow i which the network component has accepted, and $t_i$ is a maximum delay that the network component has guaranteed for the flow $A^*(t)$.

A plurality of discrete time values are defined. Fitting the envelope $A(t-t_d)$ includes constraining a certain characteristic of $A(t-t_d)$, namely its flex point, to fall on one of the discrete time values. The discrete times are defined at equal intervals or unequal intervals.

Another envelope $A°(t)$ may be defined based on the received information characterizing the proposed flow of packets, where $A°(t) \geq A(t)$ for all t. A certain characteristic of $A°(t-t_d)$, namely a flex point of the envelope, is constrained to fall on one of the discrete time values.

The network component may be a switch, a router, a bridge, or a gateway. The network component may use an Early Deadline First scheduling policy, which may be a preemptive or a non-preemptive Early Deadline First scheduling policy.

In another aspect, the invention concerns a method for performing admission flow control at a network component. A function $F(t)$ is provided which characterize resources available at the network component. Information characterizing a proposed flow is received and used to define an envelope $A(t)$. The envelope $A(t-t_d)$ is then fitted within $F(t)$ so that $A(t-t_d) \leq F(t)$ for all t>0, where $t_d$ represents a delay for the flow $A(t)$. Based on $t_d$, a maximum delay that any packet from the proposed flow will experience at the network component is guaranteed.

In yet another aspect, the invention concerns a network component which receives and forwards packets. The network component comprises a queue, a central processing unit, a computer readable medium, and a program stored in the computer readable medium. The queue temporarily stores received packets prior to forwarding them. The program when executed by the central processing unit causes the central processing unit to provide a function $F(t)$ which characterizes resources available at the network component. The CPU also defines an envelope $A(t)$ based on received information characterizing a proposed flow of packets. The CPU then fits the envelope $A(t-t_d)$ within $F(t)$ so that $A(t-t_d) \leq F(t)$ for all t>0, where $t_d$ represents a delay for the flow $A(t)$. The CPU, based on $t_d$, guarantees a maximum delay that any packet from the proposed flow will experience in the queue.

In another aspect, the invention concerns a network component which receives and forwards packets. The network component includes a queue ir which received packets are stored prior to forwarding them. The network also includes means for providing a function $F(t)$ which characterizes resources available at the network component and also means for receiving information characterizing a proposed flow of packets. The network component further includes means for defining an envelope $A(t)$ based on the received information characterizing the proposed flow of packets. The network additionally inc9udes means for fitting the envelope $A(t-t_d)$ within $F(t)$ so that $A(t-t_d) \leq F(t)$ for all t>0, where $t_d$ represents a delay for the flow $A(t)$. The network component also includes means for guaranteeing, based on $t_d$, a maximum delay that any packet from the proposed flow will experience in the queue.

In another aspect, the invention concern a program stored on a computer readable medium. The program when executed by a central processing unit causes the central processing unit to provide a function $F(t)$ which characterizes resources available at a network component. The CPU also defines an envelope $A(t)$ based on received information characterizing a proposed flow of packets. The CPU then fits the envelope $A(t-t_d)$ within $F(t)$ so that $A(t-t_d) \leq F(t)$ for all t>0, where $t_d$ represents a delay for the flow $A(t)$. Based on $t_d$, the CPU guarantee a maximum delay that any packet from the proposed flow will experience in the network component.

Advantages of the invention may include one or more of the following. The invention allows network components to support bounded delay flows efficiently. Network components can determine whether a flow can be accepted and, if so, guarantee an upperbound on the maximum delay experienced by the packets in that flow. Network components can also provide the minimum of all such upperbounds, while allocating the resources at the output ports efficiently. Different embodiments of the invention provide different advantages. Some optimize the reservation of resources at the output ports while others increase the speed of computing the guaranteed upperbounds. The invention can be used in small local networks or large networks (e.g. the Internet), or even in segments of such networks.

The invention may be implemented in hardware or software, or a combination of both. Preferably, the technique is implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other advantages and features will become apparent from the following description and from the claims.

BRIEF DESCRIPTION OF THE DRAWING

FIGS. 10–11 show pseudocode for a first embodiment of the procedures used in flow admission control component.

FIGS. 12–15 show pseudocode for a second embodiment of the procedures used in flow admission control component.

FIGS. 17–19 show pseudocode for a third embodiment of the procedures used in flow admission control component.

FIGS. 22–25 show pseudocode for a fourth embodiment of the procedures used in flow admission control component.

FIGS. 26–28 show pseudocode for a fifth embodiment of the procedures used in flow admission control component.

FIGS. 29–31 show pseudocode for a sixth embodiment of the procedures used in flow admission control component.

FIGS. 34–37 show pseudocode for a seventh embodiment of the procedures used in flow admission control component.

FIGS. 38–41 show pseudocode for an eighth embodiment of the procedures used in flow admission control component.

BRIEF DESCRIPTION OF THE APPENDIX

Figure 1:
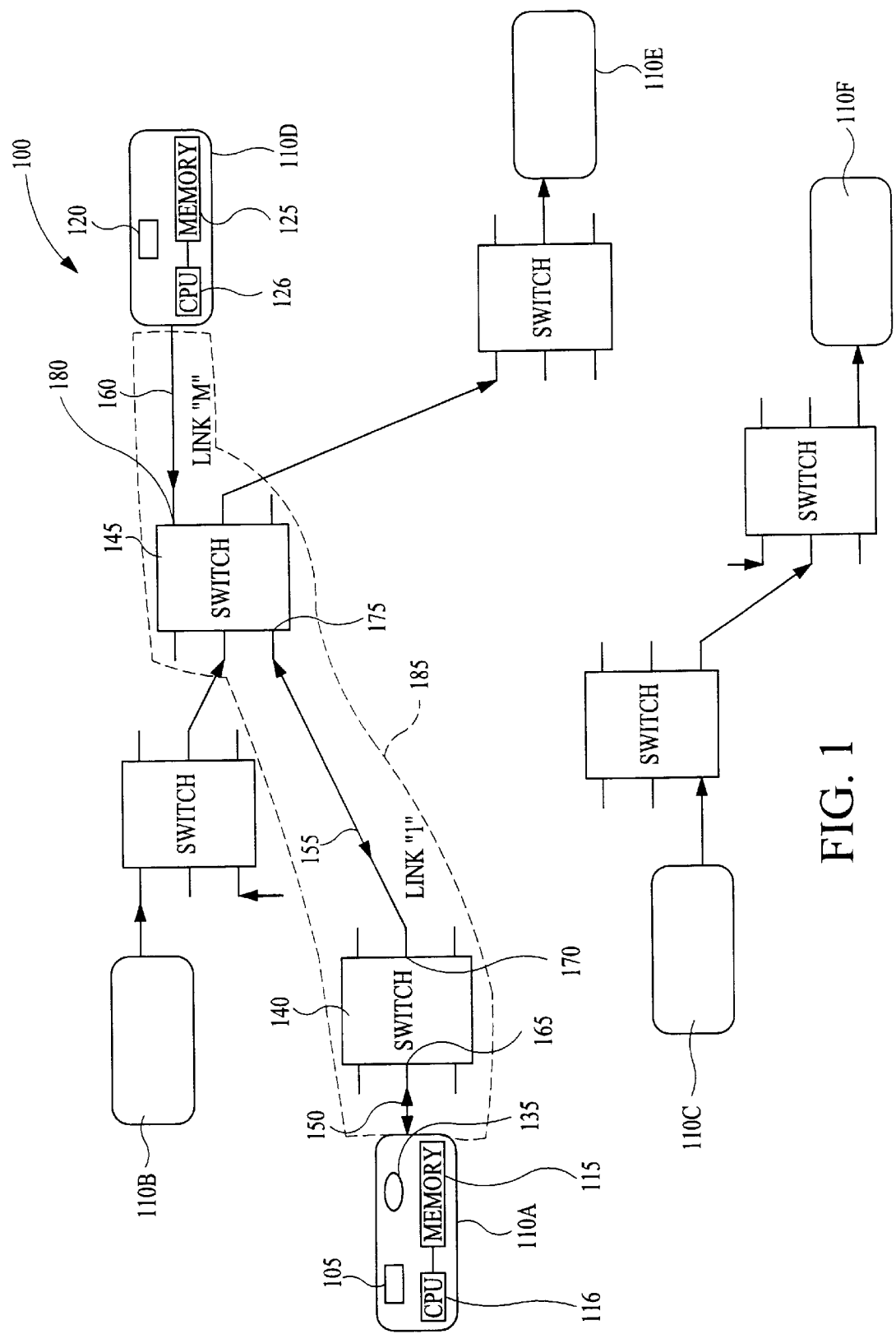
FIG. 1 shows a block diagram of a computer network.

Lemma 1 and Theorem 1 show the formal proof for calculation of minimum guaranteeable queuing delay.

Theorem 2 in the Appendix gives the formal solution for computing the minimum guaranteeable queuing delay in the third embodiment of the invention.

Theorem 3 in the Appendix gives the formal solution for computing the minimum guaranteeable queuing delay in the fourth embodiment of the invention.

Theorem 4 in the Appendix gives the formal solution for computing the minimum guaranteeable queuing delay in the fifth embodiment.

Theorem 5 in the Appendix gives the formal solution for computing the minimum guaranteeable queuing delay in the sixth embodiment.

Theorem 6 in the Appendix gives the formal solution for computing the minimum guaranteeable queuing delay in the seventh embodiment.

Theorem 7 in the Appendix gives the formal solution for computing the minimum guaranteeable queuing delay in the eighth embodiment.

DESCRIPTION

Briefly stated, according to the described embodiments, prior to using a network to transmit a bounded delay flow, a sender and/or a receiver application obtains from the network a minimum guaranteeable end-to-end delay. By providing this delay, the network guarantees that the overall delay experienced by each packet in the flow when transmitted by the network will not be more than the minimum guaranteeable end-to-end delay. We define a minimum guaranteeable delay as a delay guarantee that has two attributes. First, it is an upperbound on the delay that a packet may experience. Second, it is the minimum of all upperbounds that can be guaranteed (i.e. minimum of all upperbounds that are guaranteeable).

The minimum guaranteeable end-to-end delay equals the sum of all minimum guaranteeable router delays at routers in the path of the flow across the network. A minimum guaranteeable router delay, like the minimum guaranteeable end-to-end delay, is the minimum of all upperbounds on the delay a router can guarantee to packets in a flow.

The minimum guaranteeable router delay for each router equals the sum of three delays. The first delay is the router delay, which is the time it takes for the router to transfer the packet from an input port which receives the packet to an output port. An output port is a port which transmits packets to the next destination in their paths. The second delay is the minimum guaranteeable queuing delay. The queuing delay is the period of time a packet waits at the output port to be transmitted. The minimum guaranteeable queuing delay is the minimum of all possible upperbounds on the queuing delay that the router can guarantee to the packets in a flow. The third delay is the propagation delay of the outgoing link which is the time it takes for the packets in the flow to travel across the link connecting the output port to the next router in the path of the flow. The router and link propagation delays are typically constant, while the queuing delay is variable.

To obtain the minimum guaranteeable end-to-end delay from the network, one or both of the sender and receiver applications supplies the network with information regarding an envelope $A^*(t)$ characterizing the resources required for transmitting the flow. Which of the applications provides this information depends on the network protocols used in implementing the network. In both ATM (Asynchronous Transfer Mode) and RSVP Qos (RSVP with Quality of Service) network protocols, the sender application supplies this information. The network then uses envelope $A^*(t)$ to compute the minimum guaranteeable end-to-end delay, by computing the minimum guaranteeable router delay at each router in the path of the flow and then summing these delays. (While the "network" is described as performing various functions, it should be noted that it is the components of the network that perform any function attributed to the network. In the described embodiment of a network below, the routers, in a distributed manner, perform the functions attributed to the network. In other computer networks, the functions may be performed by a central authority, such as a dedicated server, or by switches at the gateways or points of entry into the network).

To compute the minimum guaranteeable router delay at a router, the router executes admission flow control procedures which compute this delay. These procedures are implemented in code and run on a central processing unit at the router. In accordance with these procedures, the router first computes the minimum guaranteeable queuing delay at the output port which will transmit the packets in the flow. The router then adds the constant values for the router delay and outgoing link propagation delay to the minimum guaranteeable queuing delay.

For computing the minimum guaranteeable queuing delay, the router uses a function $F(t)$ which specifies the available resources (i.e., work or load capacity), in a worst case scenario, at the output port. The router fits envelope $A^*(t)$ of the new flow within $F(t)$ such that, if the new flow is accepted, the output port will have enough resources to transmit the new flow and all the already accepted flows. If the envelope does not fit within $F(t)$, the flow is rejected. If the envelope fits within $F(t)$, the router determines the earliest t when the envelope fits within $F(t)$. This t is the minimum guaranteeable queuing delay for the new flow.

If the minimum guaranteeable end-to-end delay meets the requirements of the sender or the receiver application, the sender and receiver applications enter into a contract of service with the network for transmitting the flow. The delay required by an application depends on the function performed by that application. In interactive audio/video conversations, for example, delays of more than 0.5 s are not acceptable. In one way audio/video transmissions, however, longer delays may be tolerated.

Which one of the applications sets the requirements for acceptable minimum guaranteeable end-to-end delay depends on the protocol implemented at the network. For example, in the case of RSVP Qos protocol, the receiver application determines whether the minimum guaranteeable end-to-end delay is acceptable. In the case of the ATM signalling protocol, the sender application sets the requirements at the outset by supplying the network with the maximum value of the delay which would be acceptable to the sender application. In both these cases, resources are reserved at each router to ensure the router will meet the delay requirements of the application. This delay may be greater than or equal to the minimum guaranteeable end-to-end delay.

If the sender and receiver applications enter into a contract of service with the network, the sender application begins to transmit the packets in the flow. The network then delivers these packets to the receiver application, within the delay requirements of the applications.

Figure 2:
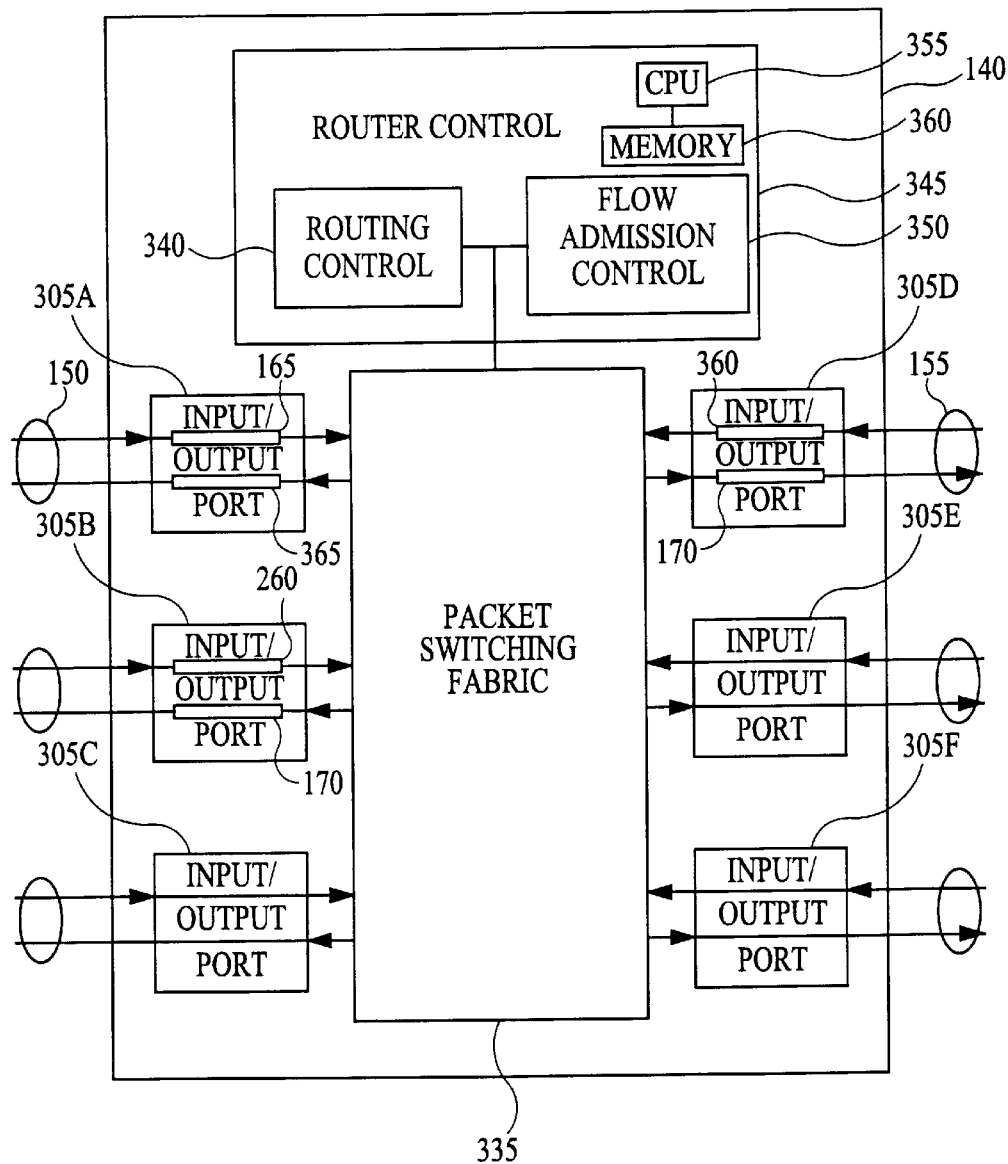
FIG. 2 shows a block diagram of a router in a computer network.
Figure 3:
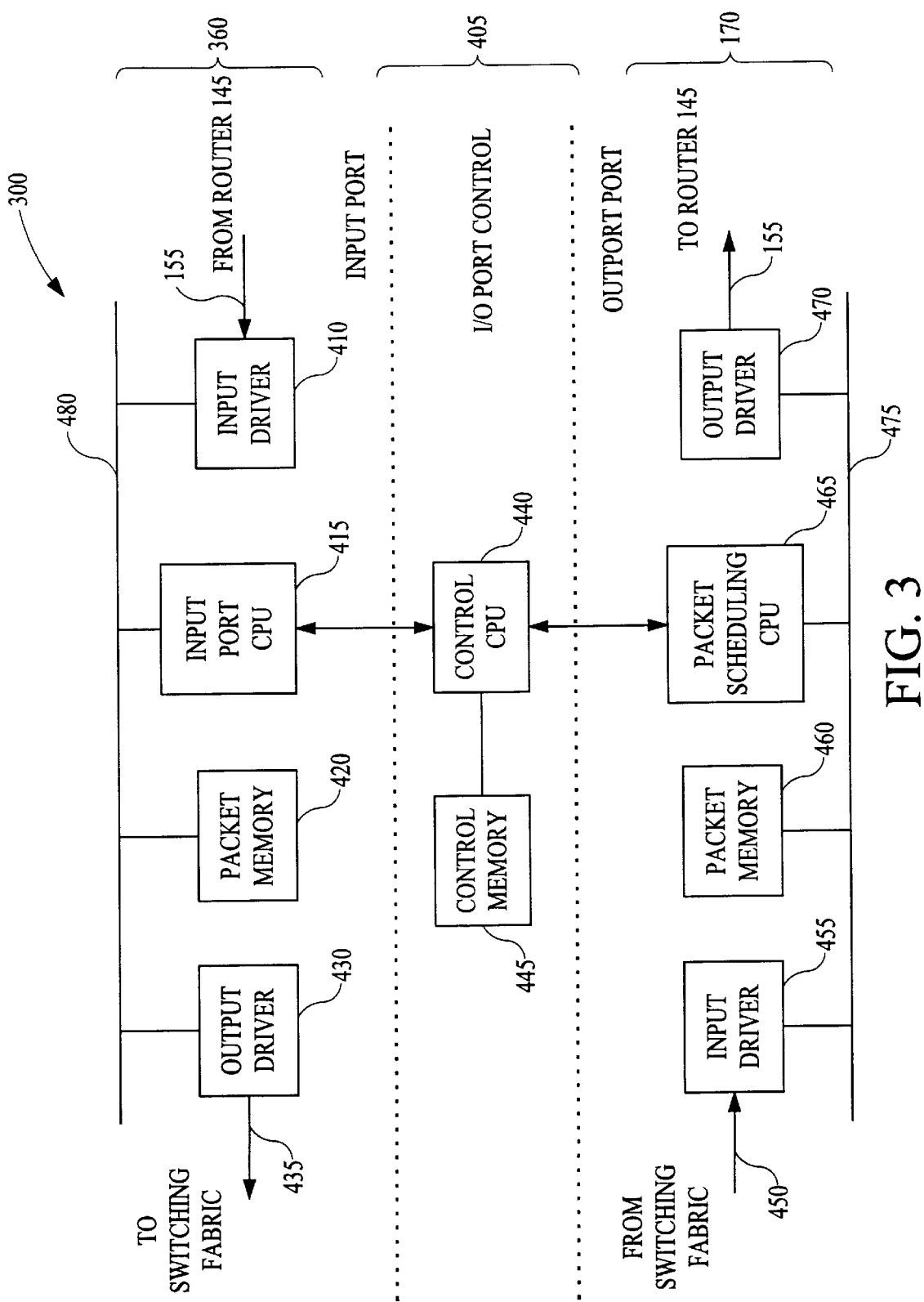
FIG. 3 shows a schematic diagram of an input/output port.

As an aid to describing the flow admission control procedures used to compute the minimum guaranteeable router delay, we shall refer to a specific packet-switched computer network (see FIG. 1) and a router in that network (see FIGS. 2–3). It should be understood that both the network topology and the router which we have selected are illustrative. A typical network in which the flow admission control procedures may be implemented, e.g. the Internet, is much larger and more complex than this simple example. In addition, the selected router is also merely illustrative of any network component which receives and transmits packets in the network, e.g. switches, bridges, gateways, etc.

Network 100 supports data communication between a number of host computers 110A–110F. Each host computer 110A–110F includes a Central Processing Unit (CPU) and a memory unit. A sender application 105, implemented by code and stored in a memory unit 115 of host computer 110A, is executed by a CPU 116 of host computer 110A. A receiver application 120, implemented by code and stored in a memory unit 125 of host computer 110D, is executed by a CPU 126 of host computer 110D. Sender application 105 transmits a packet 135 via routers 140 and 145 to receiver application 120. Packet 135 may be a packet belonging to a bounded delay flow. Packet 135 may also be a control message used for determining the minimum guaranteeable end-to-end delay, as will be described in detail below. A link 150 connects sender application 105 to router 140, a link 155 connects router 140 to router 145, and a link 160 connects router 145 to receiver application 120. These links may be, for example, implemented by fibre optics, cable, satellite communication, or twisted pair.

In this example, links 150, 155, and 160 form a path 185 between sender application 105 and receiver application 120 in network 100. The transmission of a packet 135 from sender application 105 to receiver application 135 begins by sender application 105 sending packet 135 over link 150 to router 140. Router 140 receives packet 135 at an input port 165 and routes the packet to an appropriate output port 170 where the packet is queued. Output port 170 sends packet 135 across link 155 to an input port 175 of router 145 which, in turn, routes packet 135 to an appropriate output port 180 where the packet is again queued. Output port 180 then sends packet 135 to receiver application 120. Receiver application 120 then processes packet 135.

Referring also to FIG. 2, the structure of router 140 will now be described in detail as an example of the routers in network 100. Router 140 has a number of input/output (I/C) ports 305A–305F. In this example, I/O port 305A is connected to link 150 and I/O port 305D is connected to link 155. I/O port 305A includes output port 365 and an input port 165. I/O port 305D in turn includes output port 170 and an input port 360. A packet switching fabric 335, which may be implemented by a cross-point switch or some other arrangement of switches, routes packets among I/O ports 305A–305F.

A router control module 345, which includes a routing control component 340 and a flow admission control component 350, controls the operation of the router. The routing control component controls the operation of the switching fabric. The flow admission control component generally determines whether a new flow can be accepted at any of the output ports in I/O ports 305A-305F and reserves appropriate resources for that flow, as will be described in detail below. Router control module 340 includes a Central Processor Unit (CPU) 355 and a memory 360. Routing control component 340 and flow admission control component 350 are both implemented by code that is stored in memory 360 and executed by CPU 355. In other embodiments, these components may be implemented in hardware, such as dedicated processing circuits where the components are implemented in the circuitry.

FIG. 3 shows an illustrative embodiment of I/O port 305D which could also be used for implementing I/O ports 305A–C and 305E–F. I/O port 305D includes an input port 360, output port 170, and an I/O port control 405. Input port 360 includes an input driver 410 connected to link 155 for receiving packets from router 145 (not shown). Input driver 410 writes received data into an input port memory 420. An input port CPU 415 controls the operation of input driver 410 and output driver 430. An output driver 430 forwards packets destined for other I/O ports via a line 435 to switching fabric 335. Input driver 410, input port CPU 415, packet memory 420, and output driver 430 communicate with each other over a bus 480. Output port 170 includes an input driver 455 connected via a line 450 to switching fabric 335. Input driver 455 writes packets received from switching fabric 335 in an output memory 460. A packet scheduling CPU 465 drives an output driver 470 to send packets to router 145 over link 155. I/O port control 405 includes a control memory 44D and a control CPU 440, that controls the operation of input port CPU 415. Control CPU 440 performs processing functions including determining which output port within router 140 a packet is to be routed to, tagging the packet with routing information to route the packet to the appropriate output port, and processing control packets containing data for I/O port 170. Packet scheduling CPU 465 schedules packets queued in the queue according to an Early Deadline First (EDF) scheduling policy for transmission by the output driver. The operation of packet scheduling CPU 465 will be described further below.

To better understand how the described embodiments compute the minimum guaranteeable delay for transmission of the packets in a flow, the delays that affect the transmission of packet 135 across the network will be first described. As previously discussed, there are generally three kinds of delays in transmission of a packet across a path: link propagation delays, router delays, and output port queuing delays. Link propagation delays and router delays are generally constant. A link propagation delay depends on various factors such as the length of the link, the speed of transmission of data through the link, and the bandwidth of the link. A router delay, in turn, depends on the characteristics of the router which are constant.

In contrast, the queuing delay is variable. It depends on the scheduling policy implemented by a scheduler (e.g. packet scheduling CPU 465 FIG. 3) in the output port and the load on the output port. Generally, when a packet is transferred to an output port (e.g., output port 170), it is placed in a queue (i.e. a waiting area) until it is transmitted in accordance with the scheduling policy of a scheduler at the output port. The queue is commonly implemented using a computer memory (as in packet memory 460 in FIG. 3) in which the packets are stored. Typically, there may be hundreds of packets queued at an output port. Therefore, the period of time a packet remains in the queue before being transmitted (that is, the queuing delay for a packet) will depend on the number of packets in the queue and the scheduling policy of the scheduler.

The scheduling policy of a scheduler determines the order in which the scheduler selects the queued packets for transmission. In the described embodiment, the schedulers in the routers in network 100 schedule the packets for transmission according to an Early Deadline First (EDF) scheduling policy. To implement the EDF scheduling policy, a scheduler assigns a deadline to each packet that equals the sum of the arrival time, the router delay, and the longest permitted queuing delay for that packet. The scheduler then schedules the packet in the queue that has the earliest deadline to be Transmitted first.

The EDF scheduling policy implemented by the schedulers in the described embodiment is a preemptive EDF scheduling policy. In preemptive EDF scheduling policy, when a packet with an earlier deadline arrives prior to the output port finishing transmitting a packet with a later deadline, the transmission of the packet is interrupted so as to permit the transmission of the newly arrived packet. (In case of a non-preemptive EDF scheduling policy, the transmission that is in progress is completed prior to transmitting the newly arrived packet with an earlier deadline.) As it is readily apparent, therefore, the queuing delay for a packet depends on how many packets with earlier deadlines will be transmitted prior to that packet.

The minimum guaranteeable end-to-end delay for a path equals the sum of the minimum guaranteeable queuing delays at each router in the path added to the propagation delays across the links in the path and the router delays for the routers in the path. Generally, prior to transmitting a flow, a sender application or a receiver application enters into a contract of service with a network for transmission of the flow. The contract sets out the quality of service the sender and/or receiver application requires for that flow. In case of a bounded delay flow, the quality of service includes a maximum delay that may be tolerated in transmission of the packets of that flow.

Generally, a network, which supports such contracts relies on two control functions to do so, namely, an admission control function and a traffic policing function. The admission control function determines whether the network can enter into a contract of service that has the requested quality of service. The traffic policing function ensures that the admitted flows adhere to the original contract of service between the network and the application. The admission control function in network 100 (FIG. 1) will be described in more detail below. However, briefly stated, the admission control function requires that, among other things, the sender application provide the network with characteristics of the flow to be admitted and the path to the receiver application or the location of the receiver application. The network then determines whether it can accept the flow given the specified characteristics and, if so, the minimum guaranteeable end-to-end delay that the network can guarantee. The traffic policing function in the network ensures, among other things, that the flow sent by the sender application conforms to the flow characteristics that the sender application submitted to the network.

Communication among the sender and/or receiver application and the routers in the network are governed by network protocols. Generally, protocols are a set of rules which govern the exchange of information in a network. These rules include, for example, the type and syntax of data and control message packets, and the information that must be contained in those packets. Control messages include those messages for establishing contracts of service for bounded delay flows.

IETF (Internet Engineering Task Force) and other organizations are currently considering a variety of protocols, such as RSVP Qos and ATM signalling, to support transmitting bounded delay flows in the Internet. These protocols include control messages which enable the Internet and applications using the Internet to enter into contracts of service for transmitting bounded delay flows. The described embodiments of the invention use RSVP Qos, although the invention may be implemented with any one of a variety of other protocols, including ATM signalling.

RSVP Qos uses three types of flow admission control messages that a sender application and a receiver application send to establish service contracts with the network. They are: Path messages, Resv messages, and ResvTear messages. Each of 1hese messages and how they are used in the network to establish contracts of service will now be described in detail in reference to FIGS. 4A–4C.

Figure 4A:
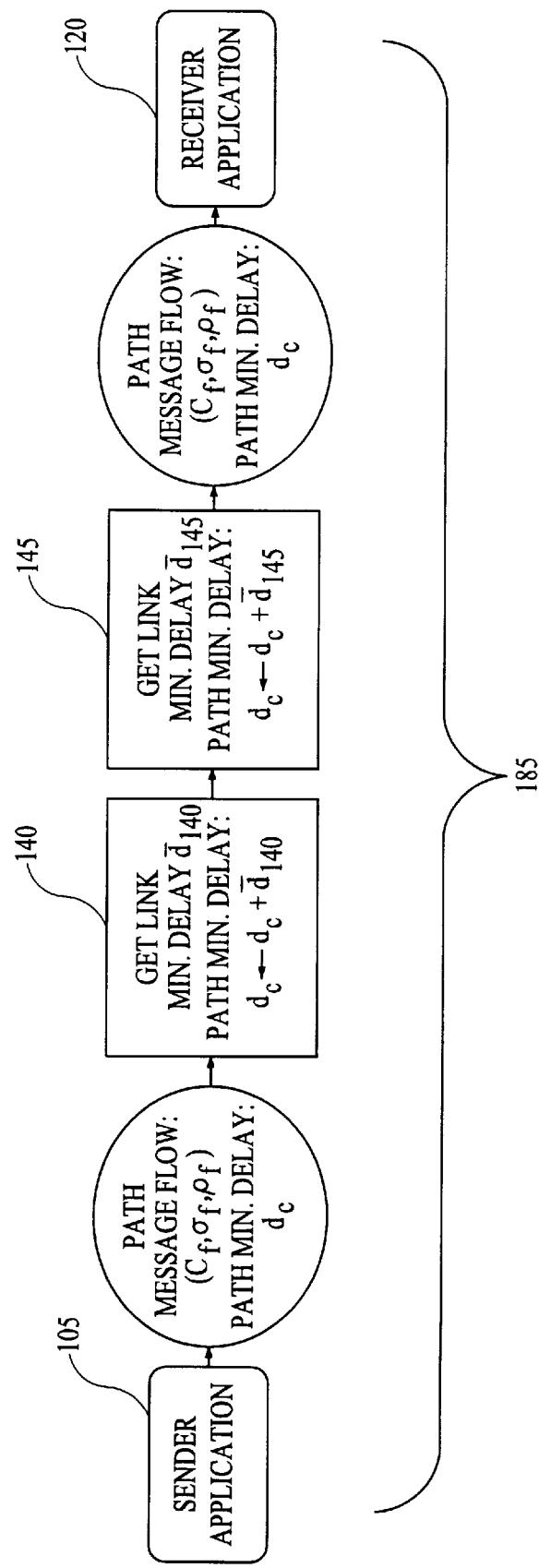
FIGS. 4A–4C show functions performed by components of a network in response to different flow admission control messages.

Referring to FIG. 4A, a Path message is a packet that includes information as to path 185 through the network for transmitting a flow by sender application 105 to receiver application 120. Path also includes information as to the characteristics of that flow and a cumulative delay variable $d_c$. This variable, upon arrival of the Path message at receiver application 120, will specify the minimum guaranteeable end-to-end delay for the path. The flow admission control components in each of the routers use the characteristics of the flow in the Path message to estimate the amount of resources required by the flow. In the embodiments described here, the flow is characterized by an envelope which specifies the amount of resources that an output port would require to transmit the flow. The characterization of flows by envelopes will be described in detail below.

Each router along path 185 computes the minimum guaranteeable router delay $\bar{d}$ that the router can guarantee to the packets in the flow. This value is added to cumulative delay variable $d_c$ transmitted with the Path message. For example, at router 140, a minimum guaranteeable router delay, $\bar{d}_{140}$, for that router is added to $\bar{d}_c$. Each router also adds a router delay value for that router and the link propagation delay for the link to the next router or the receiver application. As to the link propagation delay prior to the first router, the sender application initializes $d_c$ with that value prior to sending the Path message. Therefore, when the Path message arrives at the receiver application, cumulative delay variable $d_c$ contains the minimum guaranteeable end-to-end delay for transmitting the flow characterized in the Path message. Receiver application 120 upon receiving the Path message determines whether the cumulative delay meets its delay requirements.

Figure 4B:
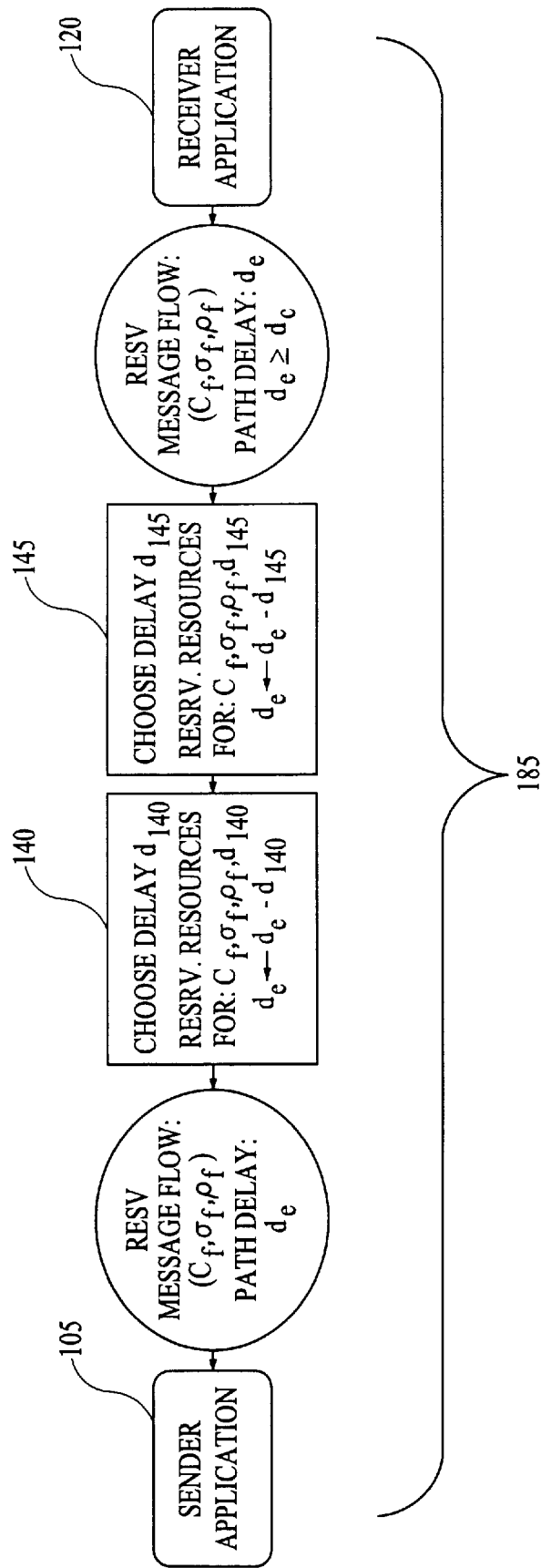

Referring to FIG. 4B, if the minimum guaranteeable end-to-end delay is within the range of acceptable delays given the receiver application's function, receiver application 120 sends a Resv message to reserve path 185. A Resv message includes a cumulative delay $d_e$, which is greater than or equal to the minimum guaranteeable end-to-end delay. Each router along path 185 upon receiving the Resv message, will be assigned a delay $d_i$ (hereinafter, the "assigned delay"). For example, router 145 will be assigned a $d_{145}$ and router 140 will be assigned a $d_{140}$. The assigned delay d of a router is greater than or equal to the minimum guaranteeable router delay d computed previously at that router. The value of the assigned delays will be determined according to some reasonable delay assignment policy used by the routers. For example, if $d_e$ is greater than the minimum guaranteeable end-to-end delay, the extra portion of $d_e$ may be divided equally or in proportion to the minimum guaranteeable delay $\bar{d}$ at each router.

As each router calculates the minimum guaranteeable router delay at that router $\bar{d}$, each router tentatively reserves resources for the flow. A router reserves enough resources at the appropriate output port such that the router will not delay any of the packets in that flow beyond the minimum guaranteeable delay. This prevents the router, during the period between sending the Path message and receiving a Resv message, from committing its resources to other flows and thereby preventing it from being able to honor the maximum delay it guaranteed. When a new delay $d_i$ is assigned to the router by the Resv message, the tentative reservation is vacated and a new reservation using the new assigned delay is made. If a Resv message is not received within a predetermined period of time, as in when the minimum guaranteeable end-to-end delay is longer than the delay required by the receiver application, the tentative reservation automatically expires.

During the duration of the flow, receiver application 120 will send periodic Resv messages having the same cumulative delay $d_e$ as the first Resv message. These Resv messages renew the reservation at the routers along the path. If the receiver application does not send these messages, after a pre-determined period of time, the reservation expires. If these renewal Resv messages do not have the same cumulative delay $d_e$ as the original Resv message, each router in path 185 determines whether a new assigned delay can be guaranteed to the flow. If so, a new reservation is made at the router. If not, an error message is sent back over path 185 to the receiver application. This error message causes the reservation at the previous routers to revert back to the original reservation.

Figure 4C:
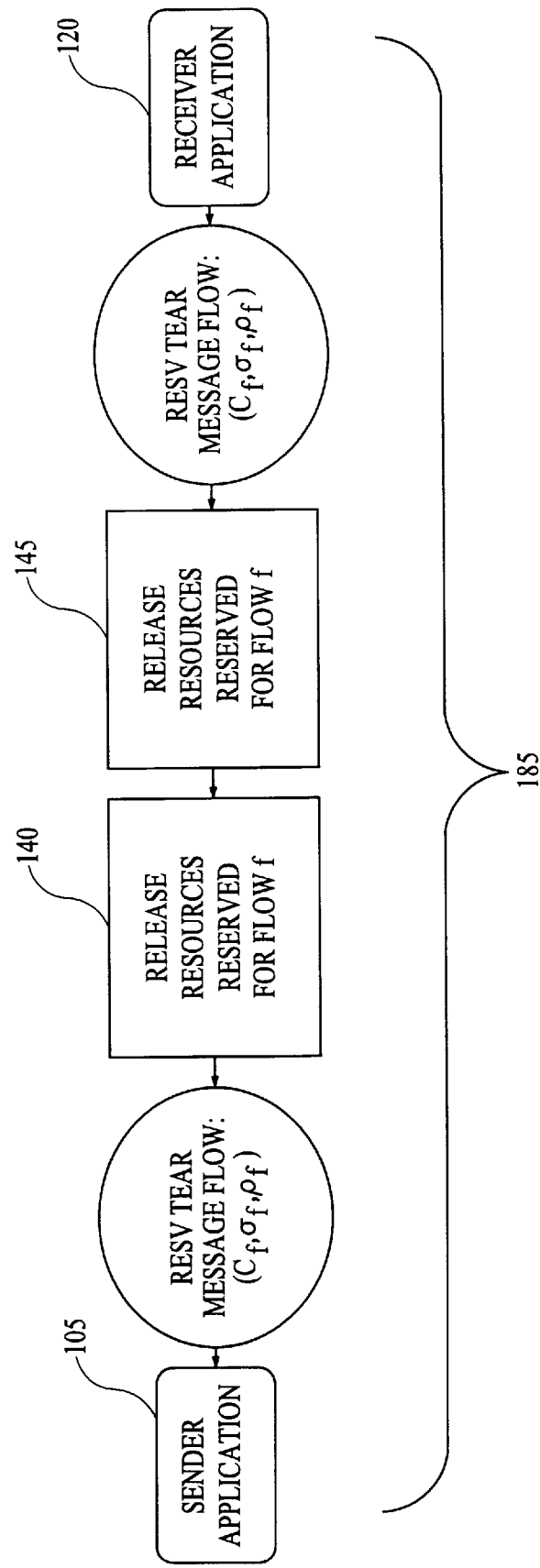

Referring to FIG. 4C, at the end of transmitting a flow, receiver application 120 sends a ResvTear message back over path 185 in the network to release resources reserved for the flow.

As described above, the sender application sends as part of the Path and Resv messages, characteristics of the flow for which a contract of service and resource reservation is sought. Generally, the resource requirements of the flow are characterized such that prior to transmitting the flow, the routers can determine whether they have enough resources available to meet the resource requirements of the flow. The characterization of flows in the described embodiments will be described in detail below in reference to FIGS. 5A–5E. Briefly stated, the flows are characterized by one of several different types of envelopes which specify the resources (measured in bits) required over time to transmit the flows.

Figure 5A:
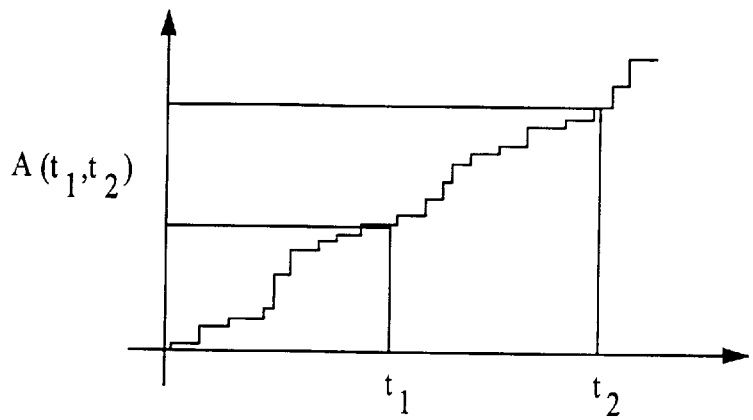
FIGS. 5A–5D show different ways of characterizing flows.
Figure 5B:
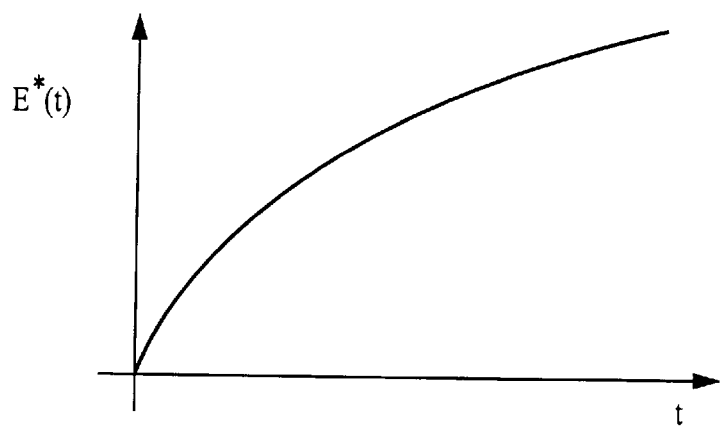
Figure 5D:
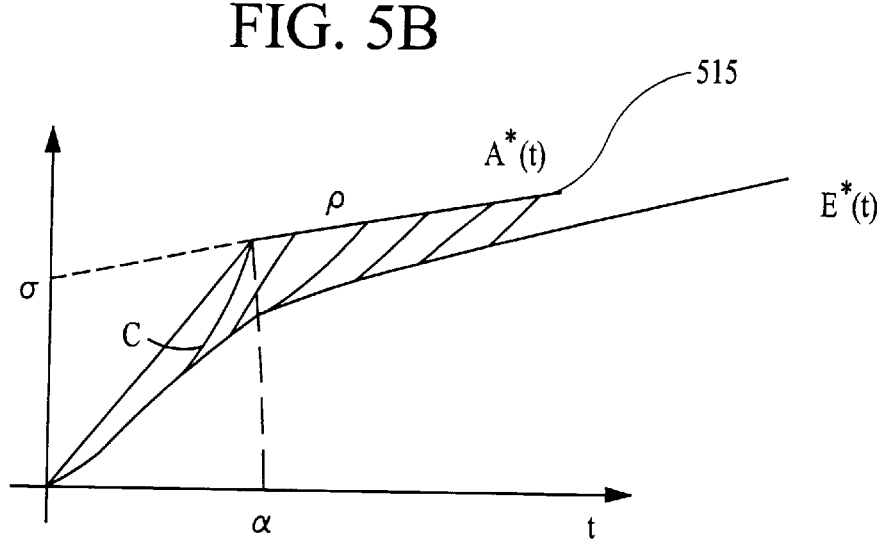

The arrival of packets of a flow at a router generally can be characterized by a packet arrival function $A[t_1, t_2]$ such as is shown in FIG. 5A. $A[t_1, t_2]$ is a cumulative function that sets out the total number of bits of a flow that have arrived at the router between $t_1$ and $t_2$. Because the router has to transmit the same number of bits, $A[t_1, t_2]$ also represents the total resources (measured in bits) required to transmit the flow. For a given flow, the packet arrival function $A[t_1, t_2]$ has been found to be always be within a minimum envelope $E^*(t)$ shown in FIG. 5B. The relationship between the actual arrival and the envelope may be expressed as follows:

$$A[t, t+\tau] \leq E^*(\tau) \quad \forall t \geq 0, \forall \tau \geq 0$$

where $A[t_1, t_2]$ is the actual arrival of the flows and $E^*(t)$ is the minimum envelope. Note that $E^*(t)$ is non-decreasing, i.e., $E^*(\tau_1) < E^*(\tau_2)$ when $0 < \tau_1 < \tau_2$.

This minimum envelope $E^*(t)$ could be used for path reservation. However, $E^*(t)$ is a non-linear function and therefore using it would make flow admission control at the routers computationally intensive. In the described embodiments, simpler envelopes, that are not the minimum envelope of $A[t_1, t_2]$, are used to characterize $A[t_1, t_2]$. These simpler envelopes make the admission control functions less computationally intensive, although they result in some over-reservation of resource, at the routers.

Figure 5C:
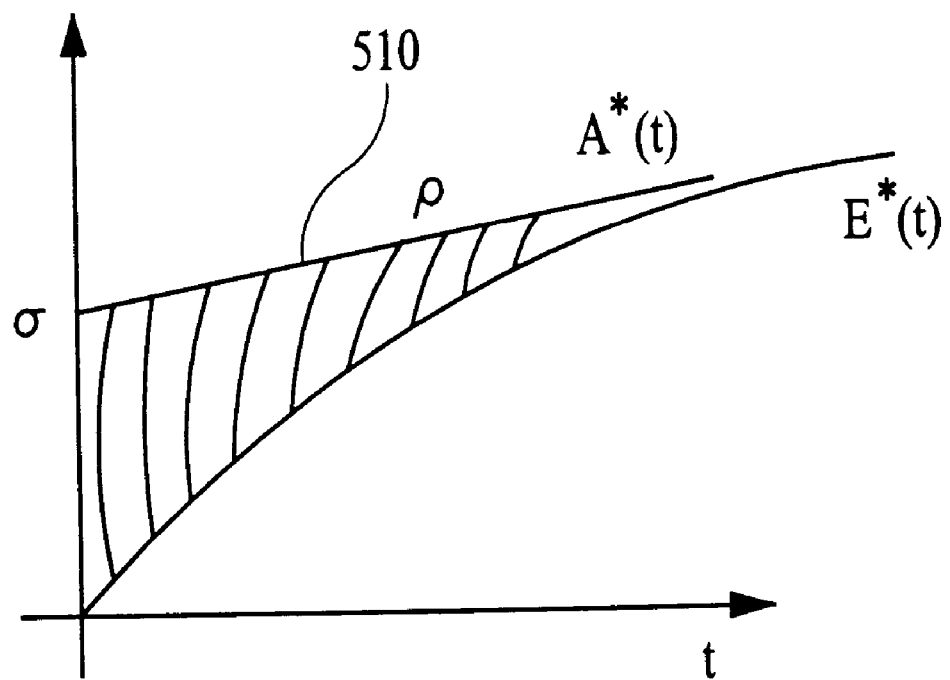

The minimum envelope $E^*(t)$ can be simplified based on the observation that $E^*(t)$ is asymptotic to a sloped asymptote that has a slope $\rho$. $\rho$ is the average rate (bits/s) of the arrival of the flow. Referring to FIG. 5C, sloped asymptote 510 is represented by the following function:

$$\sigma + \rho t$$

where $\sigma$ is the maximum burst size of the host computer running the sender application.

Since $E^*(t)$ is asymptotic to sloped asymptote 510 from below, it is smaller than the sloped asymptote 510 for all t. Therefore, if $E^*(t)$ is an envelope of $A[t_1, t_2]$, it follows that the slope asymptote 510 must also be an envelope of $A[t_1, t_2]$. (Sloped asymptote 510 will be hereinafter referred to as the "one-rate envelope".) However, the one-rate envelope 510 is not the minimum envelope, since at least one other envelope of $A[t_1, t_2]$ (i.e. $E^*(t)$) is less than the one-rate envelope 510 for all t.

The one-rate envelope can be used to estimate resource requirements of the flows for path reservation. The network routers in some embodiments of the invention use the one-rate envelopes of flows included in Path and Resv messages to determine whether they can accept the flows, as will be described below.

As was stated previously, using the one-rate envelope for path reservation results in some over-reservation of resources at the routers. The area between the one rate envelope $A^*(t)$ 510 and $E^*(t)$ in FIG. 5C represents the over-reservation area. This area can be reduced by making the envelope a two segment envelope $A^*(t)$ 515, as shown in FIG. 7D. The first segment has a slope of C which is the peak rate of the flow. The second segment is the sloped asymptote 510. $A^*(t)$ 515, hereinafter referred to a "two-rate envelope", is represented by the following function:

$$A^*(t) = \begin{cases} 0 & t < 0 \\ Ct & 0 \leq t < a \\ \sigma + \rho t & a \leq t \end{cases}$$

where C is the peak rate of a flow (bits/second); $\sigma \geq 0$ is its maximum burst size (bits); $\rho > 0$ is its average rate of flow (bits/second); and $a = \sigma/(C-\rho)$ (seconds) is the maximum duration of the maximum burst at the peak rate of flow. The two-rate envelope has been adopted by IETF as flow characterization to be used in the next generation of Internet protocols to support realtime audio and video transmissions.

Each of the one-rate and two-rate envelopes has a flex point. A flex point is a point in $A^*(t)$ where the rate of flow decreases abruptly. In the case of one-rate envelopes, at time t=0, the rate of flow equals infinity. However, at time t>0, the rate of flow is $\rho$. Therefore, for one-rate envelopes, the flex point is at t=0. In the case of the two rate envelopes, the flex point is at t=a which is the point where the first segment of the envelope meets the second segment of the envelope.

Figure 6A:
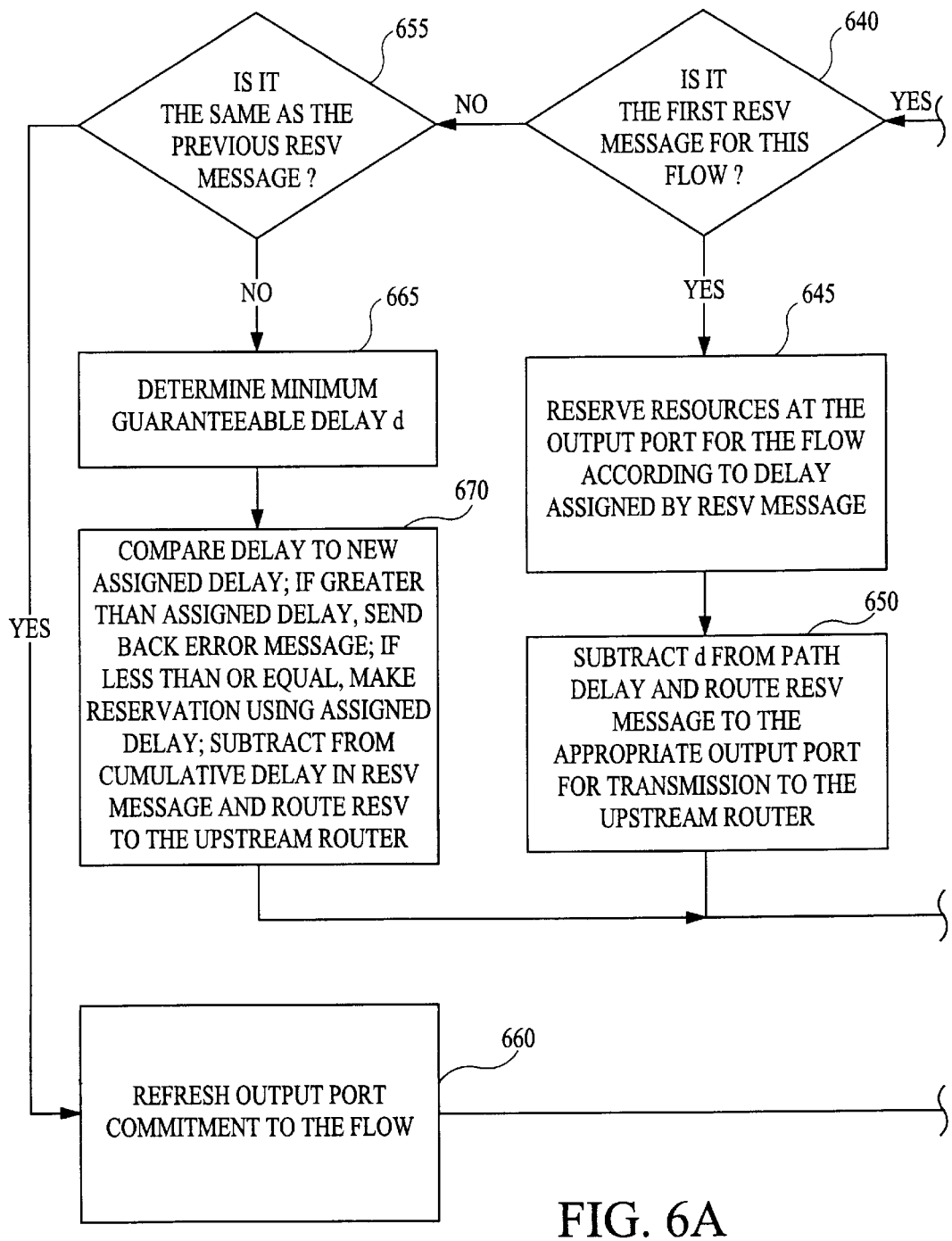
FIG. 6 is a flow chart of the operation of a flow admission control component.
Figure 6B:
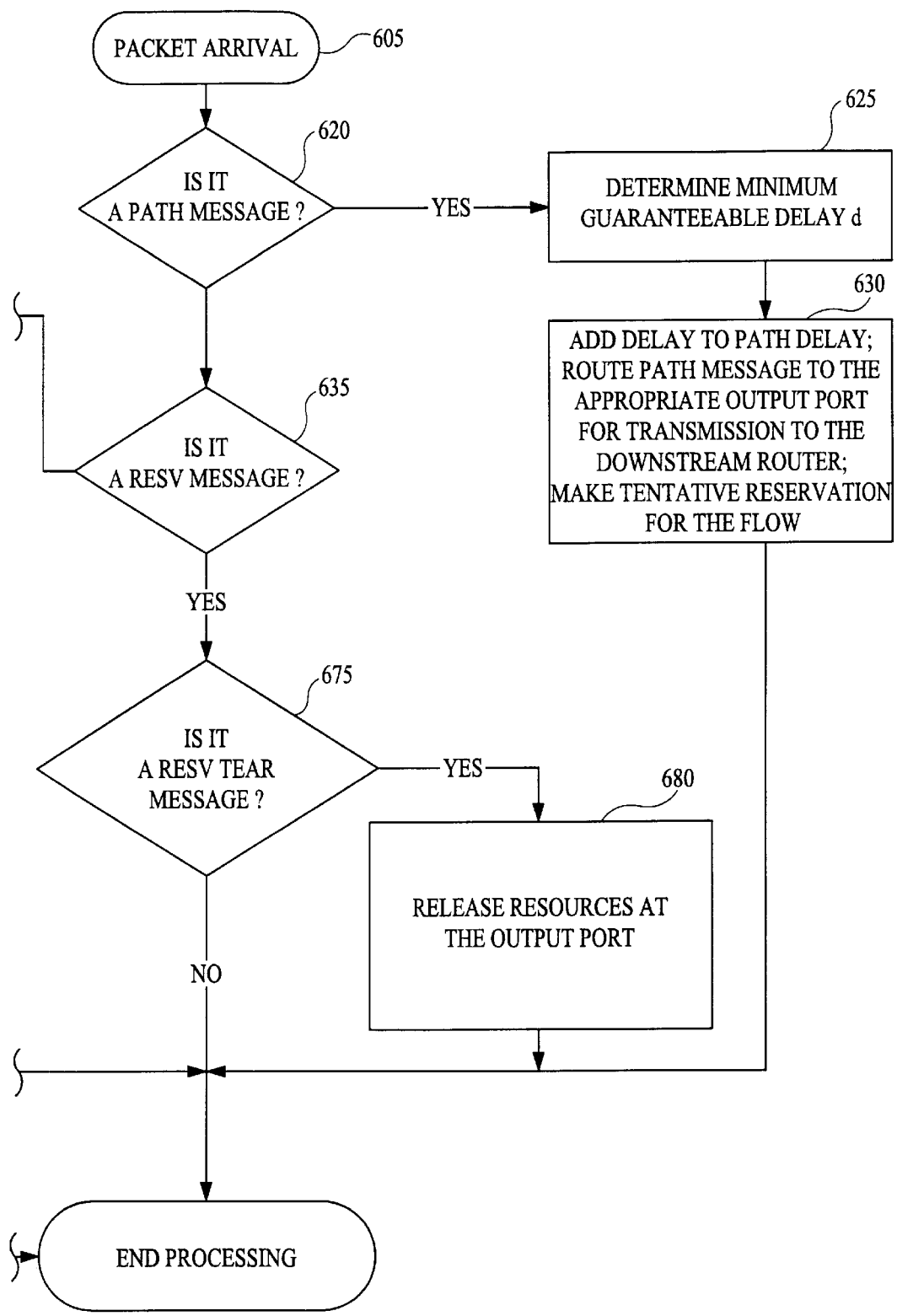

Referring to FIG. 6, we have already described the functions performed by the routers in the network in response to the different RSVP Qos flow admission control messages. We will now describe the specific steps in the flow admission control component 350 performed by CPU 355 (FIG. 2) in response to receiving an RSVP Qos flow admission control message. Router 140 is used in this description as an example of the routers in network 100. Briefly, when a packet arrives at router 140, router 140 first determines whether the packet is an RSVP Qos flow admission control message or some other type of packet, such as a data packet. If the packet is a data packet, router 140 routes the packet to the next router in the packet's path. If the packet is an RSVP Qos flow admission control message, router 140 performs a variety of flow admission control functions, including computing the minimum guaranteeable router delay at router 140 for the flow characterized in the control message.

If the RSVP Qos packet is a Path message (step 620), then CPU 355 (hereinafter referred to as the "CPU") determines whether the appropriate output port can accept the flow and, if so, the minimum guaranteeable router delay (step 625). As was previously described, the minimum guaranteeable router delay equals the sum of the router delay, the link outgoing propagation delay, and the minimum guaranteeable queuing delay. The first two delays are constant. The third delay is variable and must be computed for each flow.

The CPU executes a procedure, implemented in code, for computing the minimum guaranteeable queuing delay. Embodiments of this procedure are described below in detail. If the CPU determines that the flow cannot be accepted, then the CPU gives the minimum guaranteeable delay a very large value so that receiver application 120 does not reserve this path. If the CPU determines that the flow can be accepted, the CPU also computes the minimum guaranteeable delay. The CPU also tentatively reserves resources for the flow at output port 170. In some embodiments of the invention, the CPU executes a procedure, implemented in code, whenever it reserves resources at output port 170. The embodiments of this procedure are described below. The CPU next adds the minimum guaranteeable router delay to the cumulative delay variable $d_c$ in the Path message and sends the message to the switching fabric for routing to the appropriate output port (step 630).

If the packet is a Resv message (step 630), then the CPU determines whether it is the first Resv message for the flow (step 640). If so, the CPU determines whether the delay assigned by the Resv message is the same or greater than the minimum guaranteeable router delay computed in response to the Path message. If the assigned delay is the same as the minimum guaranteeable router delay, then the tentative reservation made in step 625 is confirmed. If the assigned delay is greater than the minimum guaranteeable router delay, then the tentative reservation for the flow is vacated and a new reservation using the new assigned delay is made (step 645). In some embodiments of the invention, the CPU executes a procedure, implemented in code, whenever it vacates a reservation (i.e. releases resources) at an output port. The embodiments of this procedure are described below. Following confirming or reserving resources, as the case may be, the CPU subtracts the value of the assigned delay from the path delay variable $d_c$ of the Resv message and then routes the message to the appropriate port for sending to the next router (step 650).

If the Resv message is not the first Resv message for this flow (step 640), the CPU determines whether the delay in the new Resv message is the same as the original Resv message for this flow (step 655). If so, the CPU refreshes the commitment of the appropriate output port to the flow (step 660). If not, the CPU processes the Resv massage in a similar way as a Path message (steps 665–670). CPU first determines a new assigned delay based on the cumulative delay $d_e$ in the Resv message. The CPU then computes the minimum guaranteeable router delay. If the minimum guaranteeable delay is less than the new assigned delay, then the CPU reserves resources for the flow using the new assigned delay. If the minimum guaranteeable delay is more than the new assigned delay, the CPU sends an error message back to the receiver application.

If the packet is a ResvTear message (step 675), the CPU cancels the resources reserved for the flow (step 680).

As explained above, in response to RSVP Qos Path and Resv messages the CPU computes a minimum guaranteeable router delay. Recall that this value is made up of the router delay for this router, out-going link propagation delay for the appropriate output port, and the minimum guaranteeable queuing delay at the same output port. In the description of the embodiments that follow, the calculation of the minimum guaranteeable queuing delay will be described in detail. It should be understood that the router delay and the link propagation delay are automatically added to the computed minimum guaranteeable queuing delay to arrive at the minimum guaranteeable router delay.

We will now describe in detail how the minimum guaranteeable queuing delay is computed. We will present four embodiments of the procedures used in the flow admission control component 250 (see FIG. 2) for computing the minimum guaranteeable queuing delay when two-rate envelopes are used to characterize the flows. We will then present two embodiments of the procedures used in the flow admission control component 350 for computing minimum guaranteeable queuing delay when one-rate envelopes are used. Finally, we will also present two embodiments of the procedures used in flow admission control component for computing the delay in case of n-rate envelopes. Before presenting these embodiments, however, we will first describe the mathematical principles underlying how the delay is computed.

The sufficient and necessary condition for schedulability of a set of flows to an output port implementing an EDF scheduling policy ("EDF schedulability") has been shown in J. Liebeherr et al., "Exact Admission Control for Networks with Bounded Delay Services. *Technical Report CS*-94-29, University of Virginia (1994). A set of flows is schedulable at an output port if the output port has enough resources to meet the commitments it has made and to provide the quality of service (e.g. guaranteed delays) those commitments require.

The sufficient and necessary conditions include a stability condition and a schedulability condition. Given a set of flows N={1, 2, . . . N}, where the flows in the set are characterized by the envelopes $A_i^*$, where i∈N, the stability condition for a work-conserving scheduler (thus including an EDF scheduler) is:

This stability condition requires that total number of packets arriving at a queue of an output port, as time $$\lim_{t \to \infty} \frac{\sum_{i \in N} A_i^*(t)}{ct} < 1 \qquad (4)$$

approaches infinity, to be less than the total number of packets the output port could transmit.

Eq. 1 implies that the set N is EDF-schedulable, if and only if:

$$ct \geq \sum_{i \in N} A^*_i(t - d_i), \quad \forall t \geq 0 \qquad (5)$$

where flow i∈N is characterized by the envelope $A_i^*(t)$ and has an assigned delay of $d_i$.

Figure 7:
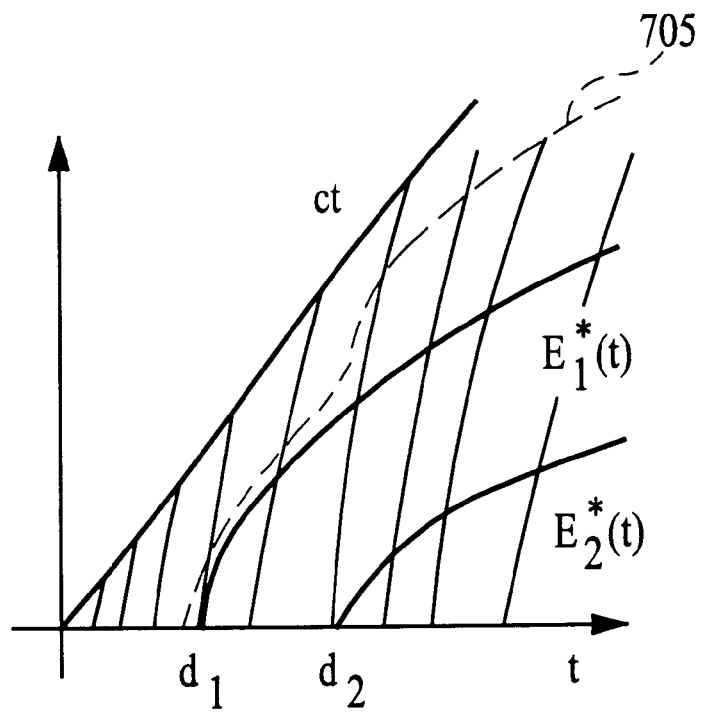
FIG. 7 illustrates how to compute the available resources at an output port.

These stability (Eq. 1) and schedulability (Eq. 2) conditions can be understood in reference to FIG. 7. (Although FIG. 7 illustrates the stability condition in reference to minimum envelopes $E^*_1(t)$ and $E^*_2(t)$, the illustration equally applies to envelopes $A^*(t)$ which are not minimum envelopes.) Given a rate of transmission c (bits/s) of an output port, the function ct represents the cumulative amount of data or bits that can be transmitted by the output port between time 0 and time t. In other words, the function ct represents the total amount of work (in bits) that can be performed by that output port between time 0 and time t. Function ct also can be seen as representing the total load or work capacity of, or total resources available at, the output port. Similarly, each flow envelope represents the load or work capacity, work, or resources required to transmit the flow characterized by that envelope.

According to Eq. 1, if the output port has two flows to be transmitted, represented by minimum envelopes $E^*_1(t)$ and $E^*_2(t)$, the output port will be stable only if the sum of the two envelopes (shown by curve 705) is less than ct, as t→∞. According to Eq. 2, the set of two flows represented by $E^*_1(t)$ and $E^*_2(t)$ are EDF schedulable so long as curve 705, which is equal to the sum of envelopes $E^*_1(t)$ and $E^*_2(t)$ when they are delayed as much as they are permitted, stays below ct. Note that $d_1$ and $d_2$ are the assigned delays for these envelopes.

In the case of n-rate envelopes which are characterized by a sloped asymptote having a slope of ρ, the stability condition (Eq. 1) reduces to:

$$\sum_{i \in N} \rho_i < c \qquad (3)$$

In other words, for the output port to be stable, the sum of the average rates of the flows the output port has already accepted must be less than its rate of transmission.

Figure 8:
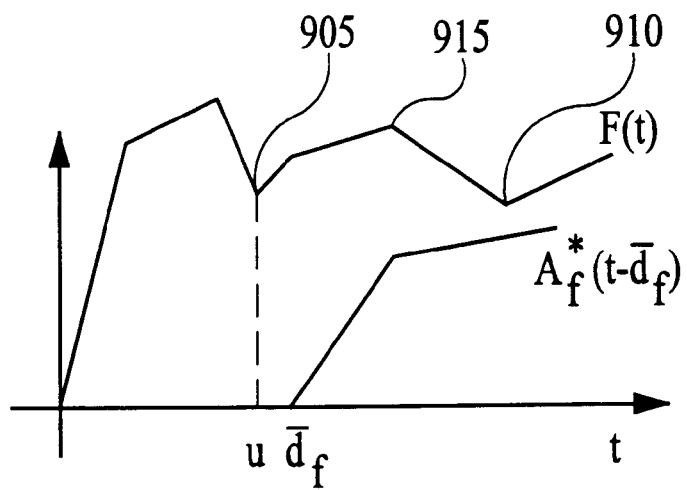
FIG. 8 shows a resource availability function F(t).

Referring to FIG. 8, based on Eq. 2, we have defined a function F(t) which specifies the resources available at time t at an output port in :he worst case scenario. The worst case scenario occurs when all flows for which resources have been reserved at output port are delayed to the maximum their assigned delays permit. F(t) equals ct (total resources of the output port) minus the sum of all of the envelopes of the set of flows N accepted by the output port, each delayed by its assigned delay $d_i$, i.e.:

$$F(t) = ct - \sum_{i \in N} A^*_i(t - d_i)$$

As long as F(t) is positive for all t, the schedulability condition in Eq. 2 is met. The function F(t) is used to determine whether in the worst case scenario, there are enough resources available at the output port to transmit a new flow.

Function F(t) is typically characterized by a number of convex points (e.g. point 905) and concave points (e.g. point 915). Convex points are points at which the slope of F(t) increases and they occur only at the flex points of the envelopes of the flows which have already been accepted, $A^*_i(t)$. Concave points are points at which the slope of F(t) decreases and they occur at the starting times of the accepted flows (which are the same as the assigned delay $d_i$).

F(t) is also typically characterized by a number of local minima. A local minimum is defined as a point u where F(t) is greater than F(u) at either side of u. Points 905 and 910 in the F(t) curve shown in FIG. 8 are examples of local minima of F(t). It should be noted that not all convex points are local minima of F(t); however, all local minima of F(t) are convex points. (Mathematically, u is a proper local minimum for F(t) if $F(t) \geq F(u)$ in a vicinity of u and F is not constant in any vicinity of u. Assuming an $A_i^*(t)$ being two rate envelopes for all $i \in N$, for any proper local minimum u of F we have $dF(u^-)/dt \leq 0$ and $dF(u^+)/dt \geq 0$, but not both equal to 0.) Since local minima represent bottle necks in the available resources at the output port, the schedulability condition in Eq. 2 then reduces to the requirement that F(t) is positive at the local minima.

If we assume that the flows are ordered by their flex points $d_i + a_i$, F(t) can be mathematically represented as:

$$F(t) = \begin{cases} 0 & t < 0 \\ ct - \sum_{\substack{i \in N \\ d_i < t}} (C_i(t - d_i)) & 0 \leq t < d_1 + a_1 \\ ct - \sum_{\substack{i \in N \\ i \leq j}} (\sigma_i + \rho_i(t - d_i)) - \sum_{\substack{i \in N \\ i > j, d_i < t}} C_i(t - d_i) & d_j + a_j \leq t < d_{j+1} + a_{j+1} \\ ct - \sum_{i \in N} (\sigma_i + \rho_i(t - d_i)) & d_N + a_N \leq t \end{cases}$$

where N is the set of accepted flows (i.e. flows for which resources have been reserved) ordered by their flex point times. Note that F(t) has four regions. In a first region, represented by t<0, the value of F(t) is zero. In a second region between t=0 and the flex point of the first envelope $(d_1 + a_1)$, F(t) equals ct minus the sum of the first segments of all envelopes having an assigned delay $d_i$ less than $d_i$. In a third region between the first flex point time $(d_1 + a_1)$ and the last flex point $(d_N + a_N)$, F(t) has a number of smaller sub-regions. Each of these sub-regions is defined by two consecutive flex points, $d_j + a_j$ and $d_{j+1} + a_{j+1}$. In each of these sub-regions, F(t) equals ct minus the sum of the second segments of all envelopes in the set N prior to and including envelope $A^*_j(t)$ and the first segments of all envelopes in the set N after envelope $A^*_j(t)$. In a fourth region after the last flex point $(d_N + a_N)$, F(t) equals ct minus the sum of the second segments of all the envelopes.

The schedulability condition that all F(t) at all local minima be positive can then be written as $$F(d_j + a_j) = $$
$$c(d_j + a_j) - \sum_{\substack{i \in N \\ i \leq j}} (\sigma_i + \rho_i(d_j + a_j - d_i)) - \sum_{\substack{i \in N \\ i > j, d_i < d_j + a_j}} C_i(d_j + a_j - d_i) \geq$$
$$0 j \in N$$

where $F(d_j + a_j)$ is F(t) at flex point time $d_j + a_j$ of flow j.

We will now describe the various embodiments of the procedures used by flow admission control component 350 (FIG. 2). These procedures determine whether a new flow represented by an envelope $A_f^*(t)$ can be admitted at a router and, if so, the minimum guaranteeable queuing delay for the flow. The CPU when executing these procedures uses F(t) to determine the minimum guaranteeable queuing delay for the packets of the new flow. Prior to describing the embodiments of these procedure, however, we will first provide an overview of the general functions that the various embodiments of the procedures perform and the underlying principles of the procedures.

Typically, for each new flow to be admitted, the CPU determines a minimum guaranteeable queuing delay $\bar{d}$. To admit a new flow f characterized by an envelope $A_f^*(t)$ at an output port, which already has a set of flows $N = \{1, 2, \ldots, N\}$, the CPU finds a minimum value for a delay $d_f$. Delay $d_f$ is defined such that when $A_f^*(t)$, translated by $d_f$, is subtracted from F(t), the resulting function F'(t) remains positive for all $t \geq 0$. The CPU determines the minimum value for delay $d_f$ such that when a new set of flows $N' = N + \{f\}$ is created, the new set of flows N' is schedulable. The set of flows N' is a combination of the set of previously accepted flows N plus new flow f. To combine N and flow f, a point of insertion into the set of flows N is found such that $d_{b-1} + a_{b-1} < d_f + a_f < d_b + a_b$. If $d_f + a_f < d_1 + a_1$ or $d_N + a_N < d_f + a_f$, flow f is inserted as the first or last flow, respectively. Given the new set of flows N', the CPU finds a minimum value for $d_f$ such that the new set N' is schedulable. That is:

$$F'(d_j + a_j) = $$
$$c(d_j + a_j) - \sum_{\substack{i \in N' \\ i \leq j}} (\sigma_i + \rho_i(d_j + a_j - d_i)) - \sum_{\substack{i \in N' \\ i > j, d_i < d_j + a_j}} C_i(d_j + a_j - d_i) \geq$$
$$0 j \in N'$$

The CPU finds a minimum value for $d_f$ such that the following set of inequalities, derived from the above equations, are satisfied:

$$d_i \geq 0 \, i \in N$$
$$d_f \geq 0$$
$$F(d_i + a_i) \geq 0 \, d_i + a_i \leq d_f, \, i \in N$$
$$F(d_i + a_i) - C_f(d_i + a_i - d_f) \geq 0 \, d_f < d_i + a_i \leq d_f + a_f, \, i \in N$$
$$F(d_f + a_f) - C_f a_f \geq 0$$
$$F(d_i + a_i) - (\sigma_f + \rho_f(d_i + a_i - d_f)) \geq 0 \, d_f + a_f < d_i + a_i, \, i \in N$$

The first inequality states that the assigned delays of the already admitted flows are positive. The second inequality requires that the minimum guaranteeable queuing delay be positive. The third inequality is the schedulability condition expressed for local minima of F(t). The last three inequalities require that envelope $A_f^*(t)$ fit under function F(t) such that $A_f^*(t)$ never intersects F(t) (i.e., crosses F(t) so that $F(t)-A_f^*(t-d_i)$ becomes negative). If $A_f^*(t)$ intersects F(t), it means that at some point in time, $A_f^*(t)$ will have EL larger value than F(t). Therefore, more resources than are available at the output port might be required to meet the requirements of $A_f^*(t)$.

We will now describe, for two-rate envelopes, the principles behind how the minimum guaranteeable queuing delay $\bar{d}$ is calculated. It should be noted that these principles equally apply to other envelopes which could be used to characterize flows. In order to determine the guaranteeable minimum queuing delay $\bar{d}$, the CPU determines the left most position of $A_f^*(t)$ such that $A_f^*(t)$ fits under F(t). In order to visualize how the fitting of $A_f^*(t)$ under F(t) is performed, it is useful to picture $A_f^*(t)$ moving along the t-axis from right to left. As $A_f^*(t)$ moves to the left, $A_f^*(t)$ may Intersect F(t) in at least one of three ways. First, referring to FIG. 9A, the first segment of $A_f^*(t)$ may intersect F(t) at a convex point 1025. Second, referring to FIG. 9B, the second segment of $A_f^*(t)$ may intersect F(t) at a convex point 1030. Third, referring to FIG. 9C, the flex point of $A_f^*(t)$ may intersect a concave interval 1035 of F(t). A concave interval of F(t) is a segment between two consecutive convex points. A concave interval typically includes a concave point, but not necessarily. The starting point of $A_f^*(t)$ when it first touches F(t) is the minimum guaranteeable queuing delay.

Figure 9A:
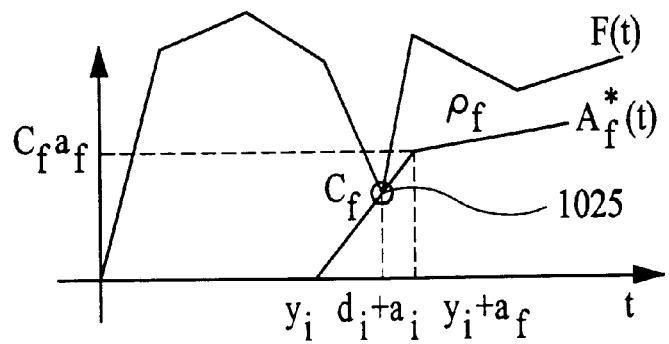
FIGS. 9A–9C illustrate three different constraints imposed by F(t) on an envelope that characterizes a flow.
Figure 9B:
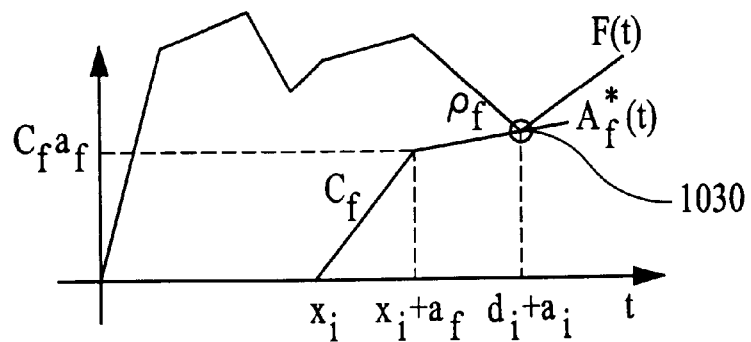
Figure 9C:
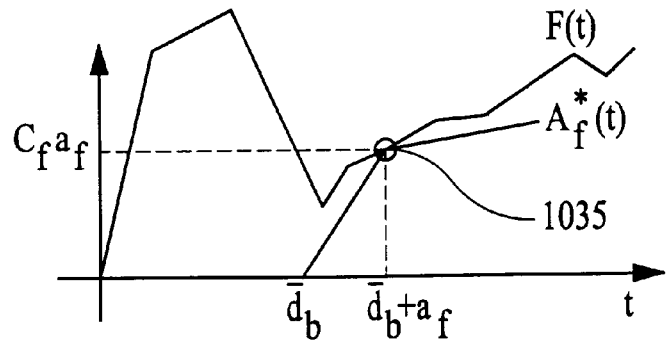

From the above observation of the three possible ways an envelope $A^*_f(t)$ may intersect F(t), it follows that the fitting of $A_f^*(t)$ under F(t) is constrained in three ways First, referring to FIG. 9A, the first segment of $A_f^*(t)$ must lie below all convex points of F(t). Second, referring to FIG. 9B, the second segment of $A_f^*(t)$ must lie below all convex points of F(t). Third, referring to FIG. 9C, the flex point $A_f^*(t)$ must lie below all concave intervals of F(t). The earliest starting time of $A_f^*(t)$ in which all three constraints are met is the minimum guaranteeable queuing delay.

To compute the minimum guaranteeable queuing delay, the CPU computes three starting times $m_y$, $m_x$ and $\bar{d}_b$ which are respectively the latest time when each of the first, second, and third constraints are satisfied. The CPU then selects the maximum of these delay times as the minimum guaranteeable queuing delay. (Lemma 1 and Theorem 1 in the Appendix show the formal proof for calculation of minimum guaranteeable queuing delay.)

To compute $m_y$, the CPU computes the starting times $y_i$ (FIG. 9A) when the first segment of $A_f^*(t)$ meets the convex points of F(t). The maximum $y_i$ is then selected as $m_y$, which represents the first point in time when the first constraint is satisfied. Mathematically, at a point where the first portion of envelope $A_f^*(t)$ meets a convex point of F(t), the following holds:

$$F(d_i+a_i)=C_f(d_i+a_i-y_i) \quad i \in N \qquad (4)$$

and $$F(d_i+a_i)<C_f a_f$$

Therefore, solving Eq. 4 for $y_i$ yields:

$$y_i = d_i + a_i - \frac{F(d_i + a_i)}{C_f},$$

$$\forall i \text{ where } F(d_i+a_i)<C_f a_f. \qquad (5)$$

The latest start time $y_i$ for which Eq. 4 is true, and the first constraint is satisfied, is designated by $m_y$:

$$m_y = \max_{\substack{i \in N \\ F(d_i+a_i)<C_f a_f}} y_i. \qquad (6)$$

To compute $m_x$, the CPU computes the starting times $x_i$ (FIG. 9B) for when the second segment of $A_f^*(t)$ meets the convex points of F(t). The maximum $x_i$ is then selected as $m_x$ which represents the first point in time when the second constraint is satisfied. Mathematically, at the point where the second segment of envelope $A_f^*(t)$ meets a convex point of F(t), the following is true:

$$F(d_i+a_i)=\sigma_f+\rho_f(d_i+a_i-x_i) \quad i \in N \qquad (7)$$

and $$F(d_i+a_i) \geq C_f a_f$$

Therefore, solving Eq. 5 for starting time $x_i$ yields:

$$x_i = d_i + a_i - \frac{F(d_i + a_i) - \sigma_f}{\delta f},$$

$$\forall_i \text{ where } F(d_i+a_i) \geq C_f a_f \qquad (8)$$

The latest start time $x_i$ for which Eq. 8 is true, and the second constraint is satisfied, is designated by $m_x$:

$$m_x = \max_{\substack{i \in N \\ F(d_i+a_i)<C_f a_f}} x_i). \qquad (9)$$

To compute a latest start time $\bar{d}_b$ (FIG. 9C) when the flex point of $A_f^*(t)$ touches a concave interval of F(t), the CPU first calculates $m_x$ and $m_y$. Thus, the first and second constraints are met for $t \geq m$, where $m=\max(m_x, m_y)$. It can then be readily determined whether the flex point lies within a concave interval of F(t) when the starting time of $A_f^*(t)$ is assumed to be m, such that it might intersect F(t) in that interval. If the flex point lies inside a concave interval, it can then be determined at which point in that concave interval, if any, the flex point of $A_f^*(t)$ meets F(t). At a point where the flex point of envelope $A_f^*(t)$ touches a concave interval of F(t) (defined by convex points b−1 and b), the following holds:

$$F(d_b+a_b)>C_f a_f$$

$$F(d_{b-1}+a_{b-1})<C_f a_f$$

and $$F(\bar{d}_b+a_f)=C_f a_f$$

which can be written as $$c(\bar{d}_b + a_f) - \sum_{i=1}^{b-1}(\sigma_i + \rho_i(\bar{d}_b + a_f - d_i)) - \sum_{\substack{i=b \\ d_i < d_{\pi(q)}}}^{N} C_i(\bar{d}_b + a_f - d_i) = C_f a_f \quad (10)$$

where $\pi$ is a permutation of the set of flows N ordered by their starting times $d_i$, i.e. $\pi(i)<(j) \rightarrow d_i<d_j$. Therefore, solving Eq. 10 for $\bar{d}_b$ yields:
where q is such that:

$$d_b = \frac{C_f a_f - c a_f + \sum_{i=1}^{b-1}(\sigma_i + \rho_i(a_f - d_i)) + \sum_{\substack{i=b \\ d_i < d_{\pi(q)}}}^{N} C_i(a_f - d_i)}{c - \sum_{i=1}^{b-1} \rho_i - \sum_{\substack{i=b \\ d_i < d_{\pi(q)}}}^{N} C_i} \quad (11)$$

$[(d_{\pi(q)} \leq d_{b-1} + a_{b-1})$ or $(F(d_{\pi(q)}) < C_f a_f)]$
and
$[(d_{\pi(q+1)} \leq d_b + a_b)$ or $(F(d_{\pi(q+1)}) < C_f a_f)]$ Each of $m_x$, $m_y$, and $\bar{d}_b$ represents a left most position for $A_f^*(t)$ where the first, second, and third constraints, respectively, are satisfied. The maximum time among these three values is the earliest starting time when all three constraints are satisfied. This maximum value is the minimum guaranteeable queuing delay.

Given the above description of how a two-rate envelope can fit underneath F(t) and the mathematical equations required to compute the minimum guaranteeable queuing delay, four embodiments of the procedures for computing the minimum guaranteeable queuing delay using the two-rate envelope will now be described.

FIGS. 10 and 11 show a first embodiment of the procedures used in flow admission control component to compute the minimum guaranteeable queuing delay for a new flow f.

The CPU executes MINIMUM_DELAY_1 (FIG. 10) in response to receiving a Path message (FIG. 6, step 625) or a Resv message requiring a new minimum guaranteeable delay (FIG. 6, step 665). MINIMUM_DELAY 1 in turn uses COMPUTE_$\bar{d}_b$_1 (FIG. 11) to compute the value of $\bar{d}_b$.

In MINIMUM_DELAY_1, the CPU preliminarily determines whether accepting the new flow f, characterized by the envelope in the Path or Resv message, violates the stability condition in Eq. 3 (steps 1105–1110). If the sum of the average rate of flow of the new flow f and the average rates of the flows to which output port is already committed exceeds the capacity, c, of the output port, then the CPU determines that output port will not be stable as required by Eq. 3. In that case, the CPU rejects the flow.

If the flow is not rejected, the CPU calculates m (steps 1120–1150). To do so, the CPU initializes $m_x$ and $m_y$ both to zero (step 1115) and then proceeds to calculate $m_x$ and $m_y$ using Eqs. 4–11 (steps 1120–1145). First, the CPU calculates $x_i$ and $y_i$ values corresponding to all convex points of F(t) (step 1120). If a convex point of F(t) is less than the flex point of $A_f^*(t)$ (step 1125), the CPU calculates an $x_i$ corresponding to that convex point (step 1130). The CPU then determines whether $x_i$ is the largest $x_i$ so far and if so, the CPU replaces the value currently in $m_x$ with the computed $x_i$ (step 1135). If a convex point of F(t) is greater than the flex point of $A_f^*(t)$ (step 1125), the CPU calculates an $y_i$ corresponding to that convex point (step 1140). The CPU then determines whether $y_i$ is the largest $y_i$ so far, and if so, the CPU replaces the value currently in $m_y$ with the computed $y_i$ (step 1145). After repeating steps 1125-1145 for all flex points of reserved flows, the CPU will have computed and stored in $m_x$ and $m_y$ the earliest starting times when $A_f^*(t)$ fits under F(t) so as to meet the first and the second constraints, respectively. The maximum of these two values, m, will be the earliest starting time when $A_f^*(t)$ fits under F(t) so as to meet both constraints (step 1150).

The CPU next determines whether the third constraint imposes a further restriction on the minimum guaranteeable queuing delay $\bar{d}$. The CPU first determines between which two convex points the flex point of $A_f^*(t)$ is located, when the starting time of $A_f^*(t)$ is m (steps 1160–1165). If F(t) at the convex point to the left is less than the flex point of $A_f^*(t)$ and F(t) at the convex point to the right is more than the flex point of $A_f^*$, then the CPU determines that the flex point of $A_f^*(t)$ lies in a concave interval. It then executes the procedure COMPUTE_$\bar{d}_b$_1 (shown in FIG. 11) to compute $\bar{d}_b$, if any, by examining the identified concave interval (step 1175).

In COMPUTE_$\bar{d}_b$_1, in order to compute $\bar{d}_b$, the CPU first orders the set of envelopes in N by their starting times $d_i$, which are the delays assigned to flows by Resv messages (step 1205). These starting times represent the concave points of F(t). The CPU next steps backwards through the starting times, starting with the largest one. The CPU examines the starting times to find the first concave point to the left of the concave interval being examined (steps 1210–1220). Next the CPU determines whether there are two adjacent concave points in the concave interval (or adjacent concave and convex points) between which the flex point of $A_f^*(t)$ intersects F(t) (steps 1225–1230). To do this, the CPU determines whether there are two points in the concave interval where F(t) at one is greater and at the other smaller than the flex point of $A_f^*$. It should be noted that if there are no concave points in the concave interval, then the conditions in step 1225 cause the CPU to skip over step 1230. The CPU next computes q which is the starting time of the first envelope to the right of the flex point at a point where it might intersect F(t) The CPU then computes $\bar{d}_b$ using Eq. 11 (step 1240). The result of this calculation is the latest time at which $A_f^*(t)$ satisfies the third constraint. Note that if there is no point of intersection between $A_f^*(t)$ and F(t) in the concave interval, $\bar{d}_b$ will have a value that will be less than m. The CPU then returns the value of $\bar{d}_b$ (step 1245).

Referring back to FIG. 10, if the CPU executes COMPUTE_$\bar{d}_b$_1 (step 1175), the minimum guaranteeable queuing delay $\bar{d}$ is set to be the maximum value of m and $\bar{d}_b$ (step 1180). If the CPU does not execute COMPUTE_$\bar{d}_b$_1 (step 1175), the minimum guaranteeable queuing delay $\bar{d}$ is set to be the value of m (step 1180). The value of $\bar{d}$ is then returned (step 1190).

As previously described, the CPU adds the out-going link propagation delay and the router delay to $\bar{d}$ to obtain the minimum guaranteeable router delay for the router. The CPU then adds this value to the cumulative delay variable in the Path. The CPU also tentatively reserves resources at the output port for $A_f^*(t)$ by adding $A_f^*(t)$ to set of flows N. $A_f^*(t)$ is given a delay equal to $\bar{d}$ and flex point time $\bar{d}+a_f$. If this tentative reservation is confirmed, then $\bar{d}$ is replaced by a delay assigned in response to the Resv message, which may be larger than $\bar{d}$, as previously described. In the case of the CPU executing MINIMUM_DELAY_1 in response to a Resv message, the CPU compares the minimum guaranteeable delay to the assigned delay. If the assigned delay is greater than or equal to the minimum guaranteeable delay, the CPU vacates the previous reservation and makes a new reservation at the output with the new assigned delay. If not, the CPU sends back an error message.

Computing F(t) has a complexity of the order of N, because F(t) has N components. Therefore, the embodiments of the procedures in FIGS. 10 and 11, in which F(t) is calculated at least N times (steps 1120–1145), has an order of complexity of $N^2$.

FIGS. 12–15 show a second embodiment of the procedures used in flow admission control component. In the second embodiment, procedures MINIMUM_DELAY_2 and COMPUTE_$\bar{d}_b$_2 compute the minimum guaranteeable queuing delay. Two other procedures, RESERVE_2 (FIG. 14) and RELEASE_2 (FIG. 15), reserve and release resources at an output port. This embodiment has an order of complexity of N, because F(t) at the convex points ($F(d_i+a_i)$) and concave points (F(di)) of F(t) are not calculated N times. Instead, they are computed and stored prior to calculating the guaranteeable minimum queuing delay. These points are re-calculated whenever resources are reserved or released. Two variables are used to store the F(t) values at the convex point and concave points. $W_i(N)$ stores F(t) at the convex points. $V_i(N)$ stores F(t) at the concave points. $W_i(N)$ has an initial value of $c(d_i+a_i)$ and $V_i(N)$ has an initial value of $cd_i$. When an envelope $A_f(t)$ is added to the set of flows N, to form a new set of flows N', $V_i(N)$ and $W_i(N)$ are updated according to the following equations:

$$V_i(N') = \begin{cases} V_i(N) & \text{if } d_f \geq d_i \\ V_i(N) = (\sigma_f + \rho_f(d_i - d_f)) & \text{if } d_f + a_f \leq d_i \\ V_i(N) - C_f(d_i - d_f)) & \text{if } d_f < d_i < d_f + a_f \end{cases}$$

$$W_i(N') = \begin{cases} W_i(N) & \text{if } d_i + a_i \leq d_f \\ W_i(N) = (\sigma_f + \rho_f(d_i + a_i - d_f)) & \text{if } d_f + a_f \leq d_i + a_i \\ W_i(N) - C_f(d_i + a_i - d_f)) & \text{if } d_f < d_i + a_i < d_f + a_f \end{cases}$$

Therefore, as a flow f is added, $W_i(N)$ and $V_i(N)$ values for flows whose flex points are to the left of the starting time of flow f, $d_f$, remain the same. $W_i(N)$ and $V_i(N)$ values for flows whose flex points are between the starting time and flex point of $A_f^*(t)$ are affected only by the first part of $A_f^*(t)$, while $W_i(N)$ and $V_i(N)$ values for the flows whose flex points are to the right of the flex point of $A_f^*(t)$ are affected by the second part of $A_f^*(t)$.

Also, for every new i-low f, new $W_i(N)$ ($w_f$) and $V_i(N)$ ($V_f$) are created. If the new flow is assigned a delay of $d_i$, $W_f$ is value $F'(d_i+a_i)$ where F'(t) is $F(t)-A_f(t-d_i)$. Similarly $V_f$ is $F'(d_i)$.

The second embodiment includes two other features not present in the first embodiment. First, a variable B is used to store the total remaining bandwidth available at an output port. B has the following value, after a new flow f added:

$$B=B-\rho_f$$

(B has an initial value of c.) B is used to check for stability condition set out in Eq. 3. Second, two ordered lists of flows in the set of flows N are kept. One list is ordered by the starting time and another list is ordered by the flex point time.

Using $W_i(N)$, $V_i(N)$, and B variable, together with the ordered lists, in MINIMUM_DELAY_1 and COMPUTE_$\bar{d}_b$_1 results in MINIMUM_DELAY_2 (FIG. 12) and COMPUTE_$\bar{d}_b$_2 (FIG. 13) procedures of the second embodiment. The second embodiment also include two additional procedures for reserving (RESERVE_2 in FIG. 14) and releasing (RELEASE_2 in FIG. 15) resources at the output port for a new flow. These two procedures will now be described.

Generally, reservation of resources at an output port constitutes adding the envelope characterizing the flow and a delay value to the set of envelopes used in calculating F(t). Referring to FIG. 14, the CPU executes RESERVE_2 in step 630 (FIG. 6) to tentatively reserve resources for a flow, in step 645 (FIG. 6) to confirm a tentative reservation, and in step 670 (FIG. 6) to reserve resources at the output port.

The CPU first updates, B by subtracting $\rho_f$ (step 1505). The CPU then updates $W_i(N)$ values by looping through flows in the set of N and updating $W_i(N)$ according to the above equations (steps 1510–1530). The CPU then creates a new $W_f$ for flow f (step 1535) and determines, based on starting time of $A^*_f(t)$, where in the set of flows N $A^*_f(t)$ would fit (step 1540). The CPU computes the value of $W_f$ which is $F'(d_i+a_i)$ (step 1545). The CPU then updates the values for $V_i(N)$ in a similar manner as updating the $W_i(N)$ values. The CPU first updates the values for $V_i(N)$ for all flows in the set of N (steps 1550–1570). The CPU then creates a new variable $V_f$ for the flow f (step 1575). The CPU calculates the value for $V_f$ which is $F'(d_i)$ (step 1580). The CPU then updates the lists of the flows ordered by their flex point times (step 1585) and their starting times (step 1590).

Referring to FIG. 15, the CPU executes a procedure RELEASE_2 to release reserved resources by removing an envelope characterizing a flow from the set of flows N. The CPU executes RELEASE_2 when vacating reservations or tentative reservations whether because of a ResvTear message (step 680, FIG. 6) or failure to receive a renewal or a confirmation Resv message from the receiver application. RELEASE_2 is the reverse of RESERVE_2 in the way it updates $W_i$, $V_i$, B, and the ordered lists of flows.

Figure 16:
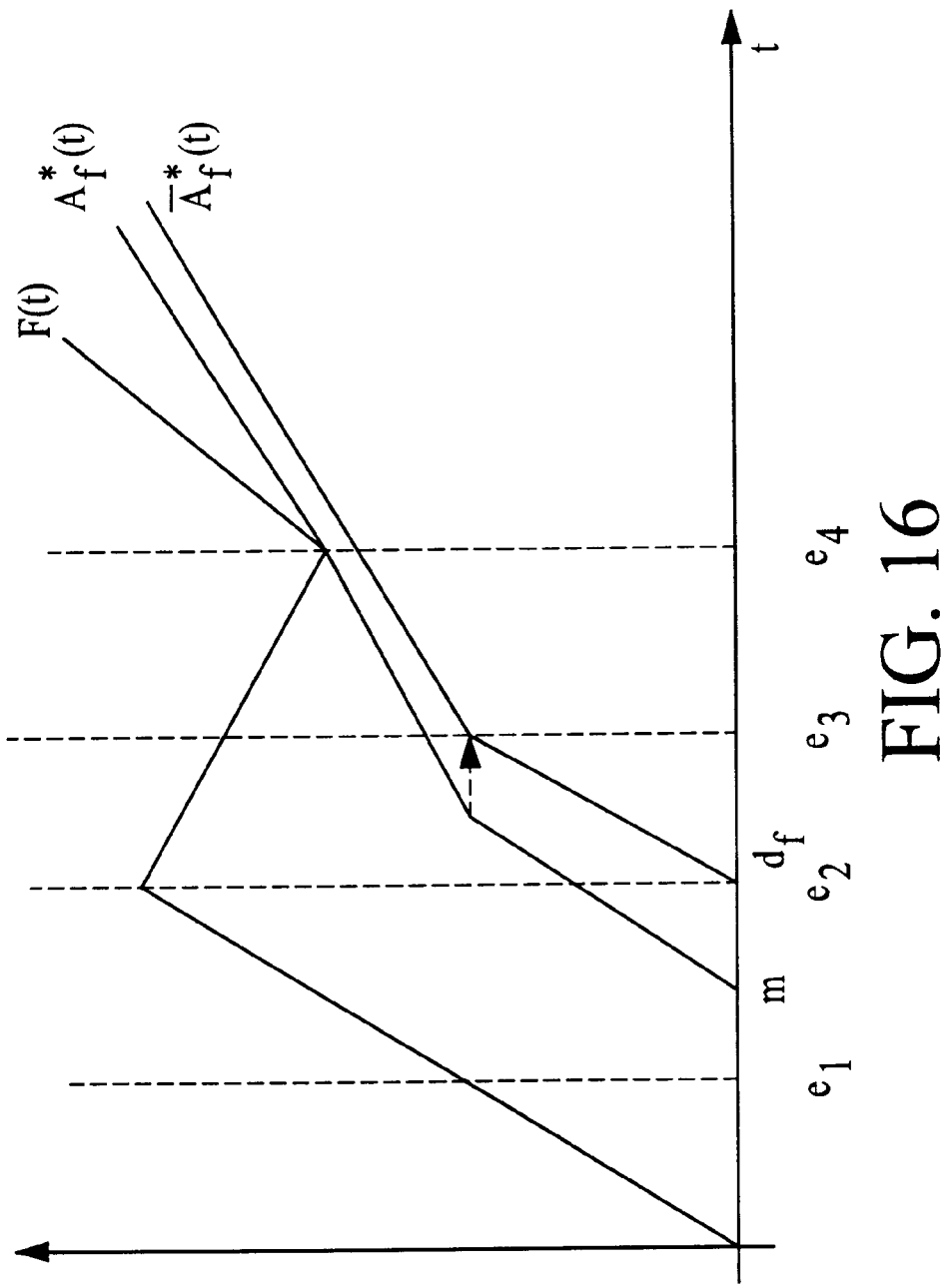
FIG. 16 shows translation of an envelope characterizing a flow to a discretized point in time.

FIGS. 17–19 show a third embodiment of the procedures used in flow admission control component. In the second embodiment, MINIMUM_DELAY_3 (FIG. 17) computes the minimum guaranteeable queuing delay. Two other procedures, RESERVE_3 (FIG. 18) and RELEASE_3 (FIG. 19), reserve and release resources at an output port. In this embodiment, the complexity of the second embodiment is further reduced by discretizing the points in time at which convex points of F(t) may be located. These discrete points in time are designated by $e_i$. (Theorem 2 in the Appendix gives the formal solution for computing the minimum guaranteeable queuing delay when the convex points fall on discrete points in time.) In the third embodiment, to calculate the minimum guaranteeable queuing delay and reserve resources to guarantee a delay d to a flow $A_f^*$, the CPU reserves an envelope $\bar{A}_f^*(t)$ that is obtained by translating the flex point of the original envelope $A_f^*$ onto an $e_i$ located to the right of the flex point (FIG. 16). After reservation, F'(t) equals $F(t)-\bar{A}_f^*(t)$. Assuming that F(t) had all its convex point on $e_i$'s, then the same is true for F'. The resulting schedulability conditions are $F(e_i) \geq 0$ for $i \in L$, L being the set of discrete point $e_i$, $\{e_1, e_2, e_3, \ldots, e_L\}$.

Referring to FIG. 17, the CPU executes the procedure MINIMUM_DELAY_3 to determine the minimum delay guaranteeable to flow f. The CPU first determines whether there is enough bandwidth available to accept the flow (steps 1805–1810). The CPU next calculates $m_x$ and $m_y$ values as in the previous embodiments (steps 1815–1845,. The CPU then determines m as the maximum value between $m_x$ and $m_y$ (step 1850). This value is the minimum guaranteeable queuing delay, prior to translating the flex point to the $e_i$ on the right. Because all convex points fall on $e_i$ and all new flows are translated to fall on $e_i$ also, there is no possibility the envelope characterizing flow f being constrained by a concave interval. Therefore, the CPU does not need to calculate a $\bar{d}_b$ in order to satisfy the third constraint on fitting.

The CPU then determines the minimum guaranteeable queuing delay to be the starting point of the envelope when the flex point is translated to the closest $e_i$ on the right (step 1860). Note that it is always the case that the flex point can be moved to the closest $e_i$ on the right since the CPU has already determined that no convex points to the right constrains $\bar{A}_f^*(t)$.

Referring to FIG. 18, in procedure RESERVE_3, the CPU computes B in the same manner as in RESERVE_2 (FIG. 14). Variables $V_f(N)$ are not computed since concave points do not impose any constraints on schedulability in this embodiment. Variables $W_f(N)$ are computed in the same manner as in RESERVE_2 (steps 1910–1930). Note that $e_p$ is the $e_i$ to which flex point of $A_f^*$ is translated. Referring to FIG. 19, RELEASE_3 releases the resources reserved for a flow at the output port (FIG. 19).

FIGS. 22–25 show a fourth embodiment of the procedures used in flow admission control component. MINIMUM_DELAY_4 (FIG. 22) computes the minimum guaranteeable queuing delay. Two other procedures, RESERVE_4 (FIG. 23) and RELEASE_4 (FIG. 25), reserve and release resources at an output port. RESERVE_4 uses a procedure CHOOSE_COVER_4 (FIG. 24), which will be described in detail below.

In the fourth embodiment, the CPU uses a cover envelope to reserve resources for transmitting a flow. A cover envelope is an envelope that the CPU creates for reserving resources for a flow so that all convex points of F(t) are located on the discrete points $e_i$. The cover envelope also allows CPU not to translate $A_f^*$ as the CPU does in the third embodiment. Therefore, the minimum guaranteeable queuing delay is not increased due to such a translation. (Theorem 3 in the Appendix gives the formal solution for computing the minimum guaranteeable queuing delay when the convex points fall on discrete points $e_i$ and a cover envelope is used.)

Figure 20:
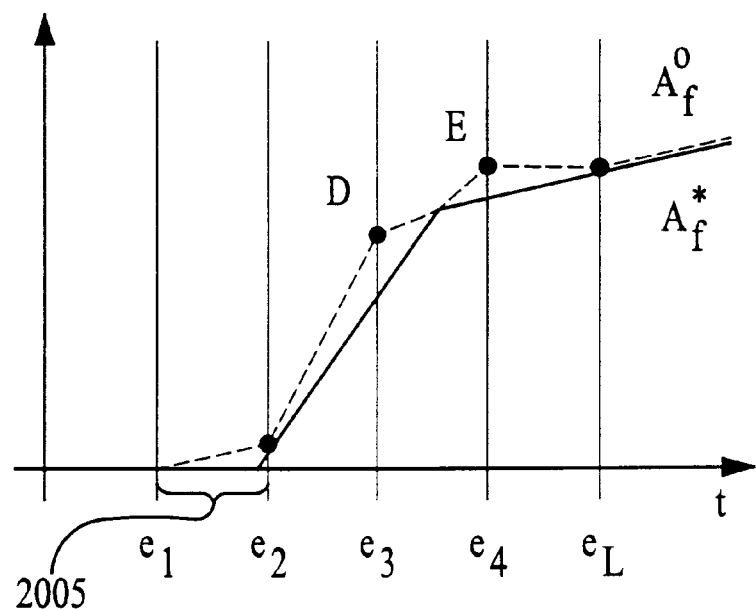
FIGS. 20 shows a cover envelope used in the fourth embodiment of the invention.

A cover envelope can be provided for $A_f^*(t)$ in many ways. Referring to FIG. 20, in this embodiment, a cover envelope $A^\circ_f(t)$ is defined by two segments. First, two points D and E define a first segment. The first segment is a straight line between D and E which are located on the two discrete points $e_3$ and $e_4$ which fall on either side of the flex point of $A^*_f(t)$. The first segment results in F(t) not having a convex point that corresponds to the flex point of $A^*_f(t)$ and instead having two convex points at $e_3$ and $e_4$ corresponding to D and E, respectively. Second, a second segment 2005 is located between $e_1$ and $e_2$ points, between which the starting point of $A^*_f(t)$ is located. This segment is a straight line from $A^*_f(t)$ at $e_2$ to the point F=0 at $e_1$. This segment results in all concave points of F(t) to be located on discrete points $e_i$. Therefore, the second segment results in F(t) being continuous between each pair of consecutive discrete points $e_i$. Note that the value of F(t) at the discrete points $e_i$ are not affected by the second segment and therefore no additional computation need be performed by the CPU with respect to the second segment.

The CPU executes CHOOSE_COVER_4 procedure (FIG. 24), which is called in RESERVE_4 procedure (FIG. 23), to select a cover envelope for a flow to reserve resources at an output port. These cover envelopes are stored and then used by the CPU when executing RELEASE_4 (FIG. 25) to release resources at the output port.

Figure 21A:
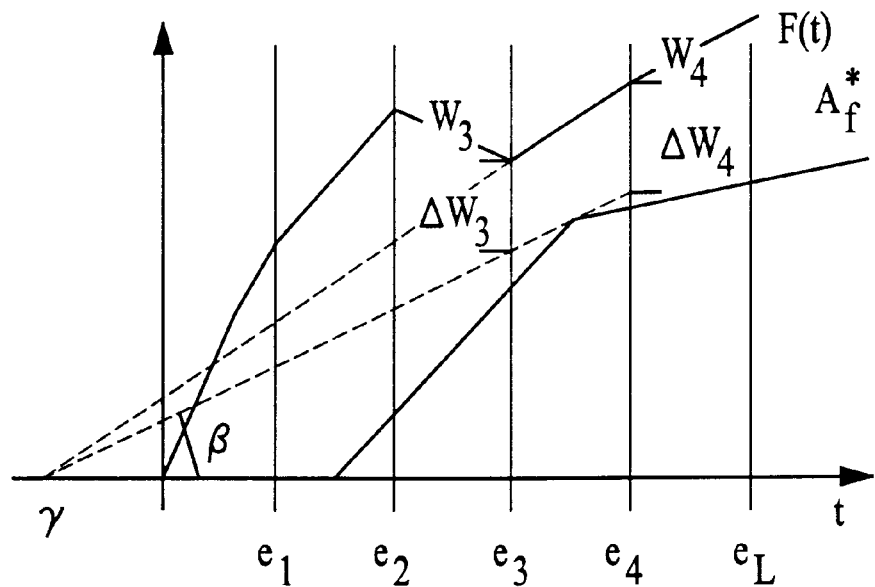
FIGS. 21A–D show the derivation of a segment of a cover envelope.

The CPU selects the cover envelope in CHOOSE_COVER_4 in accordance with the following method. Referring to FIG. 21A, after computing the minimum guaranteeable queuing delay, the CPU locates the two $e_i$ discrete points at either side of the flex point of $A_f^*(t)$ (e.g. $e_3$ and $e_4$ in FIG. 21A) The CPU then retrieves the value of F(t) at these discrete points, which are the $W_f(N)$ values ($W_3$ and $W_4$ in FIG. 21A). The CPU then computes a point of intersection $\gamma$ with the t-axis of a line that connects $W_3$ and $W_4$. The CPU next calculates the slope $\beta$ of a line connecting point $\gamma$ to the flex point of $A_f^*(t)$.

Figure 21B:
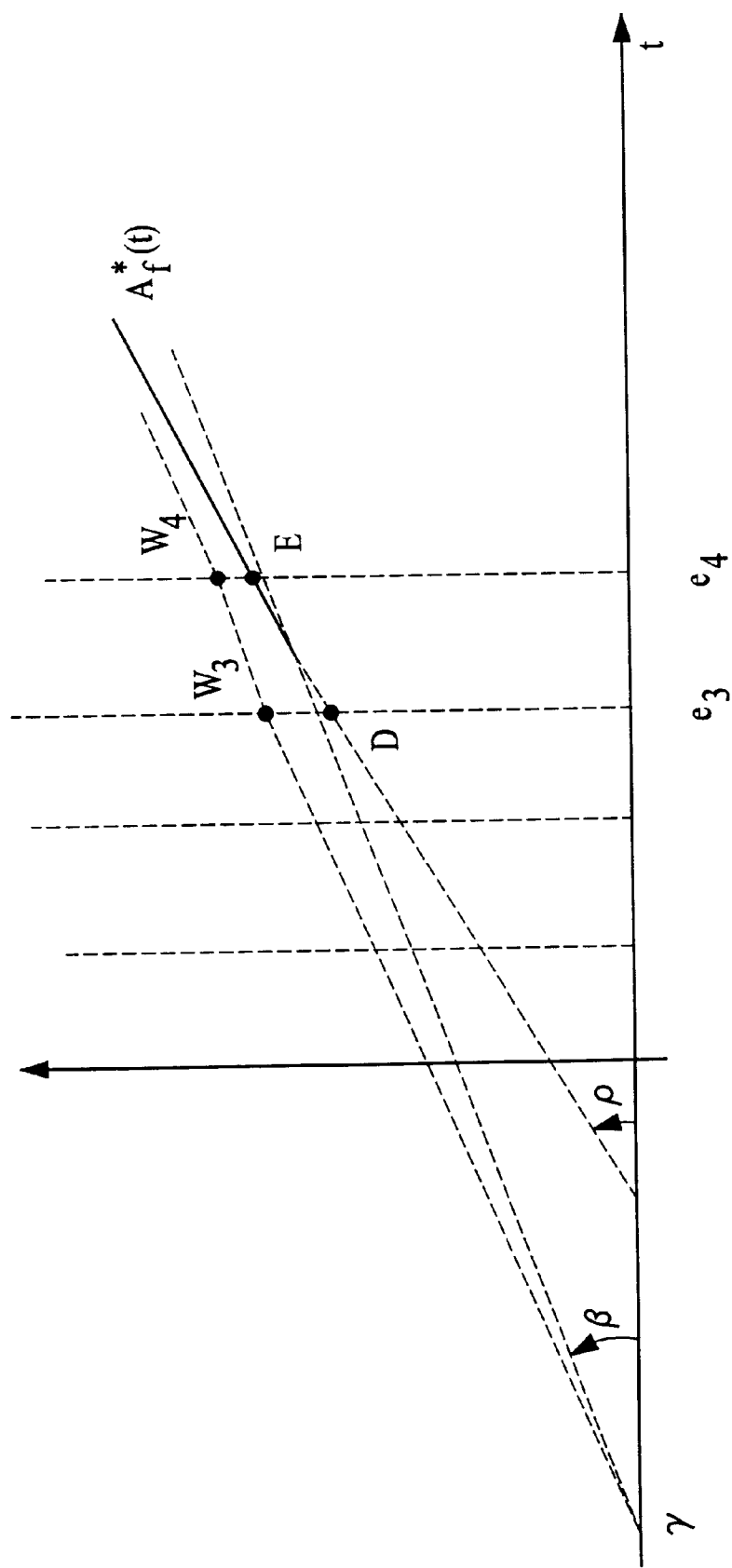
Figure 21C:
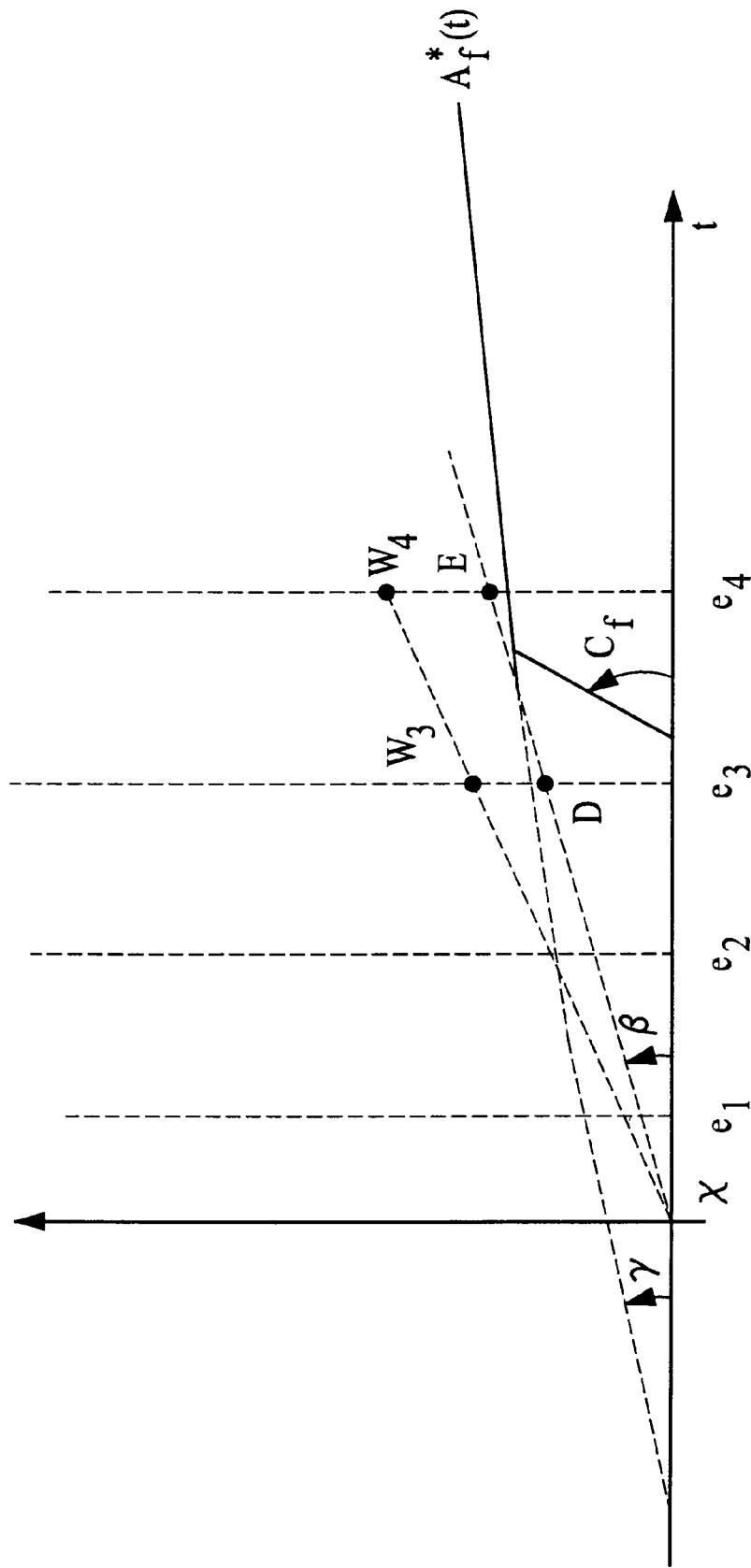
Figure 21D:
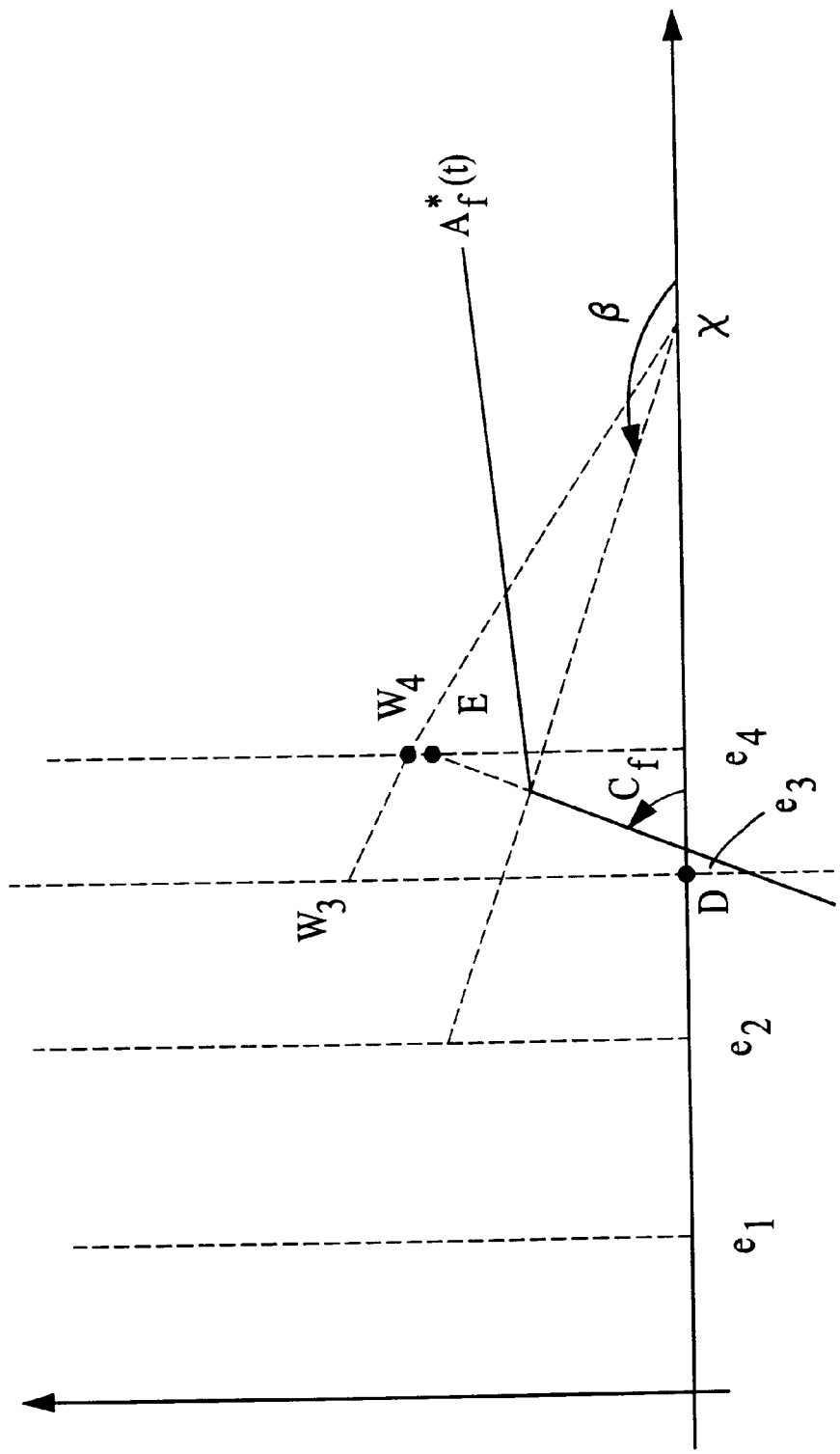

Referring to FIG. 21B, if slope $\beta$ is less than the average rate of flow $\rho_f$ of envelope $A^*_f(t)$, then D equals the point of intersection of the continuation of the second segment and the $e_i$ on the left of the flex point. Referring to FIG. 21C, if slope $\beta$ is between the slope of the first segment and the second segment of $A_f^*(t)$, D equals the value of a line which passes through $\gamma$ and the flex point at the $e_i$ on the left of the flex point. Referring to FIG. 21D, if slope $\beta$ is greater than the slope of the first segment, then D equals the value of the continuation of the first segment of $A_f^*(t)$ at the $e_i$ on the left of the flex point. In all of the above cases, if D is less than zero, the CPU sets D equal to zero (as in FIG. 21D); if D is greater than F(t), then the CPU sets D equal to F(t). The CPU then computes E by calculating the value of a line, which passes through D and the flex point of $A_f^*(t)$, at the $e_i$ on the right of the flex point. If E is greater than F(t), E is set equal to F(t) and D is recalculated using a line that passes through E and the flex point of $A^*_f(t)$.

The embodiments described so far assume that two-rate envelopes are used to characterize flows. However, one-rate envelopes may also be used to characterize flows. The principles of the invention disclosed in connection with the embodiments using the two-rate envelope equally apply in case of the one-rate envelope.

FIGS. 26–28 show a fifth embodiment of the procedures used in the flow admission control component. The procedures in this embodiment assume that one-rate envelopes are used to characterize flows. MINIMUM_DELAY_5 (FIG. 26) calculates the minimum guaranteeable queuing delay, when called in steps 665 and 625, FIG. 6. RESERVE_5 (FIG. 27) and RELEASE_5 (FIG. 28) reserve and release resources at the output port. These procedures are executed as part of flow admission control component in a similar manner as the other described embodiments. (Theorem 4 in the Appendix gives the formal solution for computing the minimum guaranteeable queuing delay in this embodiment.)

FIGS. 29–31 show a sixth embodiment of the procedures used in the flow admission control component. The procedures in this embodiment assume that one-rate envelopes are used to characterize flows. These procedures also use discretized points in time $e_i$ onto which the flex points of the envelopes are translated. MINIMUM_DELAY_6 (FIG. 29) calculates the minimum guaranteeable queuing delay, when called in steps 665 and 625, FIG. 6. RESERVE_6 (FIG. 30) and RELEASE_6 (FIG. 31) reserve and release resources at the output port. These procedures are executed as part of the flow admission control component in a similar manner as the other described embodiments. (Theorem 5 in the Appendix gives the formal solution for computing the minimum guaranteeable queuing delay in this embodiment.)

Figure 32A:
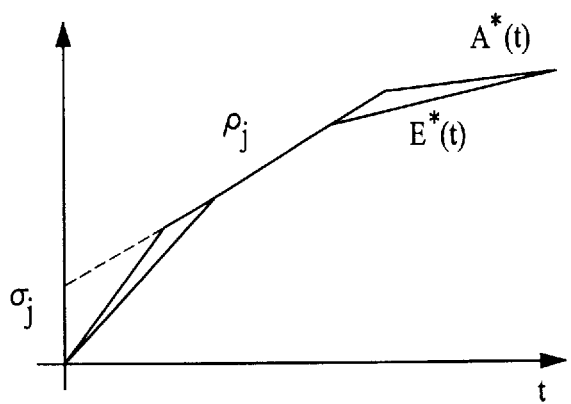
FIGS. 32A–B show an n-rate envelope characterization of a flow.
Figure 32B:
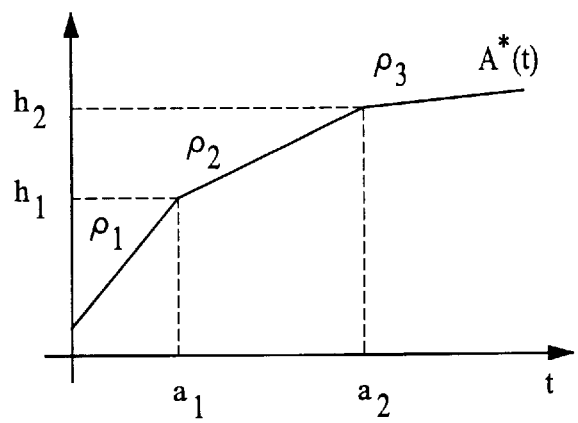

Referring to FIGS. 32A, an n-rate envelope $A^*(t)$, where n>2, may also be used to characterize a flow. N-rate envelopes better estimate minimum envelope E(t) of flows than either the one-rate or two-rate envelopes. They therefore reduce the over-reservation of resources at the output ports. N-rate envelopes are characterized by n segments, each having a specific rate of flow. They have n−1 flex points. In the case of the envelope A*(t) shown in FIG. 32B, envelope A*(t) is a 3-rate envelope. It is characterized by three rates of flow $\rho_1$, $\rho_2$, and $\rho_3$ and two flex points $h_1$ and $h_2$ at $t=a_1$ and $t=a_2$, respectively.

Two embodiments of the invention for the case of n-rate envelopes being used to characterize flows is disclosed. These embodiments are based on the general principles of the invention disclosed for the case of two-rate envelopes being used to characterize flows.

FIGS. 34–37 show a seventh embodiment of the procedures used by the flow admission control component. These procedures assume that n-rate envelopes are used to characterize flows. MINIMUM DELAY_7 (FIG. 34) calculates the minimum guaranteeable queuing delay, when called in steps 665 and 625, FIG. 6. COMPUTE_z_7 (FIG. 35) computes z, which is the same as $\bar{d}_b$ in the first embodiment, when called in MINIMUM_DELAY_7. RESERVE_7 (FIG. 36) and RELEASE_7 (FIG. 37) reserve and release resources at the output port. These procedures are executed as part of flow admission control component in the same manner as the other described embodiments. (Theorem 6 in the Appendix gives the formal solution for computing the minimum guaranteeable queuing delay in this embodiment.)

Figure 33:
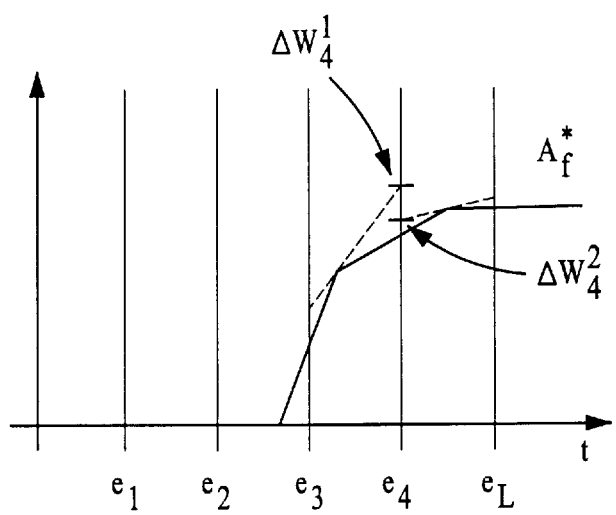
FIG. 33 shows the derivation of a cover envelope for an n-rate envelope.

FIGS. 38–41 show an eighth embodiment of the procedures used in the flow admission control component. These procedures assume that n-rate envelopes are used to characterize flows. The eight embodiment uses discretized points in time $e_i$ and cover envelopes, in a similar way as the fourth embodiment uses them for two-rate envelopes. However, there is one principle difference between selecting a cover envelope for an n-rale envelope and a two-rate envelope. The difference stems from the fact that an n-rate envelope $A_f^*(t)$ has multiple flex points. Therefore, the cover segments chosen by the method described for two rate envelopes might yield a non-continuous cover envelope, as illustrated in FIG. 33. In such a case, the point defining the cover envelope at a particular $e_i$ is selected to be the maximum value of the points computed by the method disclosed for the second embodiment.

In the eighth embodiment, MINIMUM_DELAY_8 (FIG. 38) calculates the minimum guaranteeable queuing delay, when called in steps 665 and 625, FIG. 6. RESERVE_8 (FIG. 40) and RELEASE_8 (FIG. 41) reserve and release resources at the output port. RESERVE_8 uses CHOOSE_COVER_8 (FIG. 39) to select a cover envelope. These procedures are executed as part of the flow admission control component in the same manner as the other described embodiments. (Theorem 7 in the Appendix gives the formal solution for computing the minimum guaranteeable queuing delay in this embodiment.)

All embodiments described so far assume that a preemptive EDF scheduling policy is implemented at the output port. In contrast to preemptive EDF scheduling policy, in nonpreemptive EDF scheduling policy, a packet may be delayed by the transmission time of one other packet that has a later deadline. (Note that packets with an earlier deadline would not have been preempted in preemptive EDF, anyway, and therefore are not of special concern.) In case of a nonpreemptive EDF output port, the CPU must take into account this added delay when providing a minimum guaranteeable delay. Otherwise, the output port may fail in fulfilling the delay guarantee in the contract of service. For example, when a packet arrives that must be transmitted immediately (e.g. the packet has an assigned delay of zero), if the packet has to wait for completion of a transmission in progress, the packet may be delayed beyond its assigned delay.

The schedulability condition in case of a nonpreemptive EDF scheduling policy takes into account the fact that a packet may have to wait for at least one other packet to be transmitted. The schedulability condition is expressed as:

$$ct \geq \sum_{i=1}^{N} A_i^*(t - d_i) + \left(\max_{\substack{1 \leq i \leq N \\ d_i > t}} p_i\right) \delta_{d_1 d_N}(t) \forall\, t \geq 0$$

where $p_i$ is the maximum packet size of flow i and $\delta_{ab}(t)$ is defined by:

$$\delta_{ab}(t) = \begin{cases} 1 & a < t < b \\ 0 & \text{otherwise} \end{cases}$$

where $d_1 \leq d_2 \leq \ldots d_N$. The added term to schedulability condition determines the maximum size of packets in the flows having an assigned delay larger than t. By subtracting this term, the schedulability condition takes into account the possibility of a packet being delayed by transmission time of a packet with an earlier deadline.

Based on the above schedulability condition, we have defined a function F(t), similar to F(t) in the previous embodiments, which is:

$$F(t) = ct - \sum_{i=1}^{N} A_i^*(t - d_i) - \left(\max_{\substack{1 \leq i \leq N \\ d_i > t}} p_i\right) \delta_{d_1 d_N}(t)$$

If the envelopes in the set $N' = \{1, 2, \ldots N\} \cup \{f\}$ are ordered in an increasing order of $d_i$, i.e., $d_1 \leq \ldots \leq d_f \leq \ldots \leq d_{N+1}$, then, based on the principles of the invention disclosed for embodiments using preemptive EDF scheduling policy, the condition of schedulability of flows in the set of N' is given by:

$$F'(t) = ct - \sum_{i=1}^{N'} A_i^*(t - d_i) - \left(\max_{\substack{1 \leq i \leq N+1 \\ d_i > t}} p_i\right) \delta_{d_1 d_{N+1}}(t) \geq 0$$

Figure 42:
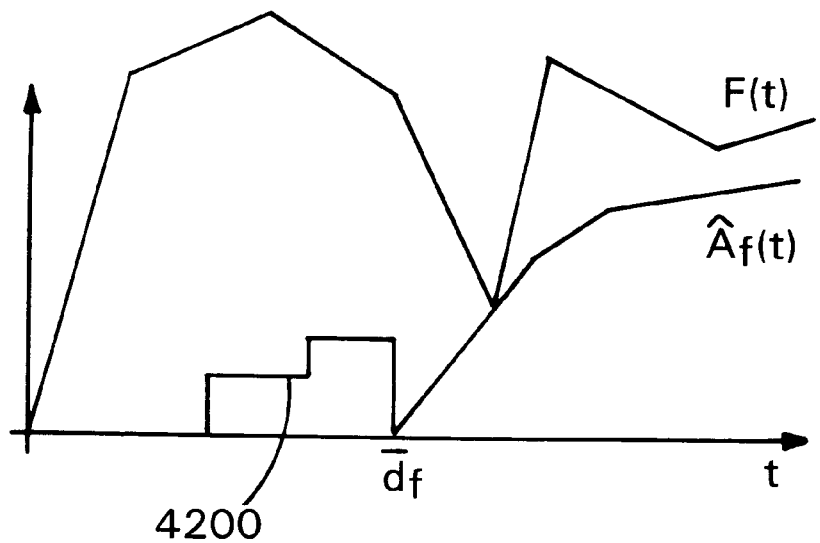
FIGS. 42 and 43 show fitting of an envelope characterizing a flow to a resource availability function for a non-preemptive EDF output port.

Therefore, for a new flow f to be admitted, F(t) at all convex points must be greater than or equal to $\hat{A}_f$ where $\hat{A}_f$ is:

$$\hat{A}_f(t) = A_f^*(t - d_f) + \left(p_f - \max_{\substack{1 \leq i \leq N \\ d_i > t}} p_i\right)^+ \delta_{d_i d_f}(t)$$

where $p_f$ is the maximum packet size for flow f. The added term represents the extent to which the maximum packet size for flow f is larger than the maximum packet size of already accepted flows which have earlier deadlines. Therefore, the added term represents how the acceptance of the new flow may affect the delay bounds of already accepted flows which have earlier deadlines. Curve 4200 in FIG. 42 represents this added term.

F(t) and $\hat{A}_f(t)$ are then used, based on the principles of the invention already described, to compute the minimum guaranteed delay for a nonpreemptive EDF output port. The CPU fits both segments of $\hat{A}_f$ to F(t) to determine the minimum guaranteeable queuing delay.

Figure 43:
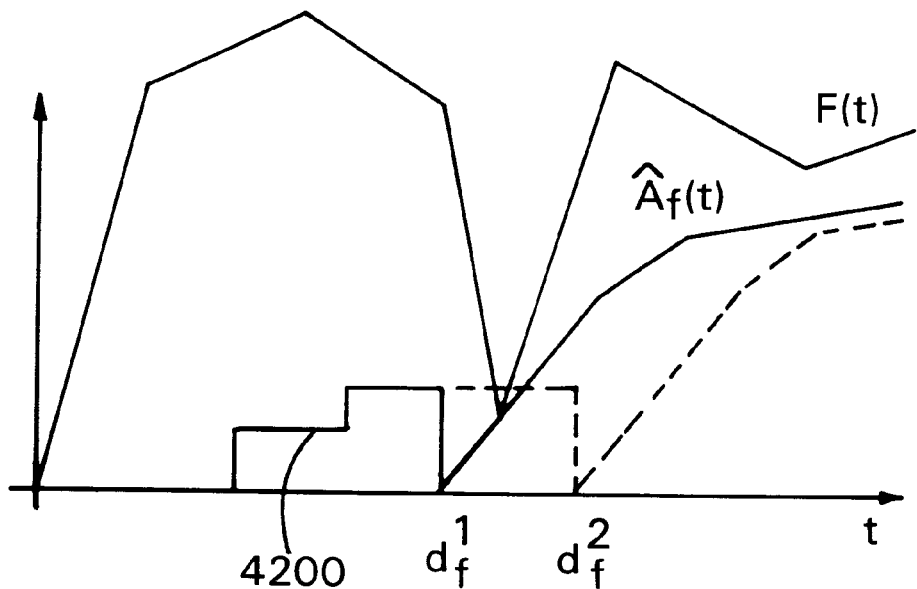

However, $\hat{A}_f(t)$ unlike $A^*_f(t)$ is not necessarily nondecreasing; it can actually be decreasing at $d_f$. Therefore, if $\hat{A}_f(t)$ is translated to the right it is possible that it might be constrained by F(t), as shown in FIG. 43. Hence, it is no longer the case that if the router supplies a minimum guaranteeable router delay, it can also support an assigned delay larger than the supplied minimum guaranteeable router delay.

In one embodiment of the invention in which the output port uses a nonpreemptive EDF scheduling policy, to deal with the above difficulty, the minimum guaranteeable delay is computed as if preemptive EDF scheduling policy was implemented at the output port. Then, the time of transmission for a packet that has a maximum permitted size is added to that minimum guaranteeable delay. Since no packet can be delayed beyond the transmission time of such a packet, the difficulty is solved. (In essence, a nondecreasing cover envelope is provided for the flows.)

Mathematically, where the packet size of the flows at an output port are limited to a maximum permitted size, the schedulability condition for a non-preemptive EDF output port becomes:

$$ct \geq \sum_{i \in N} A^*_i(t - d_i) + p_{\max}, \quad \forall t \geq \min_{1 \leq i \leq N}(d_i) \quad (33)$$

which may also be written as:

$$ct \geq \sum_{i \in N} A^*_1\left(t - d_i - \frac{p_{\max}}{c}\right), \quad \forall t \geq 0 \quad (34)$$

where $p_{max}/c$ is the transmission time of a packet that has the maximum permitted size.

The maximum permitted packet size may be a universal packet size as in ATM mode transmission, where all packets are of fixed length of 53 bytes. A constant is therefore added to all minimum guaranteeable delays. The maximum permitted packet size may also depend on individual components of the network. In RSVP Qos transmission, where each router enforces a maximum permitted packet size for the packets handled by the router, each router adds the time of transmission of such a packet to the minimum guaranteeable delay. In another embodiment, other nondecreasing cover envelopes can be used for reservation of resources. These envelopes may also be used to ensure that flex point of F(t) fall on discrete points $e_i$.

In the above embodiments using discrete points $e_i$, the discrete point $e_i$ may be equally spaced or unequally spaced. In case of an unequal spacing of $e_i$ points, various methods may be used to determine the spacing. For example, a geometrical spacing, which will have the following characteristic, may be used:

$$\frac{e_3 - e_2}{e_2 - e_1} = \frac{e_4 - e_3}{e_3 - e_2} = \ldots = \frac{e_L - e_{L-1}}{e_{L-1} - e_{L-2}} = \text{spacing factor}$$

In the embodiments described, admission control function was performed in a distributed fashion across the network: at each router minimum guaranteeable delay for that router was determined. However, this function may be performed outside a router, for example by another router or a central admission authority in the network. Such arrangements may be preferable in cases of small networks or in case of routers not having the capacity to calculate the minimum guaranteeable delay within the router.

Other embodiments are within the following claims.

APPENDIX A

Lemma 1

Let N be a schedulable set of flows $(C_i, \sigma_i, \rho_i, d_i)_{i \in N}$ sorted in increasing order of $(d_i + a_i)$, and let $(C_f, \sigma_f, \rho_f)$ characterize a new flow f such that the stability condition $\Sigma_{i \in N} + \rho_i + \rho_f < c$ is satisfied.

1. Let $(y_i)_{i \in N}$ such that $$F(d_i + a_i) = C_f(d_i + a_i - y_i) \quad i \in N$$

$$\text{and let } m_y = \max_{\substack{i \in N \\ F(d_i + a_i) < C_f a_f}} Y_i).$$

Let $(x_i)_{i \in N}$ such that $$F(d_i + a_i) = \sigma_f + \rho_f(d_i + a_i - x_i) \quad i \in N$$

$$\text{and let } m_x = \max\left(0, \max_{\substack{i \in N \\ F(d_i + a_i) \geq C_f a_f}} x_i\right).$$

Let $m = \max(m_x, m_y)$ and b, $1 \leq b \leq N+1$, such that $$d_{b-1} + a_{b-1} < m + a_f \leq d_b + a_b$$

where $d_0$ and $a_0 = -\infty$ and $d_{N+1} + a_{N+1} = \infty$. Then b exists and is unique.

2. If $$F(d_b + a_b) > C_f a_f$$

and $$F(d_{b-1} + a_{b-1}) < C_f a_f$$

Let $\bar{d}_b$ such that $$d_{b-1} + a_{b-1} < \bar{d}_b + a_f < d_b + a_b$$

and $$F(\bar{d}_b + a_f) = C_f a_f$$

Then $\bar{d}_b$ exists, is unique and $$F(t) < C_f a_f \ t \in (d_{b-1} + a_{b-1}, \bar{d}_b + a_f)$$

$$F(t) > C_f a_f \ t \in (\bar{d}_b + a_f, d_b + a_b)$$

3. Let $\bar{d}$ such that:

$$\bar{d} = \begin{cases} \max(m, \bar{d}_b) & \text{if } F(d_b + a_b) > C_f af \text{ and } F(d_{b-1} + a_{b-1}) < C_f a_f \\ m & \text{otherwise} \end{cases}$$

Then $\bar{d} > 0$ and $$d_{b-1} + a_{b-1} < \bar{d} + a_f \leq d_b + a_b$$

A. Proof of Lemma 1

1. From the hypothesis we have that $(d_i + a_i)_{0 \leq i \leq N+1}$ is nondecreasing with i. Since $m > d_0 + a_0 = -\infty$ and $m < d_{N+1} + a_{N+1} = \infty$, we conclude that there is a unique b, $1 \leq b \leq N+1$ such that $$d_{b-1} + a_{b-1} < m + a_f \leq d_b + a_b$$

is satisfied.

2. Assume $F(d_b+a_b)>C_f a_f$ and $F(d_{b-1}+a_{b-1})<C_f a_f$. For $t \in (d_{b-1}+a_{b-1}, d_b+a_b)$ we have:

$$F(t) = ct - \sum_{i=1}^{b-1}(\sigma_i + \rho_i(t-d_i)) - \sum_{\substack{i=b \\ d_i<t}}^{N} C_i(t-d_i)$$

and thus:

$$\frac{dF}{dt}(t) = c - \sum_{i=1}^{b-1} \rho_i - \sum_{\substack{i=b \\ d_i<t}}^{N} C_i$$

Hence, dF/dt is non-increasing, since more $C_i$ terms are possibly subtracted as t increases. Consequently, F is concave on ($d_{b-1}+a_{b-1}$, $d_b+a_b$). Given that $F(d_b+a_b)>C_f a_f$, $F(d_{b-1}+a_{b-1})<C_f a_f$, F is continuous and concave we conclude that $F(t)=C_f a_f$ has a unique solution on ($d_{b-1}+a_{b-1}$, $d_b+a_b$). Let $\bar{d}_b$ such that $\bar{d}_b+a_f \in (d_{b-1}+a_{b-1}, d_b+a_b)$ and $F(\bar{d}_b+a_f)=C_f a_f$.
Then
$F(t)<C_f a_f$ $t \in (d_{b-1}+a_{b-1}, \bar{d}_b+a_f)$ $F(t)>C_f a_f$ $t \in (\bar{d}_b+a_f, d_b+a_b)$ follow from F having the above mentioned properties.
3. $\bar{d} \geq 0$ since $\bar{d} \geq m \geq m_x \geq 0$.

$d_{b-1}+a_{b-1}<\bar{d}+a_f \leq d_b+a_b$ follows from $d_{b-1}+a_{b-1}<m+a_f \leq d_b+a_b$ and $d_{b-1}+a_{b-1}<\bar{d}_b+a_f<d_b+a_b$

Theorem 1

$\bar{d}$ defined in Lemma 1 is the minimum guaranteeable queuing delay.
Proof of Theorem 1
1. We prove that d can be guaranteed to flow f.
Let $\bar{d}$ and b be defined as in Lemma 1. The scheduling conditions for the set $N \cup \{f\}$ are:

$$d_i \geq 0 \ i \in N \tag{20}$$

$$\bar{d} \geq 0 \tag{21}$$

$$F(d_i + a_i) \geq 0 d_i + a_i \geq \bar{d}, i \in N \tag{22}$$

$$F(d_i + a_i) - C_f(d_i + a_i - d) \geq 0 \bar{d} < d_i + a_i \leq \bar{d} + a_f, i \in N \tag{23}$$

$$F(\bar{d} + a_f) - C_f a_f \geq 0 \tag{24}$$

$$F(d_i + a_i) - (\sigma_f + \rho_f(d_i + a_i - \bar{d})) \geq 0 \bar{d} + a_f < d_i + a_i, i \in N \tag{25}$$

1.1 Since we assume that the set N is schedulable, (20) and (22) are true. Relation (21) follows from Lemma 1.3.
1.2 consider (25). We begin by establishing $F(d_i+a_i) \geq C_f a_f$, $i \geq b$ (26)

by contradiction. Choose $i \geq b$ such that $F(d_i+a_i)<C_f a_f$. Then $m \geq m_y \geq m_i = d_i+a_i-F(d_i+a_i)/C_f > d_i+a_i-a_f \geq d_b+a_b-a_f$ Thus $m+a_f>d_b+a_b$, which contradicts $d_{b-1}+a_{b-1}<m+a_f \leq d_b+a_b$ Hence (26) holds. Consequently, $\bar{d} \geq m \geq m_x \geq x_i$ for $i \geq b$. Thus, $F(d_i+a_i) \geq \sigma_f + \rho_f(d_i+a_i-\bar{d})$, $i \in N$, $i \geq b$ (27)

Since $\bar{d}+a_f \geq m + a_f > d_{b-1}+a_{b-1}$ from $d_{b-1}+a_{b-1}<m+a_f \leq d_b+a_b$ we have that $\bar{d}+a_f<d_i+a_i$, $i \in N$ implies $d_i+a_i \geq d_b+a_b$, $i \in N$, and with (27) we conclude (25).
1.3 Let us establish (23) Let $d_i+a_i \leq \bar{d}+a_f$. If $F(d_i+a_i) \geq C_f a_f$ then, since $C_f a_f \geq C_f(d_i+a_i-\bar{d})$ for $d_i+a_i \leq \bar{d}+a_f$, we have $F(d_i+a_i)-C_f(d_i+a_i-\bar{d}) \geq 0$. conversely, if $F(d_i+a_i)<C_f a_f$ then $\bar{d} \geq m \geq m_y \geq y_i$ and from $F(d_i+a_i)=\sigma_f+\rho_f(d_i+a_i-x_i)$ $i \in N$ we have $F(d_i+a_i) \leq C_f(d_i+a_i-\bar{d})$ and we conclude (23).
1.4 Let us prove (24). We have three cases.
1.4.1 $\bar{d}+a_f=d_b+a_b$. Then (24) follows from (23) with $d_i+a_i=d_b+a_b$.
1.4.2 $F(d_{b-1}+a_{b-1}) \geq C_f a_f$. Since $F(d_b+a_b) \geq C_f a_f$ (from (26)), and because F(t) is concave for $t \in (d_{b-1}+a_{b-1}, d_b+a_b)$, we have $F(t)>C_f a_f$, $\forall t \in [d_{b-1}+a_{b-1}, d_b+a_b]$. Thus $F(\bar{d}+a_f) \geq C_f a_f$ from $d_{b-1}+a_{b-1}<\bar{d}+a_f \leq d_b+a_b$ 1.4.3 $\bar{d}+a_f<d_b+a_b$ and $F(d_{b-1}+a_{b-1})<C_f a_f$. We have $F(d_b+a_b)>C_f a_f$ from $\bar{d}+a_f<d_b+a_b$ and $F(d_i+a_i)=C_f(d_i+a_i-y_i)$ $i \in N$ with $\bar{d} \geq x_b$, and thus, according to Lemma 1.2 $\bar{d}_b$ exists and $C_f a_f \leq F(t)$, $t \in [\bar{d}_b+a_f, d_b+a_b]$ It follows from the fact that $\bar{d} \geq \bar{d}_b$ and from $d_{b-1}+a_{b-1}<\bar{d}+a_f \leq d_b+a_b$ that $\bar{d}+a_f \in [\bar{d}_b+a_f, d_b+a_b]$, which contradicts with the last relation, implying (24).
2. We prove by contradiction that $\bar{d}$ is the minimum delay that can be guaranteed to f. Suppose there is a delay $\bar{d}' \geq 0$, $\bar{d}'<\bar{d}$, that can be guaranteed to f. We have three cases:
2.1 $\bar{d}=m_x$ and $\bar{d}'<m_x$. For any i such that $i \leq b-1$ and $F(d_i+a_i)>C_f a_f$ we have $x_i+a_f<d_i+a_i$ from (16). Thus $x_i+a_f<d_{b-1}+a_{b-1}<m+a_f$ and so $x_i<m_x$ for $i \leq b-1$ (since $\bar{d}=m_x=m$). From this and (26) we have $m_x=\max_{i \geq b} x_i$. Thus $\bar{d}<m_x$ implies that there is k, $b \leq k \leq N$ s.t. $\bar{d}'<x_k$. But $\bar{d}'+a_f<m+a_f \leq d_b+a_b \leq d_k+a_k$, and thus, for $N'=N \cup \{f\}$ to be schedulable it is necessary that (25):

$F(d_k+a_k)-(\sigma_f+\rho_f(d_k+a_k-\bar{d}')) \geq 0$

From $\bar{d}'<x_k$ and from $F(d_i+a_i)=C_f(d_i+a_i-y_i)$ $i \in N$ for i=k we have $F(d_k+a_k)=\sigma_f+\rho_f(d_k+a_k-x_k)<\sigma_f+\rho_f(d_k+a_k-\bar{d}')$ which leads to a contradiction.

2.2 $\bar{d}=m_y$ and $\bar{d}'<m_y$. From (26) follows that $$m_y = \underset{F(d_i+a_i)<C_f a_f}{i \leq b-1} y_i.$$

Thus $\bar{d}'<m_y$ implies that there is k, $1 \leq k \leq b-1$ such that $\bar{d}'<y_k$ and $F(d_k+a_k)<C_f a_f$. If $d_k+a_k>\bar{d}'+a_f$ then for N' to be schedulable it is necessary that (25):

$$F(d_k+a_k)-(\sigma_f+\rho_f(d_k+a_k-\bar{d}')) \geq 0$$

But $F(d_k+a_k)<C_{faf}$ and $\sigma_f+\rho_f(d_k+a_k-\bar{d}')>\sigma_f+\rho_{faf}=C_f a_f$ which leads to contradiction.

Conversely, let us consider $d_k+a_k \leq \bar{d}'+a_f$. From $$F(d_i+a_i)=\sigma_f+\rho_f(d_i+a_i-x_i) \; i \in N$$

taking i=k, and since $F(t) \geq 0 \; \forall t$ (N is schedulable), we have $y_k \leq d_k+a_k$. So, $\bar{d}'<d_k+a_k$. Thus, for N' to be schedulable it is necessary that (23):

$$F(d_k+a_k)-C_f(d_k+a_k-\bar{d}') \geq 0$$

But from $$F(d_i+a_i)=\sigma_f+\rho_f(d_i+a_i-x_i) \; i \in N$$

with i=k and $\bar{d}'<y_k$ we have $$F(d_k+a_k)=C_f(d_k+a_k-y_k)<C_f(d_k+a_k-\bar{d}')$$

which leads to a contradiction.

2.3 $\bar{d}=\bar{d}_b$ and $\bar{d}'<\bar{d}_b$. Then $\bar{d}_b$ exists (and thus $F(d_b+a_b)>C_f a_f$ and $F(d_{b-1}+a_{b-1})<C_f a_f$ from Lemma 1.2) and $$\bar{d}'+a_f<\bar{d}_b+a_f \qquad (28)$$

If $\bar{d}'+a_f \leq d_{b-1}+a_{b-1}$ then for N' to be schedulable it is necessary that (25):

$$F(d_{b-1}+a_{b-1})-(\sigma_f+\rho_f(d_{b-1}+a_{b-1}-\bar{d}')) \geq 0$$

But $F(d_{b-1}+a_{b-1})<C_{faf}$ and $\sigma_f+\rho_f(d_{b-1}+a_{b-1}-\bar{d}') \geq \sigma_f+\rho_{faf}=C_{faf}$, which leads to contradiction.

Conversely, let us consider $d_{b-1}+a_{b-1}<\bar{d}'+a_f$. For N' to be schedulable it is necessary that (24):

$$F(\bar{d}'+a_f)-C_f a_f \geq 0$$

But from $d_{b-1}+a_{b-1}<\bar{d}'+a_f$, (28) and (22) we have $$F(\bar{d}'+a_f)<C_{faf}$$

which leads to a contradiction.

Since in all the above cases we have found contradictions, we conclude that $\bar{d}$ is the minimum delay that can be guaranteed to f.

Theorem 2

Let a discrete-EDF scheduler have a set L={1, 2, ... L} of classes of flex-points, $e_1<e_2<\ldots e_L$. Let N be a schedulable set of flows $(C_i, \sigma_i, \rho_i, d_i)_{i \in N}$, sorted in increasing order of $d_i+a_i$ and $d_i+a_i \in (e_i)_{i \in L}$, and let $(C_f, \sigma_f, \rho_f)$ characterize a new flow f such that the stability condition $\Sigma_{i \in N} \rho_i + \rho_f < c$ is satisfied.

1. Let $(y_i)_{i \in L}$ such that $$F(e_i) = \sigma_f + \rho_f(e_i - x_i) \; i \in \mathcal{L}$$

and let $m_y = \max\left(0, \max_{\substack{i \in \mathcal{L} \\ F(e_i)<C_f a_f}} y_i\right).$ Let $(x_i)_{i \in L}$ such that $$F(e_i) = \sigma_f + \rho_f(e_i - x_i) \; i \in \mathcal{L}$$

and let $m_x = \max\left(0, \max_{\substack{i \in \mathcal{L} \\ F(e_i) \geq C_f a_f}} x_i\right).$ Let $m=\max(m_x, m_y)$ and b, $1 \leq b \leq L+1$, such that $$e_{b-1}<m+a_f \leq e_b$$

where $e_0=-\infty$ and $e_{L+1}=\infty$. Then b exists and is unique.
2. f can be scheduled and $\bar{d}=(e_b-a_f)$ is the minimum delay that can be guaranteed to flow f by the discrete-EDF scheduler.

Theorem 3

Let a discrete EDF scheduler have capacity c and a set of flex point positions P={$e_l | 1 \leq l \leq L$}, with P={$e_{-e}=-\infty<e_0=0<e_1<e_2<\ldots e_{L+1}=\infty$}. Let $((A_l^\circ(e_l))_{1 \leq l \leq L}, a_i)_{l \leq i \leq N}$ be a schedulable set of envelopes, and let $(C_f, \sigma_f, \rho_f)$ characterize a new flow f such that the stability condition $\Sigma_{i \in N} a_i + \rho_f < c$ is satisfied.

1. Let $(y_i)_{i \in L}$ such that $$F(e_i) = C_f(e_i - y_i) \; i \in \mathcal{L}$$

and let $m_y = \max_{\substack{i \in \mathcal{L} \\ F(e_i) \geq h_f}} (y_i)^+.$

Let $(x_i)_{i \in L}$ such that $$F(e_i) = \sigma_f + \rho_f(e_i - x_i) \; i \in \mathcal{L}$$

and let $m_x = \max_{\substack{i \in \mathcal{L} \\ F(e_i) \geq h_f}} (x_i)^+.$

Let $m=\max(m_x, m_y)$ and b, $0 \leq b \leq L$, such that $$e_b \leq m+a_f<e_{b+1}$$

then b exists and is unique.
2. Define z as follows.
If $F(e_b)<h_f<F(e_{b+1})$:

-if $b = L$, z satisfies $$c - \sum_{i=1}^N \alpha_i = \frac{h_f - F(e_L)}{z + a_f - e_L}$$

-If $0 \leq b \leq L-1$, z satisfies $$\frac{F(e_{b+1}) - F(e_b)}{e_{b+1} - e_b} = \frac{h_f - F(e_L)}{z + a_f - e_b}$$

Otherwise ($F(e_b) \geq h_f$ or $F(e_{b+1}) \leq h_f$), define z=0. Then z exists and is unique.
3. Define $\bar{d}_f$ by $\overline{d}_f = \max(m, z)$ Then $\overline{d}_f$ is the minimum delay that can be guaranteed to flow f by the discrete EDF scheduler.

Theorem 4

Let N be a schedulable set of flows $(\sigma_i, \rho_i, d_i)_{i \in N}$ sorted in increasing order of $(d_i)$, and let $(\sigma_f, \rho_f)$ characterize a new flow f such that the stability condition $\Sigma_{i \in N} \rho_i + \rho_f < c$ is satisfied.

1. Let $(x_i)_{i \in N}$ such that $$F(d_i) = \sigma_f + \rho_f(d_i - x_i) \quad i \in N$$

and let $m_x = \max_{\substack{i \in N \\ F(d_i) < \sigma_f}} (x_i, 0)$.

Let $m_y = \max_{\substack{i \in N \\ F(d_i) < \sigma_f}} (y_i, 0)$.

Let $m = \max(m_x, m_y)$ and b, $1 \leq b \leq N+1$, such that $d_{b-1} < m \leq d_b$ where $d_0 = -\infty$ and $d_{N+1} = \infty$. Then b exists and is unique.

2. If $F(d_b) > \sigma_f$ and $F(d_{b-1}) < \sigma_f$ let $\overline{d}_b$ such that $d_{b-1} < \overline{d}_b < d_b$ and $F(\overline{d}_b) = \sigma_f$ Then $\overline{d}_b$ exists, and is unique.

3. Let $\overline{d}$ such that:

$$\overline{d} = \begin{cases} \max(m, \overline{d}_b) & \text{if } F(d_b + a_b) > C_f a_f \text{ and } F(d_{b-1} + a_{b-1}) < C_f a_f \\ m & \text{otherwise} \end{cases}$$

Then $\overline{d} \geq 0$ is the minimum delay that can be guaranteed to flow f.

Theorem 5

Let a discrete-EDF scheduler have a set $L = \{1, 2, \ldots L\}$ of classes of delays, $e_1 < e_2 < \ldots e_L$. Let N be a schedulable set of flows $(\sigma_i, \rho_i, d_i)_{i \in N}$, sorted in increasing order of $d_i$ and $d_j \in (e_i)_{i \in L}$, and let $(\sigma_f, \rho_f)$ characterize a new flow f such that the stability condition $\Sigma_{i \in N} \rho_i + \rho_f < c$ is satisfied.

1. Let $(x_i)_{i \in L}$ such that $$F(e_i) = \sigma_f + \rho_f(e_i - x_i) \quad i \in \mathcal{L}$$

and let $m_x = \max_{\substack{i \in \mathcal{L} \\ F(e_i) \geq \sigma_f}} (x_i, 0)$.

let $m_y = \max_{\substack{i \in \mathcal{L} \\ F(e_i) \geq \sigma_f}} (e_i, 0)$.

Let $m = \max(m_x, m_y)$ and b, $1 \leq b \leq L+1$, such that $e_{b-1} < m \leq e_b$ where $e_0 = -\infty$ and $e_{L+1} = \infty$. Then b exists and is unique.

2. If $b = L+1$ then the flow f cannot be scheduled by the discrete-EDF scheduler. Otherwise f can be scheduled and $\overline{d} = e_b$ is the minimum delay that can be guaranteed to flow f by the discrete-EDF scheduler.

Theorem 6

Let $((\sigma_{ij}, \rho_{ij})_{1 \leq j \leq n_i}, d_i)_{1 \leq i \leq N}$ be a schedulable set of envelopes and let $(\sigma_{fj}, \rho_{fj})_{1 \leq j \leq n_f}$ characterized a new flow f such that the stability condition $\Sigma_{i=1}^{N} \rho_{in_i} + \rho_{fn_f} < c$ is satisfied.

1. For each l, $1 \leq l \leq P$, let k, $1 \leq k \leq n_f$ such that $h_{fk-1} \leq F(u_l) < h_{fk}, u_l \in P$ and define $x_l$ by $F(u_l) = \sigma_{fk} + \rho_{fk}(u_l - x_l)$ Define $m_x$ by $$m_x = \max_{1 \leq l \leq P} (x_l)^+.$$

For each k, $1 \leq k \leq n_f - 1$, let $l_k$, $0 \leq l_k \leq N$, such that $u_{l_k} \leq m_x + a_{fk} < u_{l_k+1}$ where $u_{l_k}, u_{l_k+1} \in P$. Then $l_k$ exists and is unique.

2. For each k, $1 \leq k \leq n_f - 1$ define $z_k$ as follows.

If $F(u_{l_k}) < h_{fk} < F(u_{l_k+1})$ let $z_k$ such that:

$u_{l_k} < z_k + a_{fk} < u_{l_k+1}$ and $F(z_k + a_{fk}) = h_{fk}$

Otherwise $(F(u_{l_k}) \geq h_{fk}$ or $F(u_{l_k+1}) \leq h_{fk})$, define $z_k = 0$. Then $z_k$ exists and unique.

Define $m_z$ by:

$$m_z = \max_{1 \leq k \leq n_f - 1} (z_k)^+$$

3. Define $\overline{d}_f$ by:

$\overline{d}_f = \max(m_x, m_z)$

Then $\overline{d}_f$ is the minimum delay that can be guaranteed to flow f.

Theorem 7

Let a discrete EDF scheduler have capacity c and a set $P = \{e_l | 1 \leq l \leq L\}$ of flex point positions on the t-axis. Let $((A_l^\circ(e_l))_{1 \leq l \leq L}, a_i)_{1 \leq i \leq N}$ be a schedulable set of envelopes and let $(\sigma_{fj}, \rho_{fj})_{1 \leq j \leq n_f}$ characterize a new flow f such that the stability condition $\Sigma_{i=1}^{N} a_i + \rho_{fn_f} < c$ is satisfied.

1. For each l, $1 \leq l \leq L$, let k, $1 \leq k \leq n_f$ such that $h_{fk-1} \leq f(e_l) < h_{fk}$ and define $x_l$ by $F(e_l) = \sigma_{fk} + \rho_{fk}(e_l - x_l)$ Define $m_x$ by $$m_x = \max_{1 \leq l \leq P} (x_l)^+.$$

for each k, $1 \leq k \leq n_f - 1$, let $l_k$, $0 \leq l_k \leq L$, such that $e_{l_k} \leq m_x + a_{fk} < e_{l_k+1}$ where $e_{l_k}$, $e_{l_k+1} \in \overline{P}$. Then $l_j$ exists and is unique.

2. For k, $1 \leq k \leq n_f - 1$, define $z_k$ as follows.
If $F(e_{l_k}) < h_{fk} < F(e_{l_k}+1)$:

- if $l_k = L$, $z_k$ satisfies $$c - \sum_{i=1}^{N} a_i = \frac{h_{fk} - F(e_L)}{z_k + a_{fd} - e_L}$$

- if $0 \leq l_k < l$, $z_k$ satisfies $$\frac{F(e_{l_k}+1) - F(e_{l_k})}{e_{l_k}+1 - e_{l_k}} = \frac{h_{fk} - F(e_{l_k})}{z_k + a_{fk} - e_{l_k}}$$

Otherwise ($F(e_{l_k}) \geq h_{fk}$ or $F(e_{l_k}+1) \leq h_{fk}$), define $z_k = 0$.
Then $z_k$ exists and is unique.
Define $m_z$ by:

$$m_z = \max_{1 \leq k \leq n_f - 1} (z_k)^+$$

3. Define $\overline{d}_f$ by:

$\overline{d}_f = \max(m_x, m_z)$

Then $\overline{d}_f$ is the minimum delay that can be guaranteed to flow f by the discrete EDF scheduler.

What is claimed is:

1. A method for performing flow admission control for a network component, said method comprising:
   providing a function F(t) which characterizes resources available at the network component;
   receiving information characterizing a proposed flow of packets;
   defining an envelope A(t) based on the received information characterizing the proposed flow of packets;
   attempting to fit the envelope A(t) within F(t); and
   based on the step of attempting to fit the envelope within F(t), accepting or rejecting the proposed flow of packets.

2. The method of claim 1 wherein the step of attempting to fit the envelope A(t) within F(t) comprises performing a stability test using A(t) and F(t).

3. The method of claim 1 wherein the network component is a component which receives and forwards packets.

4. A method for performing admission flow control for a network component, said method comprising:
   providing a function F(t) which characterizes resources available at the network component;
   receiving information characterizing a proposed flow of packets;
   defining an envelope A(t) based on the received information characterizing the proposed flow of packets;
   fitting an envelope $A(t-t_d)$ within F(t) so that $A(t-t_d) \leq F(t)$ for all t>0, wherein $t_d$ represents a delay for the proposed flow; and
   based on $t_d$, guaranteeing a maximum delay that any packet from the proposed flow will experience at the network component.

5. The method of claim 4 wherein the network component is selected from the group consisting of a switch, a router, a bridge, and a gateway.

6. The method of claim 4 wherein the step of fitting comprises finding a minimum $t_d$ for which $A(t-t_d) \leq F(t)$ for all t.

7. The method of claim 6 wherein A(t) is an n-rate function, wherein n is a positive integer.

8. The method of claim 7 wherein n is equal to one.

9. The method of claim 7 wherein n is equal to two.

10. The method of claim 4 wherein $$F(t) = ct - \sum_{i \in N} A^*_i(t - t_i)$$

wherein c is a rate characterizing the total capacity of the network component, t is time, N is an integer, $A^*_i(t)$ is a function characterizing a flow i which the network component has accepted, and $t_i$ is a maximum delay that the network component has guaranteed for the flow i.

11. The method of claim 4 further comprising defining a plurality of discrete time values, and wherein the step of fitting the envelope $A(t-t_d)$ comprises constraining a certain characteristic of $A(t-t_d)$ to fall on one of the discrete time values.

12. The method of claim 11 wherein said certain characteristic of $A(t-t_d)$ is a flex point.

13. The method of claim 11 wherein the step of defining a plurality of discrete time values comprises defining the time values at equal intervals.

14. The method of claim 11 wherein the step of defining a plurality of discrete time values comprises defining the time values at unequal intervals.

15. The method of claim 3 further comprising
    defining a plurality of discrete time values; and
    defining an envelope A°(t) based on the received information characterizing the proposed flow of packets, such that $A°(t) \geq A(t)$ for all t and a certain characteristic of $A°(t-t_d)$ falls on one of the discrete time values; and
    wherein $$F(t) = ct - \sum_{i \in N} A°_i(t - t_i)$$

wherein c is a rate characterizing the total capacity of the network component, t is time, N is an integer, $A°_i(t)$ is a function characterizing a flow i which the network component has accepted, and $t_i$ is a maximum delay that the network component has guaranteed for the flow i.

16. The method of claim 15 wherein said certain characteristic of $A°(t-t_d)$ is a flex point.

17. The method of claim 15 wherein the step of defining a plurality of discrete time values comprises defining the time values at equal intervals.

18. The method of claim 15 wherein the step of defining a plurality of discrete time values comprises defining the time values at unequal intervals.

19. The method of claim 4 wherein the network component uses an Early Deadline First scheduling policy to schedule the packets.

20. The method of claim 19, wherein the Early Deadline First scheduling policy is one of preemptive and non-preemptive Early Deadline First scheduling policies.

21. The method of claim 4 wherein the network component is a component which receives and forwards packets.

22. A network component which receives and forwards packets, the network component comprising:
 a queue which temporarily stores received packets prior to forwarding them;
 a central processing unit;
 a computer readable medium; and
 a program stored in the computer readable medium, wherein said program when executed by the central processing unit causes the central processing unit to:
 provide a function F(t) which characterizes resources available at the network component;
 define an envelope A(t) based on received information characterizing a proposed flow of packets;
 fit an envelope $A(t-t_d)$ within F(t) so that $A(t-t_d) \leq F(t)$ for all t>0, wherein $t_d$ represents a delay for the proposed flow; and
 based on $t_d$, guarantee a maximum delay that any packet from the proposed flow will experience in the queue.

23. A network component which receives and forwards packets, the network component comprising:
 a queue in which received packets are stored prior to forwarding them;
 means for providing a function F(t) which characterizes resources available at the network component;
 means for receiving information characterizing a proposed flow of packets;
 means for defining an envelope A(t) based on the received information characterizing the proposed flow of packets;
 means for fitting an envelope $A(t-t_d)$ within F(t) so that $A(t-t_d) \leq F(t)$ for all t>0, wherein $t_d$ represents a delay for the proposed flow; and
 means for guaranteeing, based on $t_d$, a maximum delay that any packet from the proposed flow will experience in the queue.

24. A program stored on a computer readable medium, wherein said program when executed by a central processing unit causes the central processing unit to:
 provide a function F(t) which characterizes resources available at a network component;
 define an envelope A(t) based on received information characterizing a proposed flow of packets;
 fit an envelope $A(t-t_d)$ within F(t) so that $A(t-t_d) \leq F(t)$ for all t>0, wherein $t_d$ represents a delay for the proposed flow; and
 based on $t_d$, guarantee a maximum delay that any packet from the proposed flow will experience in the network component.

* * * * *